United States Patent
Hedayat et al.

(10) Patent No.: US 12,120,742 B2
(45) Date of Patent: *Oct. 15, 2024

(54) CHANNEL ACCESS METHODS AND LISTEN-BEFORE-TALK SOLUTIONS FOR NEW RADIO OPERATION IN UNLICENSED BANDS

(71) Applicant: INTERDIGITAL PATENT HOLDINGS, INC., Wilmington, DE (US)

(72) Inventors: Ahmad Reza Hedayat, Aliso Viejo, CA (US); Oghenekome Oteri, San Diego, CA (US); Hanqing Lou, Syosset, NY (US); Mahmoud Taherzadeh Boroujeni, San Diego, CA (US); Xiaofei Wang, North Caldwell, NJ (US); Rui Yang, Greenlawn, NY (US); Shahrokh Nayeb Nazar, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,684

(22) Filed: Jan. 3, 2023

(65) Prior Publication Data
US 2023/0232456 A1    Jul. 20, 2023

Related U.S. Application Data

(63) Continuation of application No. 16/960,911, filed as application No. PCT/US2019/013006 on Jan. 10, 2019, now Pat. No. 11,546,940.

(Continued)

(51) Int. Cl.
*H04W 74/0816*    (2024.01)
*H04L 5/00*    (2006.01)
(Continued)

(52) U.S. Cl.
CPC ......... *H04W 74/0816* (2013.01); *H04L 5/005* (2013.01); *H04L 5/0053* (2013.01);
(Continued)

(58) Field of Classification Search
CPC ............. H04W 74/0816; H04W 52/34; H04W 72/0446; H04W 72/23; H04W 16/14;
(Continued)

(56) References Cited

U.S. PATENT DOCUMENTS

| 8,213,302 B2 | 7/2012 | Wang et al. |
| 9,253,770 B2 | 2/2016 | Yang et al. |

(Continued)

FOREIGN PATENT DOCUMENTS

| CN | 107437979 B | 10/2020 |
| WO | 2016/122113 | 8/2016 |

(Continued)

OTHER PUBLICATIONS

Microsoft Corporation, "Discussion on required functionalities for licensed-assisted access using LTE," 3GPP TSG-RAN WG1 Meeting #80, R1-150630, Athens, Greece (Feb. 9-13, 2015).

(Continued)

*Primary Examiner* — Raj Jain
(74) *Attorney, Agent, or Firm* — Volpe Koenig

(57) ABSTRACT

Methods, systems, and devices for channel access and listen-before-talk approaches for new radio operation in unlicensed bands and/or licensed bands. A gNB and a wireless transmit/receive unit (WTRU) may operate in unlicensed spectrum. The gNB may perform listen-before-talk operation, and when successful, may send a downlink control channel with a slot format indication (SFI) to the WTRU. There may also be a handshaking procedure with an exchange of a request to transmit (RTT) and a request to receive (RTR). Prior to receiving the downlink channel, the (Continued)

US 12,120,742 B2
Page 2

WTRU may monitor search spaces at a first level, and once the downlink channel is received the WTRU may monitor search spaces at a second level. At the end of transmission, the WTRU may revert back to monitoring search spaces at the first level. In one example, the first level may be a mini-slot level and the second level may be a slot level.

18 Claims, 31 Drawing Sheets

Related U.S. Application Data

(60) Provisional application No. 62/652,815, filed on Apr. 4, 2018, provisional application No. 62/630,566, filed on Feb. 14, 2018, provisional application No. 62/615,862, filed on Jan. 10, 2018.

(51) Int. Cl.
  *H04W 16/14* (2009.01)
  *H04W 52/34* (2009.01)
  *H04W 72/0446* (2023.01)
  *H04W 72/23* (2023.01)

(52) U.S. Cl.
  CPC .......... *H04L 5/0082* (2013.01); *H04L 5/0091* (2013.01); *H04W 52/34* (2013.01); *H04W 72/0446* (2013.01); *H04W 72/23* (2023.01); *H04W 16/14* (2013.01)

(58) Field of Classification Search
  CPC ... H04L 5/0053; H04L 5/0082; H04L 5/0091; H04L 5/005
  See application file for complete search history.

(56) References Cited

U.S. PATENT DOCUMENTS

| | | | |
|---|---|---|---|
| 9,408,202 | B2 | 8/2016 | Nazar et al. |
| 10,129,793 | B2 | 11/2018 | Ryoo et al. |
| 10,171,276 | B2 | 1/2019 | Stern-Berkowitz et al. |
| 10,172,135 | B2 | 1/2019 | Deng et al. |
| 10,313,990 | B2 | 6/2019 | Sadeghi et al. |
| 10,383,121 | B2* | 8/2019 | Li ............ H04W 72/30 |
| 10,652,753 | B2* | 5/2020 | Choi .......... H04L 1/00 |
| 10,805,951 | B2 | 10/2020 | Li et al. |
| 10,912,118 | B2 | 2/2021 | Tiirola et al. |
| 11,546,940 | B2* | 1/2023 | Hedayat ........ H04L 5/0082 |
| 2010/0272048 | A1 | 10/2010 | Pan et al. |
| 2011/0243048 | A1 | 10/2011 | Wang et al. |
| 2013/0163543 | A1 | 6/2013 | Freda et al. |
| 2013/0194956 | A1 | 8/2013 | Sartori et al. |
| 2013/0201834 | A1 | 8/2013 | Klingenbrunn et al. |
| 2014/0105154 | A1 | 4/2014 | Yang et al. |
| 2014/0126490 | A1* | 5/2014 | Chen ............ H04L 5/0035 370/328 |
| 2014/0295820 | A1 | 10/2014 | Kim et al. |
| 2015/0250017 | A1 | 9/2015 | Ingale et al. |
| 2016/0323915 | A1 | 11/2016 | Liu et al. |
| 2017/0048861 | A1* | 2/2017 | Choi ............ H04L 5/0053 |
| 2017/0086172 | A1 | 3/2017 | Dinan |
| 2017/0111913 | A1 | 4/2017 | Li et al. |
| 2017/0141833 | A1 | 5/2017 | Kim et al. |
| 2017/0318620 | A1 | 11/2017 | Tseng et al. |
| 2018/0007574 | A1 | 1/2018 | Park et al. |
| 2018/0007688 | A1 | 1/2018 | Fu et al. |
| 2018/0110045 | A1 | 4/2018 | You et al. |
| 2018/0135247 | A1 | 5/2018 | Lee |
| 2018/0160420 | A1 | 6/2018 | Kim et al. |
| 2018/0338332 | A1 | 11/2018 | Lee et al. |
| 2019/0021064 | A1 | 1/2019 | Ryu et al. |
| 2019/0053159 | A1 | 2/2019 | Wei et al. |
| 2019/0075581 | A1* | 3/2019 | Salem ............ H04W 72/1268 |
| 2019/0159253 | A1* | 5/2019 | Koorapaty ........ H04W 74/006 |
| 2019/0246395 | A1 | 8/2019 | Huang et al. |
| 2020/0059331 | A1 | 2/2020 | Wong et al. |
| 2020/0187236 | A1* | 6/2020 | Moon ............ H04L 1/00 |
| 2021/0360674 | A1 | 11/2021 | Lim et al. |
| 2021/0368541 | A1* | 11/2021 | Hedayat ........ H04W 72/0446 |
| 2023/0232456 | A1* | 7/2023 | Hedayat ........ H04L 5/0091 370/329 |

FOREIGN PATENT DOCUMENTS

| | | |
|---|---|---|
| WO | 2017/026086 | 2/2017 |
| WO | 2017079574 A1 | 5/2017 |
| WO | 2018/031327 | 2/2018 |
| WO | 2018031727 A1 | 2/2018 |
| WO | 2018128439 A1 | 7/2018 |
| WO | 2019140060 A1 | 7/2019 |
| WO | 2020/069135 | 4/2020 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Channel access procedure and coexistence in NR-U," 3GPP TSG RAN WG1 Meeting #94, R1-1809089, Gothenburg, Sweden (Aug. 20-24, 2018).

Interdigital Inc., "On configuration of GC-PDCCH for dynamic SFI," 3GPP TSG RAN WG1 Meeting 91, R1-1720637, Reno, USA (Nov. 27-Dec. 1, 2017).

Interdigital Inc., "On Downlink Signals and Channels for NR-U," 3GPP TSG RAN WG1 Meeting #94, R1-1809087, Gothenburg, Sweden (Aug. 20-24, 2018).

Interdigital Inc., "On Frame Structure for NR-U Operation," 3GPP TSG RAN WG1 Meeting #92bis, R1-1804868, Sanya, China (Apr. 16-20, 2018).

Interdigital Inc., "On NR-Unlicensed Channel Access Procedures," 3GPP TSG RAN WG1 Meeting #93, R1-1807036, Busan, Korea (May 21-25, 2018).

Third Generation Partnership Project, "Technical Specification Group Services and System Aspects; System Architecture for the 5G System; Stage 2 (Release 15)," 3GPP TS 23.501 V15.0.0 (Dec. 2017).

Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.8.0 (Sep. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.3.0 (Sep. 2018).
Third Generation Partnership Project, "Technical Specification Group Radio Access Network; NR; Physical channels and modulation (Release 15)," 3GPP TS 38.211 V15.0.0 (Dec. 2017).
Third Generation Partnership Project, "Technical Specification Group Radio Access Network; NR; Physical channels and modulation (Release 15)," 3GPP TS 38.211 V15.3.0 (Sep. 2018).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Physical layer procedures for control (Release 15)," 3GPP TS 38.213 V15.3.0 (Sep. 2018).
Third Generation Partnership Project, "Technical Specification Group Radio Access Network; NR; Multiplexing and channel coding (Release 15)," 3GPP TS 38.212 V15.0.0 (Dec. 2017).
Third Generation Partnership Project, "Technical Specification Group Radio Access Network; NR; Multiplexing and channel coding (Release 15)," 3GPP TS 38.212 V15.3.0 (Sep. 2018).
Third Generation Partnership Project, "Technical Specification Group Services and System Aspects; System Architecture for the 5G System; Stage 2 (Release 15)," 3GPP TS 23.501 V15.4.0 (Dec. 2018).
Third Generation Partnership Project, "Technical Specification Group Radio Access Network; NR; Physical channels and modulation (Release 15)," 3GPP TS 38.211 V2.0.0 (Dec. 2017).
Third Generation Partnership Project, "Technical Specification Group Radio Access Network; NR; Physical layer procedures for control (Release 15)," 3GPP TS 38.213 V2.0.0 (Dec. 2017).
Third Generation Partnership Project, "Technical Specification Group Radio Access Network; NR; Radio Resource Control (RRC) protocol specification (Release 15)," 3GPP TS 38.331 V15.3.0 (Sep. 2018).
Third Generation Partnership Project, "Technical Specification Group Radio Access Network; NR; Radio Resource Control (RRC) protocol specification (Release 15)," 3GPP TS 38.331 V15.0.0 (Dec. 2017).
Ericsson, "Search Space Design for Urllc," 3GPP TSG-RAN WG1 Meeting #93, R1-1806019, Busan, Korea (May 21-25. 2018).
Interdigital, Inc., "Evaluation of UE Power Saving Techniques," 3GPP TSG RAN WG1 #96, R1-1902618, Athens, Greece (Feb. 25-Mar. 1, 2019).
Interdigital, Inc., "On UE Power Saving Techniques," 3GPP TSG RAN WG1 #96, R1-1902619, Athens, Greece (Feb. 25-Mar. 1, 2019).
Interdigital, Inc., "PDCCH-based Power Saving Signal Design Considerations," 3GPP TSG RAN WG1 #96b, R1-1905409, Xi'an, China (Apr. 8-12, 2019).
Interdigital, Inc., "PDCCH-based Power Saving Signal Design," 3GPP TSG RAN WG1 #97, R1-1907104, Reno, USA (May 13-17, 2019).
Nokia et al., "SC-MCCH transmission for NB-Iot," 3GPP TSG RAN WG1 Meeting #86-bis, R1-1608884, Lisbon, Portugal (Oct. 10-14, 2016).
Nokia et al., "SC-MTCH transmission for NB-IoT," 3GPP TSG RAN WG1 Meeting #86-bis, R1-1608885, Lisbon, Portugal (Oct. 10-14, 2016).
Nokia et al., "SC-PTM search space design for NB-IoT," 3GPP TSG RAN WG1 Meeting #86-bis, R1-1608883, Lisbon, Portugal (Oct. 10-14, 2016).
Qualcomm Incorporated, "Remaining issues on control resource set and search space," 3GPP TSG RAN WG1 Meeting #93, R1-1807353, Busan, Korea (May 21-25. 2018).
Qualcomm Incorporated, "Ue Power Saving during Active State," 3GPP TSG RAN WG2 NR #99bis, R2-1711904, Prague, Czech (Oct. 9-13, 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.3.0 (Sep. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.3.0 (Sep. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018).
Third Generation Partnership Project, "Technical Specification Group Radio Access Network; NR; Physical layer procedures for data (Release 15)," 3GPP TS 38.214 V15.0.0 (Dec. 2017).
Third Generation Partnership Project, "Technical Specification Group Radio Access Network; NR; Physical layer procedures for data (Release 15)," 3GPP TS 38.214 V15.3.0 (Sep. 2018).
Third Generation Partnership Project, "Technical Specification Group Radio Access Network; NR; User Equipment (UE) radio access capabilities (Release 15)," 3GPP TS 38.306 V15.0.0 (Dec. 2017).
Third Generation Partnership Project, "Technical Specification Group Radio Access Network; NR; User Equipment (UE) radio access capabilities (Release 15)," 3GPP TS 38.306 V15.3.0 (Sep. 2018).
MCC Support, "Draft Report of 3GPP Tsg Ran WG1 #89 v0.2.0 (Hangzhou, China, May 15 - 19, 2017)," 3GPP TSG RAN WG1 Meeting #90, R1-171xxx, Prague, Czech Rep (Aug. 21-25, 2017).
MCC Support, "Draft Report of 3GPP TSG RAN WG1 #91 v0.2.0 (Reno, USA, Nov. 27- Dec. 1, 2017)," 3GPP TSG RAN WG1 Meeting #92, R1-180xxx, Athens, Greece (Feb. 26-Mar. 2, 2018).
NEC, "Considerations on frame structure design for NR-U operation," 3GPP TSG RAN WG1 Meeting #94bis, R1-1810657, Chengdu, China (Oct. 8-12, 2018).
NEC, "Considerations on frame structure design for NR-U operation," 3GPP TSG RAN WG1 Meeting #95, R1-1812418, Spokane, US (Nov. 12-16, 2018).

* cited by examiner

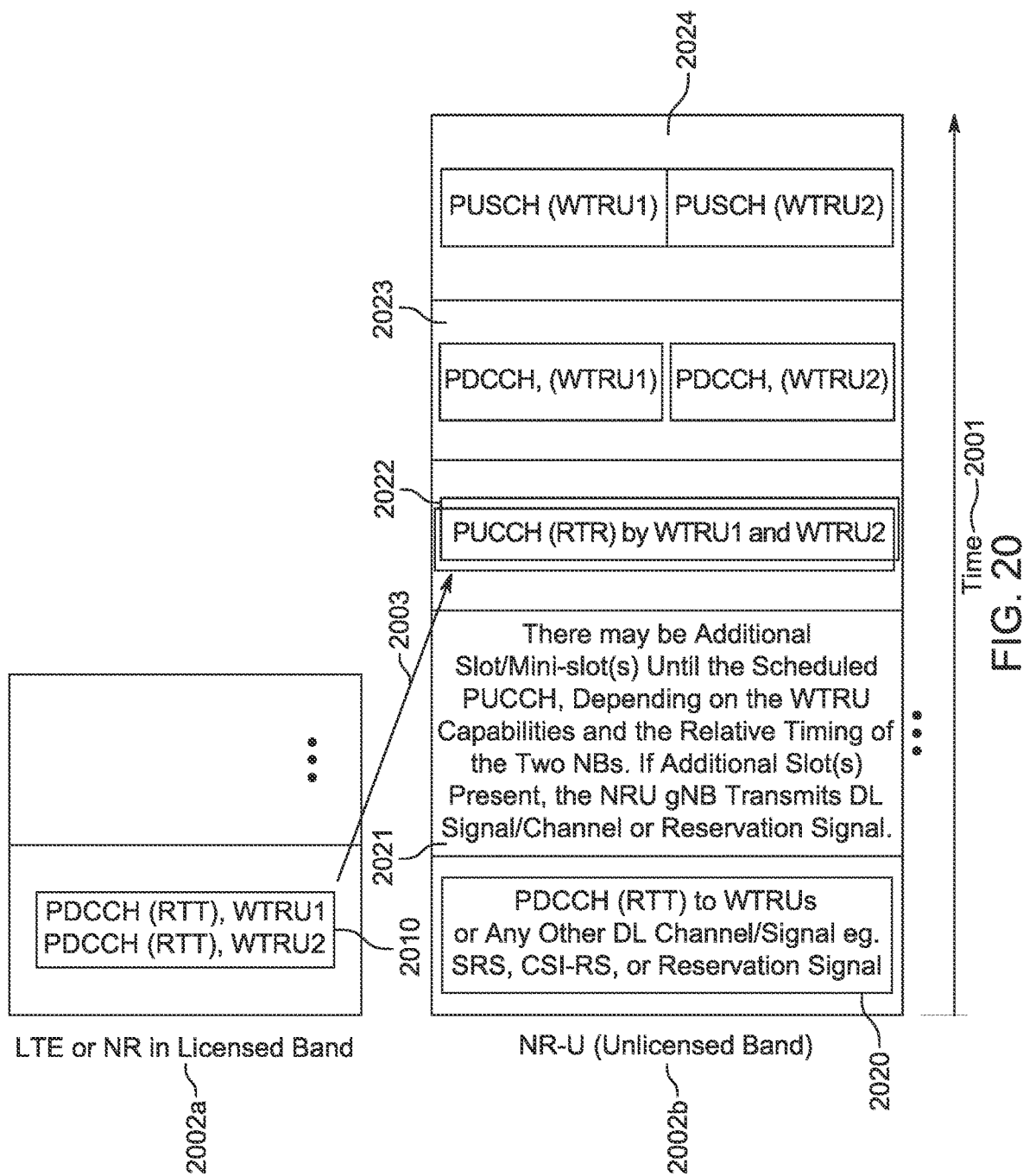

CHANNEL ACCESS METHODS AND LISTEN-BEFORE-TALK SOLUTIONS FOR NEW RADIO OPERATION IN UNLICENSED BANDS

CROSS REFERENCE TO RELATED APPLICATIONS

This application is a continuation of U.S. patent application Ser. No. 16/960,911 filed Jul. 9, 2020, which issued as U.S. Pat. No. 11,546,940 on Jan. 3, 2023, which claims the benefit of PCT Application No. PCT/US2019/013006, filed Jan. 10, 2019, and which claims the benefit of U.S. Provisional Application No. 62/615,862 filed Jan. 10, 2018, U.S. Provisional Application No. 62/630,566 filed Feb. 14, 2018, and U.S. Provisional Application No. 62/652,815 filed Apr. 4, 2018, the contents of which are hereby incorporated by reference herein.

BACKGROUND

Use cases considered during development of 3GPP New Radio (NR) are ultra-reliable low-latency communication (URLLC), massive machine-type communication (mMTC or MMTC), or enhanced mobile broadband (eMBB or EMBB) communication. In unlicensed bands, a wireless node may need procedures to address these various use cases. Depending on the regulatory requirements of the unlicensed channel, such a procedure may vary. In general, protocols may be needed for the wireless node to determine the availability of the medium to communicate in an unlicensed channel.

SUMMARY

Methods, systems, and devices for channel access and listen-before-talk approaches for new radio operation in unlicensed bands and/or licensed bands. A gNB and a wireless transmit/receive unit (WTRU) may operate in unlicensed spectrum. The gNB may perform listen-before-talk operation, and when successful, may send a downlink control channel with a slot format indication (SFI) to the WTRU. There may also be a handshaking procedure with an exchange of a request to transmit (RTT) and a request to receive (RTR). Prior to receiving the downlink channel, the WTRU may monitor search spaces at a first level, and once the downlink channel is received the WTRU may monitor search spaces at a second level. At the end of transmission, the WTRU may revert back to monitoring search spaces at the first level. In one example, the first level may be a mini-slot level and the second level may be a slot level.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 20 is a frame diagram illustrating an example of RTT and RTR handshaking in a NSA NR-U network;

DETAILED DESCRIPTION

Figure 1A:
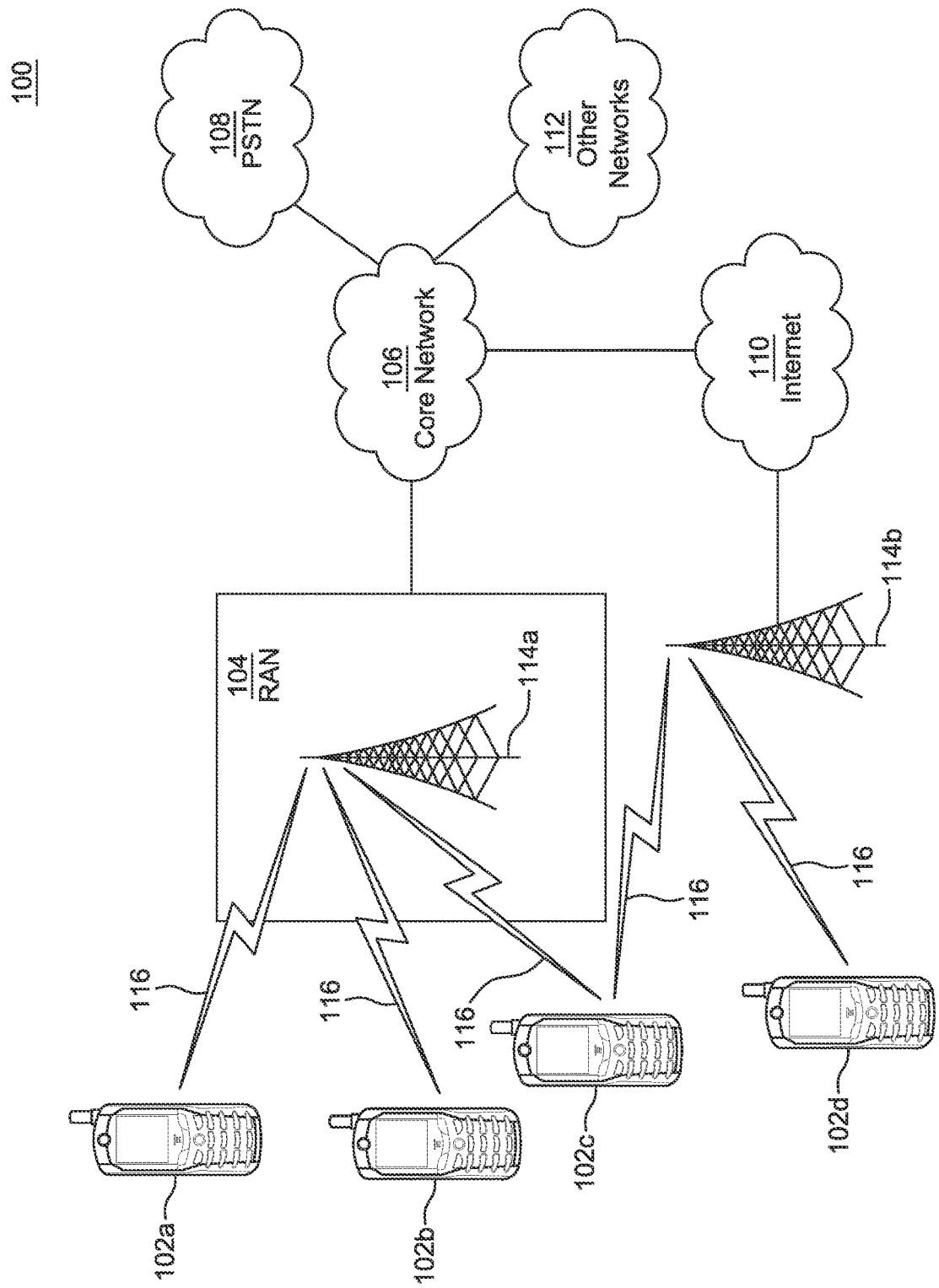
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (I) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR). There may be a plurality of use cases NR, such as ultra-reliable low-latency communication (URLLC), massive machine-type communication (mMTC or MMTC), or enhanced mobile broadband (eMBB or EMBB) communication. MMTC may be designed to enable communication between devices that are low-cost, massive in number and battery-driven, intended to support applications such as smart metering, logistics, and field and body sensors. URLLC may make it possible for devices and machines to communicate with ultra-reliability, very low latency and high availability, making it ideal for vehicular communication, industrial control, factory automation, remote surgery, smart grids and public safety applications. And EMBB may focus on enhancements to variety of parameters such as data rate, delay and coverage of mobile broadband access.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
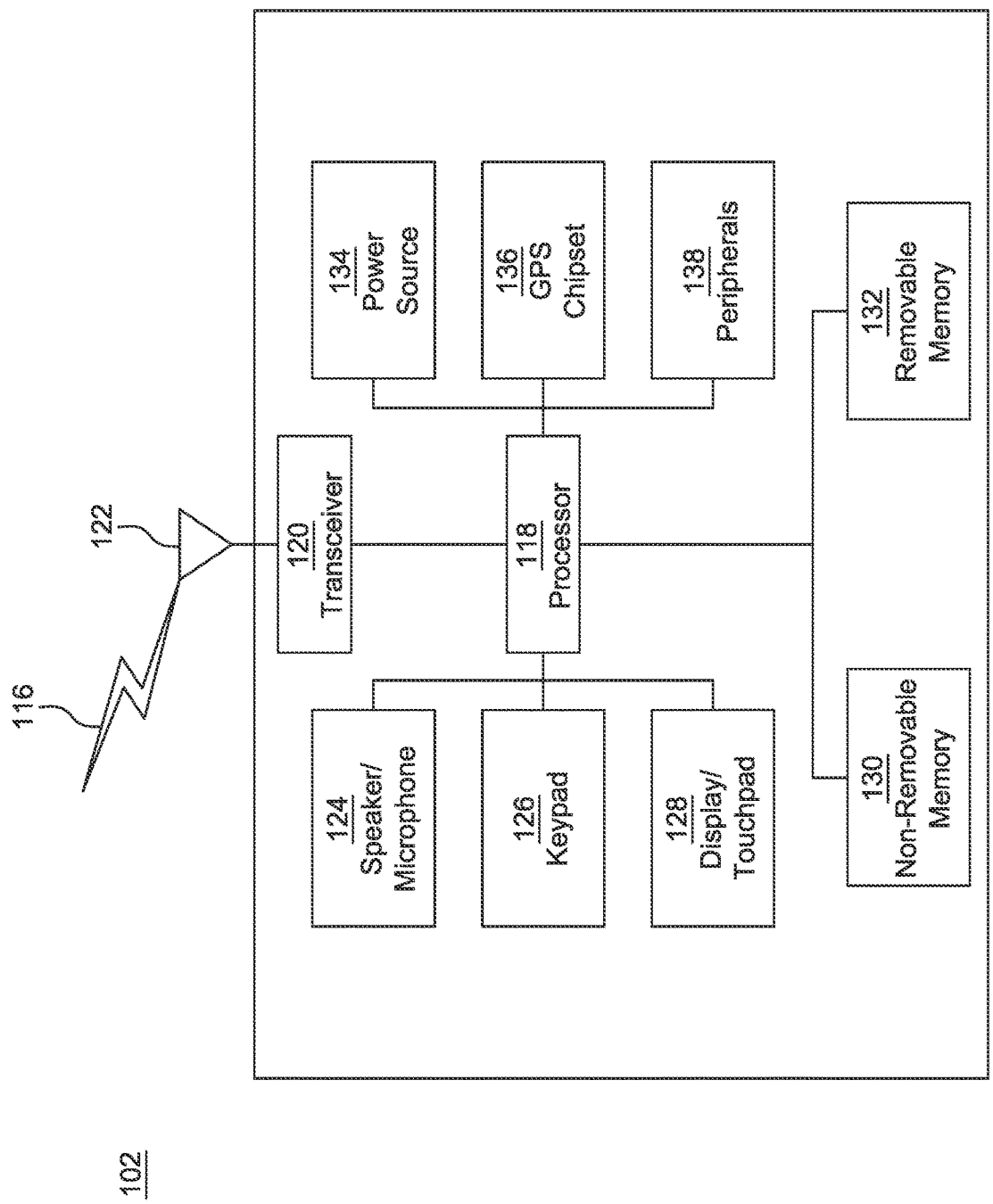
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
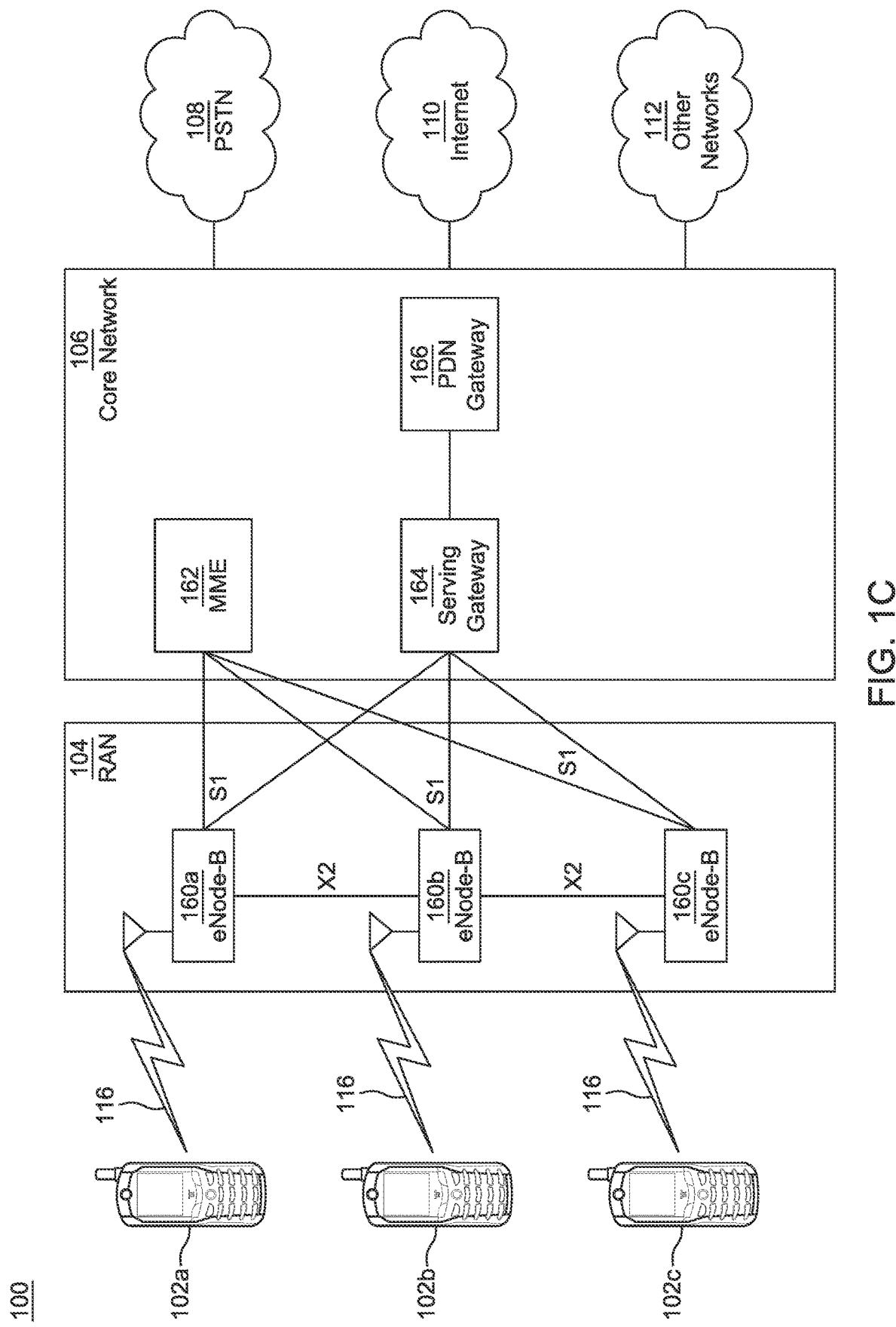
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
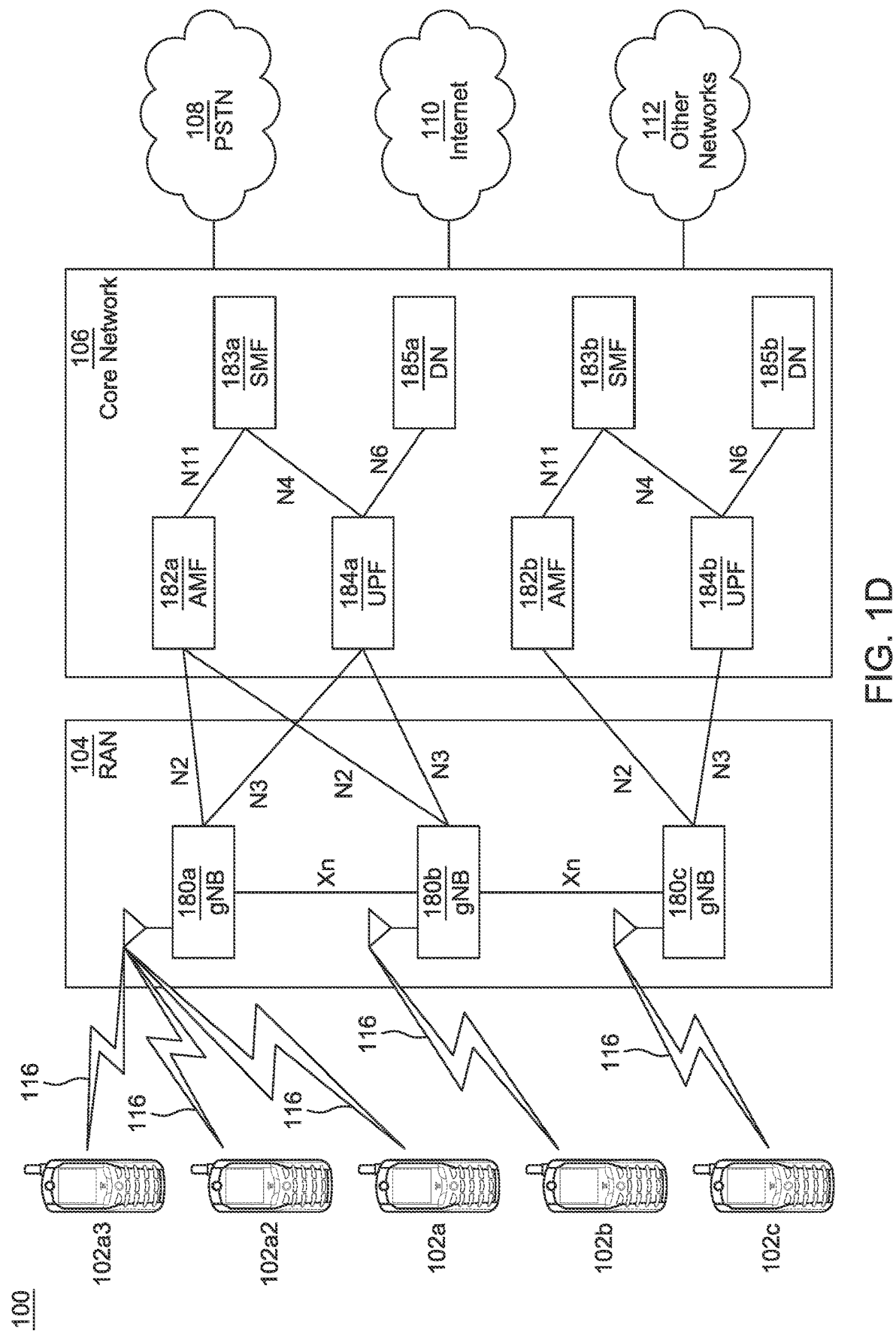
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In the wireless communication system of FIG. 1D, where a central node, such as gNB 180a, serves a set of WTRUs 102a-a3, the opportunity to send transport blocks (TB) from those WTRUs 102a-a3 to gNB 180a may be administered by gNB 180a. For instance, gNB 180a may schedule an individual WTRU uplink (UL) transmission by assigning separate time-frequency resources to each WTRU of WTRUs 102a-a3 and granting each resource to one WTRU, such as WTRU 102a. Such an arrangement for UL transmission is sometimes referred to as grant-based UL transmission. Alternatively, gNB 180a may announce the presence of one or more time-frequency resources and let a set of WTRUs use each resource, thereby allowing access without a specific UL grant.

In unlicensed bands, such as NR unlicensed spectrum (NR-U), gNB 180a or a WTRU 102a may need to perform a listen-before-talk (LBT) procedure before accessing the unlicensed wireless channel. LBT specifics may vary depending on the regulatory requirements of the unlicensed channel. In general, a LBT procedure may comprise a wireless node (e.g. a gNB or a WTRU) listening for a fixed- or random-duration interval to a medium (i.e., unlicensed wireless channel), and if the energy level detected from the medium is more than a threshold (e.g., that is specified by a regulator) the wireless node refrains from transmitting any wireless signal and may try again in the future; otherwise, if nothing is detected, the wireless node may transmit its desired signal in the unlicensed channel after completion of the LBT procedure for up to a predefined maximum duration.

A Physical Downlink Control Channel (PDCCH) in New Radio (NR) may comprise of one or more control-channel elements (CCEs) and/or up to 16 CCEs depending on aggregation level. A control-resource set (CORESET) may comprise $N_{RB}^{CORESET}$ resource blocks in the frequency domain, given by the higher-layer parameter CORESET-freq-dom, and $n_{symb}^{CORESET} \in \{1,2,3\}$ symbols in the time domain, given by the higher-layer parameter CORESET-time-dur. Group-common (GC) PDCCH may be RRC-configured. Common PDCCH may be system information and paging for all WTRUs. Remaining system information (RMSI) may be configured by the Physical Broadcast Channel (PBCH). Other System Information (OSI) may also be configured by the PBCH.

A Physical Uplink Control Channel (PUCCH) in NR may support multiple formats, such as those shown in Table 1.

TABLE 1

Example PUCCH Formats

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

In an NR frame, OFDM symbols in a slot may be classified as 'downlink' (denoted D'), 'flexible' (denoted 'X'), or 'uplink' (denoted 'U'). An example of this structure is shown in Table 2.

TABLE 2

Example of formats for a NR slot

| Format | Symbol number in a slot | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | ... | ... | ... | ... | ... | ... | ... | ... | ... | ... | ... | ... | ... | ... |
| 60 | D | X | X | X | X | X | U | D | X | X | X | X | X | U |
| 61 | D | D | X | X | X | X | U | D | D | X | X | X | X | U |
| 62-255 | Reserved | | | | | | | | | | | | | |

In some regulatory regimes, Listen-Before-Talk (LBT) procedures may be mandatory for unlicensed channel usage, and as a consequence LBT may be used in 3GPP, such as Licensed Assisted Access (LAA) (3GPP Release 13), enhanced LAA (eLAA) (3GPP Release 14), and further eLAA (feLAA) (3GPP Release 15). There may be several categories of LBT, such as: category 1, no listen interval; category 2, fixed duration listen interval (e.g., 25 μs); category 3, random duration listen interval with fixed contention window; and category 4, random duration listen interval with increasing contention window. The LBT Category 4 (CAT 4) scheme, adopted in LAA/eLAA, may serve as an exemplary scheme for many use cases.

In one example, a LBT CAT 4 procedure may start when a wireless node, such as an eNB, gNB, a WTRU, or the like, wants to transmit control or data in an unlicensed channel. The wireless node then conducts an initial clear channel assessment (CCA), where the channel is checked in order to determine if it is idle for some period of time (i.e., a sum of a fixed period of time and a pseudo-random duration). The availability of the channel may be determined by comparing the level of Energy Detected (ED) across the bandwidth of the unlicensed channel to an energy threshold that is determined by a regulator, specified by a standard, estimated by a device, or the like. If the channel is determined to be free, the transmission may proceed. If not, the device may conduct a slotted random back-off procedure, where a random number is selected from a specified interval called the contention window. A back-off countdown may then be obtained and the channel may be checked for whether it is idle or not, and the transmission may be initiated when the back-off counter goes to zero. After the eNB or gNB has gained access to the channel, it may only be allowed to transmit for a limited duration referred to as the Maximum Channel Occupancy Time (MCOT). The CAT 4 LBT procedure with random backoff and variable contention window sizes may be considered to enable fair channel access and good coexistence with other Radio Access Technologies (RATs), such as Wi-Fi and other LAA networks.

A carrier Bandwidth Part (BWP) as discussed herein may be a contiguous set of physical resource blocks selected from a contiguous subset of the common resource block for a given numerology on a given carrier. A system bandwidth as discussed herein may at least be the superset of all carrier bandwidth parts as assigned to an operator of wireless nodes, such as WTRUs or gNBs.

In some cases, such as in NR, a WTRU may be configured with up to four carrier BWPs in the downlink with a single downlink carrier BWP being active at a given time. The WTRU may not be expected to receive PDSCH, PDCCH, CSI-RS, or TRS outside an active bandwidth part. A WTRU may be configured with up to four carrier BWPs in the uplink with a single uplink carrier BWP being active at a given time. If a WTRU is configured with a supplementary uplink, the WTRU may additionally be configured with up to four carrier BWPs in the supplementary uplink with a single supplementary uplink carrier bandwidth part being active at a given time. The WTRU may not transmit PUSCH or PUCCH outside an active BWP.

Figure 2:
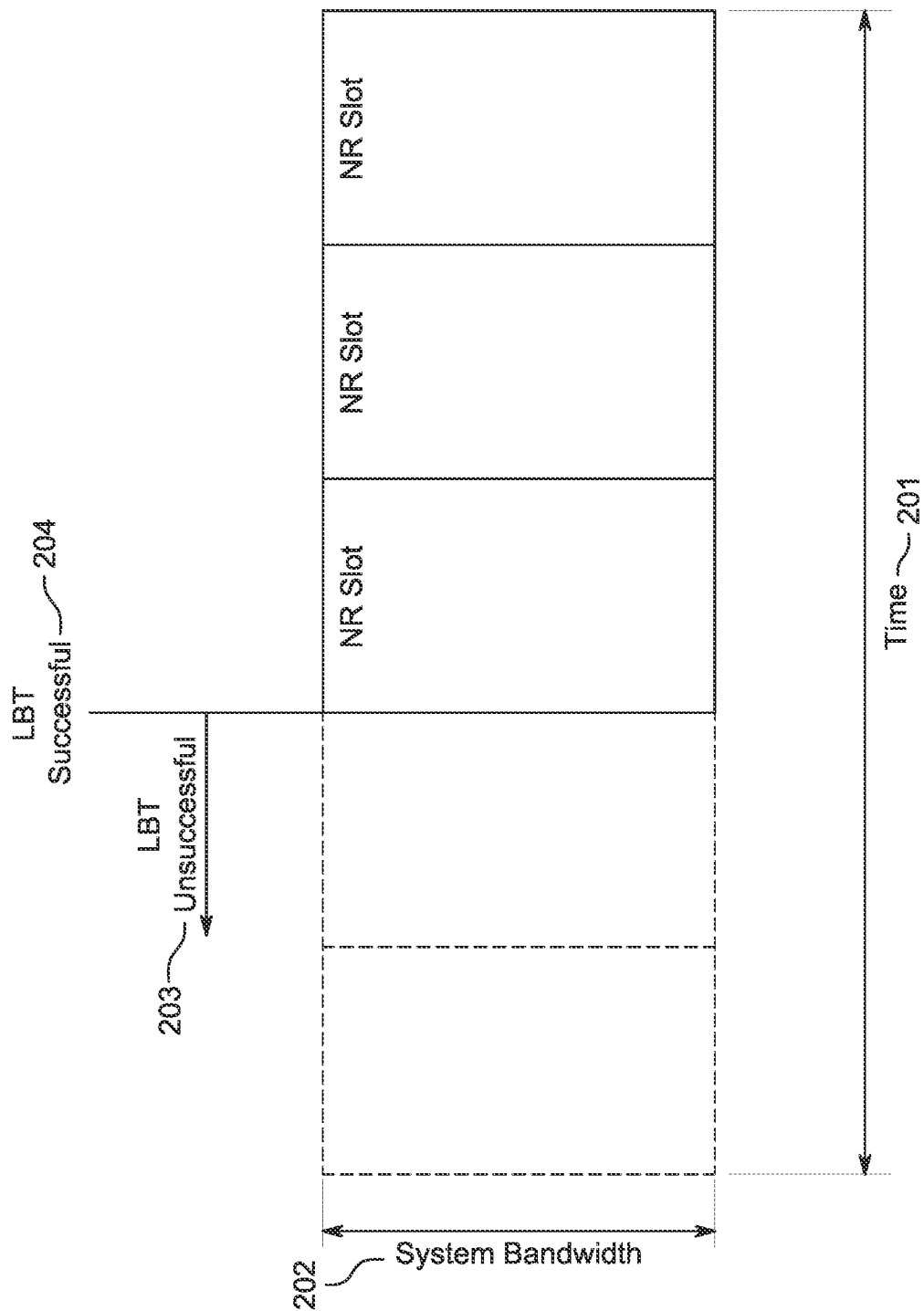
FIG. 2 is a frame diagram illustrating an example of a gNB successfully accessing an unlicensed channel after performing a LBT procedure according to one or more embodiments.

FIG. 2 is a frame diagram illustrating an example of a gNB successfully accessing an unlicensed channel after performing a LBT procedure according to one or more embodiments. System bandwidth 202 may be shown on the vertical axis and time 201 may be shown on the horizontal axis. At first, the gNB may perform a LBT procedure unsuccessfully, and find that the unlicensed channel is busy and unavailable as shown with the dotted lines 203, hence it avoids transmitting into the channel. Later, when the gNB tries again the channel may be determined to be available and the LBT may be successful 204. At this point, the gNB may have access to the channel as shown with the solid lines, and the gNB may transmit into the channel. While FIG. 2 is discussed with regard to a gNB, the example may apply to any wireless node, such as a WTRU.

In the example shown in FIG. 2, the LBT is successful right before the beginning of an NR slot, but generally the success or failure of a LBT may occur at any time with respect to a NR slot, there may be no reliance when an NR-U wireless node can access an unlicensed channel.

Figure 3:
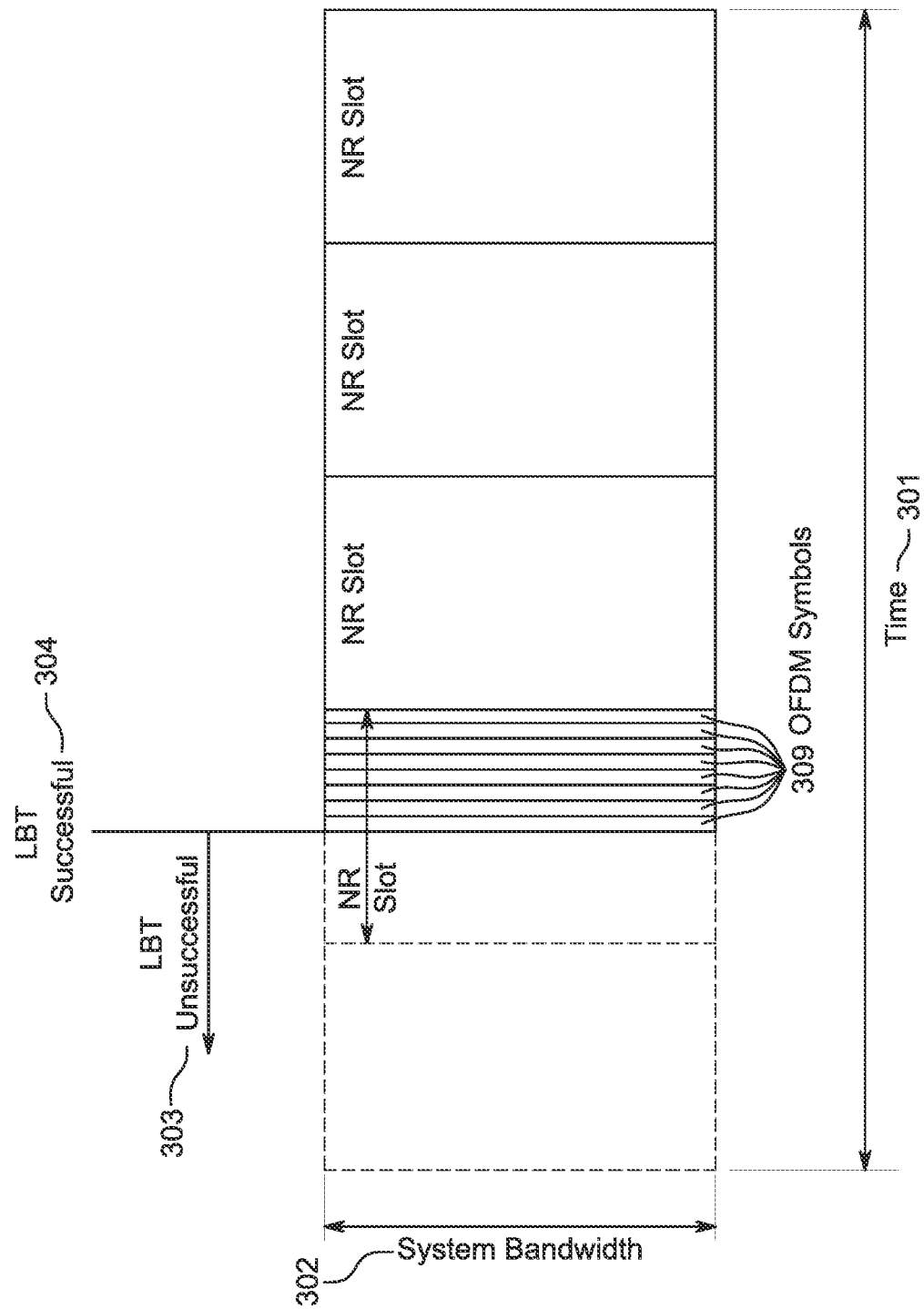
FIG. 3 is a frame diagram illustrating an example of a gNB successfully accessing an unlicensed channel after performing an LBT procedure according to one or more embodiments.

FIG. 3 is a frame diagram showing an example of a gNB successfully accessing an unlicensed channel after performing an LBT procedure according to one or more embodiments. The diagram has a vertical axis of system bandwidth 302 and a horizontal axis of time 301. Here, the gNB may successfully perform LBT at 304, after having unsuccessfully attempted LBT previously 303, and may accesses an unlicensed channel in the middle of a time slot at the point LBT is successful 304. Hence, the gNB may have the opportunity for transmitting a sub-slot before starting a full slot. Each slot may have a number of OFDM symbols 309. As discussed herein, time 301 may be shown in increments of NR slots after the LBT point, but in other embodiments may be other increments of time as discussed herein.

One approach for addressing competing nodes trying to access the same mediums (i.e., why LBT is unsuccessful in FIGS. 2 and 3) may be to utilize the concept adopted in LAA/eLAA where a reservation signal may be sent whose only purpose is to occupy the channel so that other competing wireless nodes from other RATs find the channel busy and refrain from transmission. While this solution allows the wireless node to grab the channel, it may not be as efficient as possible.

In another approach, there may be efficiencies gained through the use of the NR frame structure based on one or more embodiments as disclosed herein. Competing wireless nodes in NR-U may be categorized in several ways (gNB may be referenced for example purposes, but any wireless node may compete for access): 1) Competing nodes from other RATs, where the detection of usage of the unlicensed channel by such nodes may only be possible by energy detection (and vice versa they can detect usage of the channel by an NR-U gNB only by energy detection); 2) Competing NR-U gNBs that belong to competing entities/operators, where the detection of usage of the unlicensed channel by such a node may also be done by detecting some of the NR-U signaling (assuming they operate within the same numerology such as channel bandwidth and carrier spacing, etc.); and 3) Competing NR-U gNBs that belong to the same entity/operator, where the detection of usage of the unlicensed channel by such a node may also be done by detecting some of the NR-U signaling (assuming they operate within same numerology). Moreover, the third type of competing wireless nodes, such as NR-U gNBs, may cooperate with each other to enhance the channel sharing by exchanging some information with each other, such as the load of each NR-U gNB, the urgency of channel access, and channel prioritization information. With regard to these categories of competing wireless nodes, channel sharing may be enhanced based on one or more or more embodiments as discussed herein.

Figure 4:
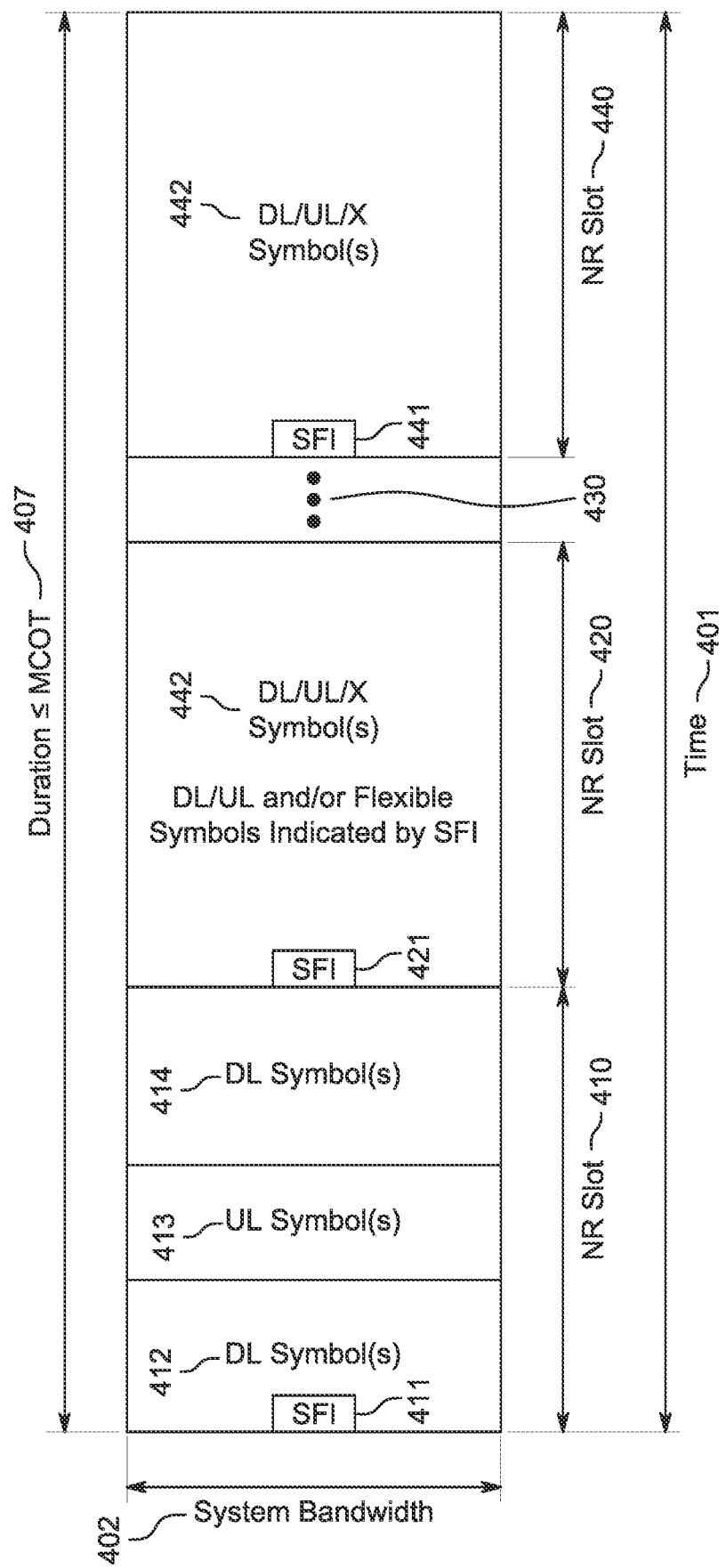
FIG. 4 is a frame diagram illustrating an example NR frame structure for NR-U operation.

FIG. 4 is a frame diagram illustrating an example NR frame structure for NR-U operation. The diagram has a vertical axis of system bandwidth 402 and a horizontal axis of time 401. While it is not shown in this figure, it may be assumed that a NR-U gNB accesses the channel after successfully performing an LBT procedure. In the initial slot 410, there may be one or more DL OFDM symbols 412. Next, there may be zero or more (i.e., optional) UL region that comprise one or multiple UL OFDM symbols 413, followed by an optional DL region that comprises one or multiple DL OFDM symbols 414. For each slot, there may be an SFI indicating what is in each slot, such as SFI 411 for NR slot 410. There may be subsequent slots (430, 430, 440) up to or less than the duration defined by the Maximum Channel Occupancy Time (MCOT) 407, and for a given numerology these slots may have a structure similar/same to as the first slot (i.e., one or more DL/UL/etc. symbols 422). Since the duration of the initial slot is dependent on when the LBT procedure is successful, the initial slot may be a full slot or may be less than a full slot, such as a sub-slot made up of OFDM symbols (as shown in FIG. 3). Therefore, the number of DL or UL symbols, and even whether there is a chance for UL symbols, may depend on the number of OFDM symbols within the duration of the slot or sub-slot. Hence, it may be necessary that the structure or format of a sub-slot is indicated at the beginning of the sub-slot by the SFI. The SFI may be carried in a GC PDCCH (e.g., within DCI format 2_0).

Figure 5:
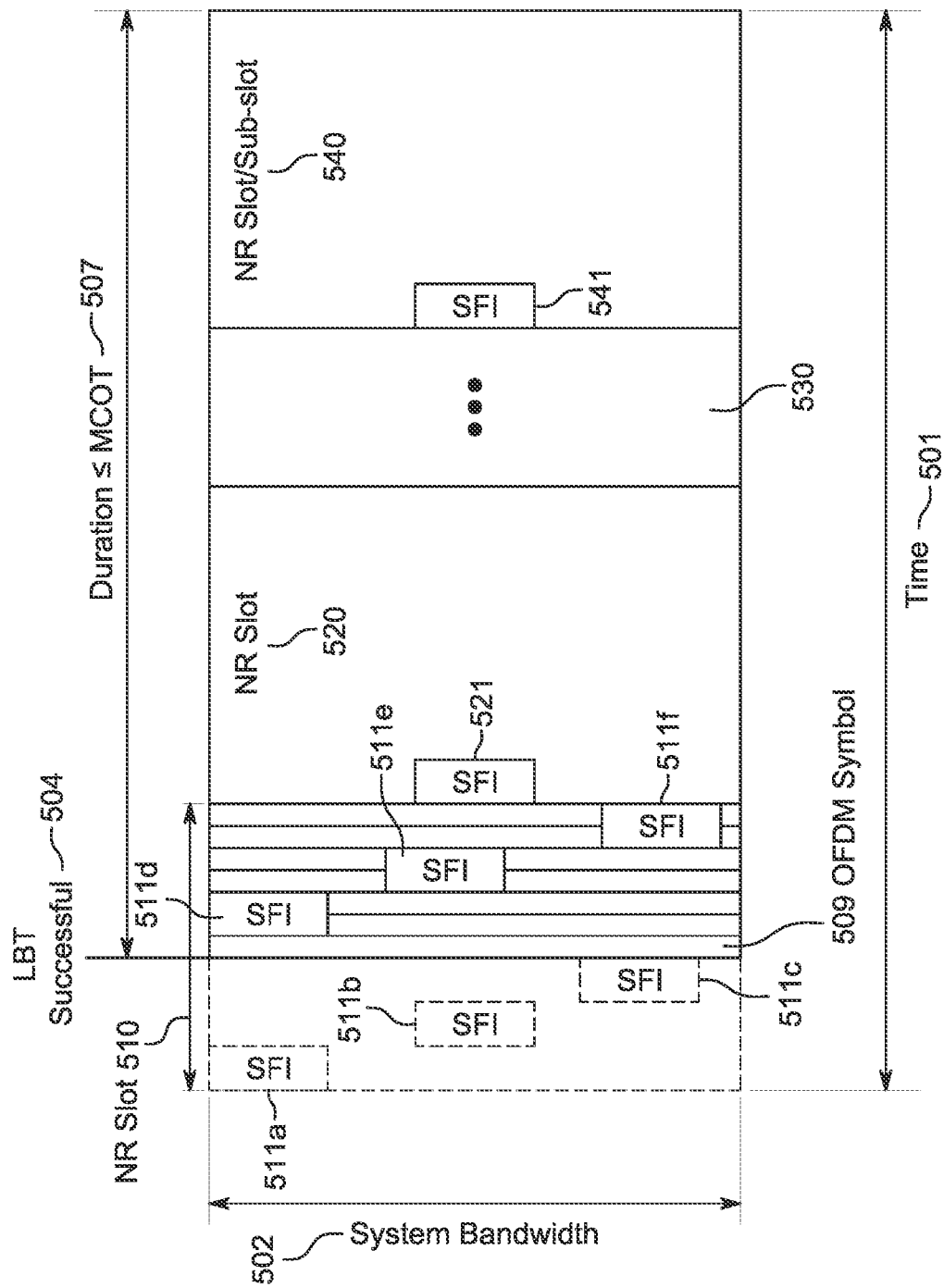
FIG. 5 is a frame diagram illustrating an example of multiple SFI search spaces for accessing an unlicensed channel according to one or more embodiments.

FIG. 5 is a frame diagram illustrating an example of multiple SFI search spaces for accessing an unlicensed channel according to one or more embodiments. Here, a wireless node gets access to the channel in the middle of a slot once the LBT is successful 504. The diagram has a vertical axis of system bandwidth 502 and a horizontal axis of time 501. There may be a number of symbols per slot/sub-slot 509 and is only shown to illustrate that there may only be so many symbols left in the NR slot 510 once LBT is successful. A NR-U gNB may configure each WTRU with several configured search spaces for SFI each at a particular location of a slot (i.e., symbol/bandwidth) just in case LBT is successful 504 part way through. In order to detect a SFI and to parse the subsequent OFDM symbols within a given slot, the location of an SFI (i.e., the GC PDCCH that carries a DCI, such as format 2_0 that carries the SFI) may be preconfigured and known to the wireless receiver node (e.g., WTRU). In NR slot 510, the first configured search space for SFI is 511a, the second is 511b, and so on. In the example shown, due to the consequences of LBT, the NR-U wireless node sender (e.g., gNB) may only be able to access the channel and start transmitting after successful LBT 504, part way through NR slot 510; this would be after the multiple configured SFI locations (i.e., search spaces), SFI 511a-c. In one case, 511d may be the first transmitted SFI, after which within the remaining search spaces for SFIs 511e and 511f no SFI may be transmitted by the gNB and the WTRU may not be expected to search within these subsequent search spaces since it successfully received the SFI from 511d.

In another case, where SFI 511d may be the first transmitted SFI but is missed by the WTRU, the gNB may transmit one or more SFIs in the remaining search spaces 511e and 511f, but in such a case the gNB will adjust the value of the SFI to indicate the adjusted DL/UL symbols after the location of that SFI in the search space. In one instance, the adjustment of the SFIs may be consistent (i.e. there may be no dynamic change in the direction of a symbol within a slot). Also, the search space for an SFI may be the same as the search space for the GC PDCCH. This may assist in increasing the reliability of the SFI transmission.

In NR, a PDCCH may appear in the first three symbols of a slot, however, for NR-U operation and in a sub-slot (e.g., mini-slot) situation, depending on the time that the LBT operation completes, a PDCCH, and particularly the GC PDCCH that carries a DCI (including the specific format associated with SFI), may appear in the first, second, and/or third OFDM symbols after the LBT procedure completion 504.

Figure 6:
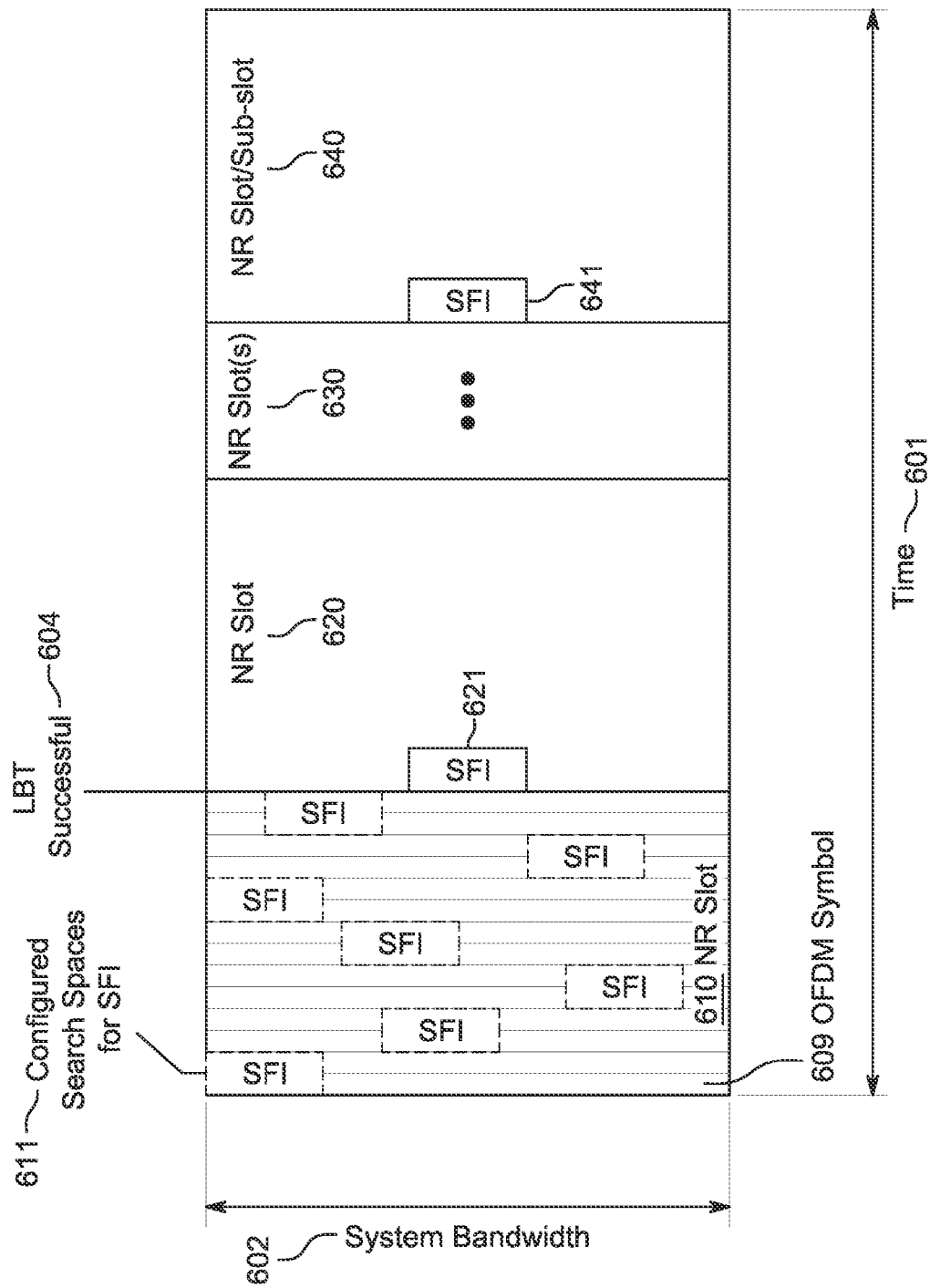
FIG. 6 is a frame diagram illustrating an example of multiple SFI search spaces for accessing an unlicensed channel according to one or more embodiments.

FIG. 6 is a diagram illustrating an example NR-U operation similar to FIG. 5, except the LBT is successful 604 at the beginning of NR slot 620, therefore only one SFI 621 need be transmitted, even though generally there may be a number of search spaces for SFI 611 scheduled prior to a successful LBT 604 and subsequent transmission, as shown in the NR slot 610.

In one implementation, a WTRU or a gNB may commence its transmission after LBT by transmitting a specific sequence or waveform which may provide an indication of the start of the transmission by NR-U devices. Such a specific sequence or waveform may include information to assist other NR-U devices, such as on synchronization or on location of the SFI. The information may pertain to how to interpret locations of needed information, such as synchronization. Alternatively, in order to assist WTRUs that may have drift in their timers, a sequence, waveform, or field(s) may provide information on the current timer of the gNB (e.g., time to the slot boundary, or to the mini slot boundary). The sequence, waveform, and/or field may also provide identifying information of the current mini-slot or sub-slot.

Figure 7:
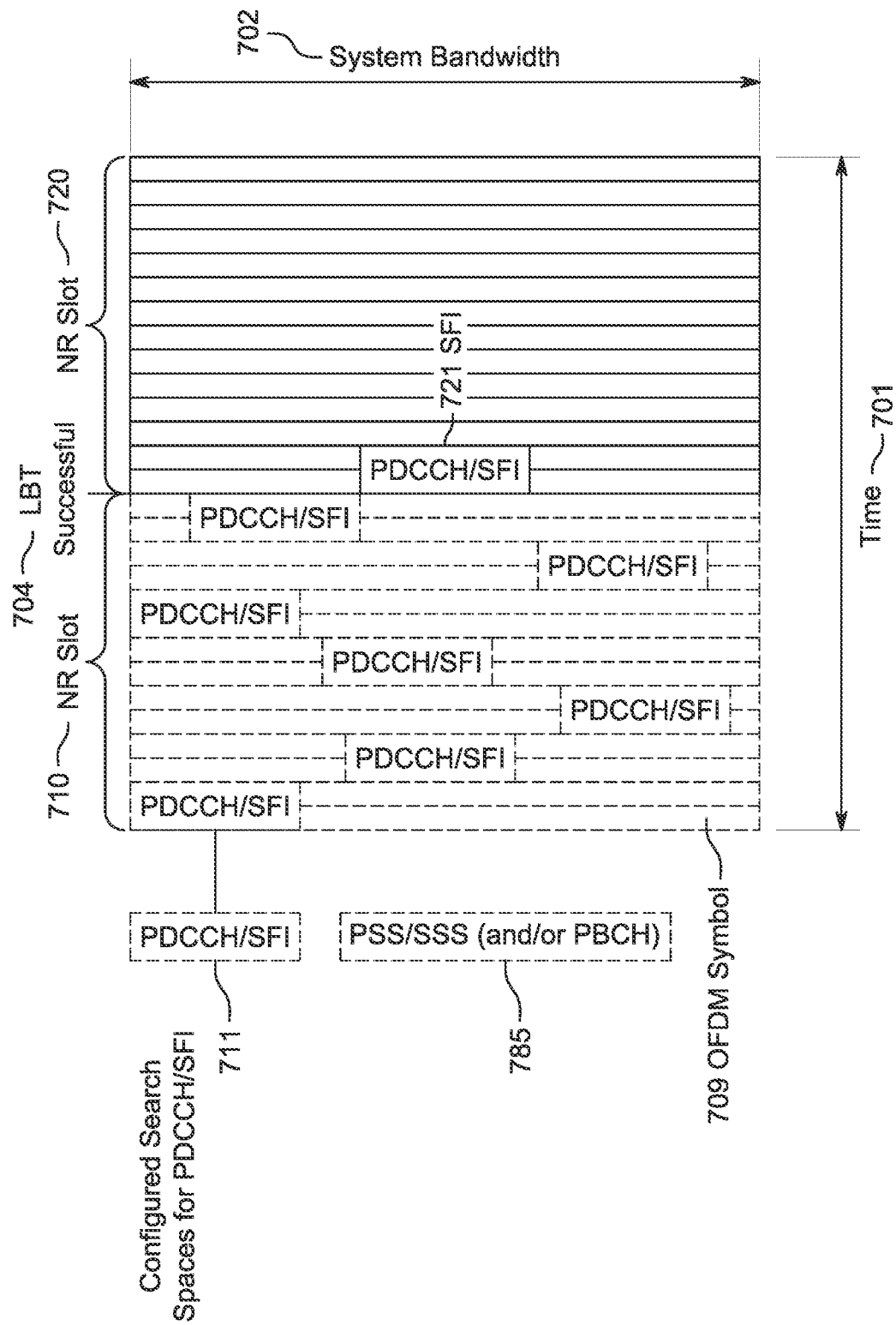
FIG. 7 is a frame diagram illustrating an example of multiple search spaces for accessing an unlicensed channel according to one or more embodiments.

FIG. 7 is a diagram illustrating an example of multiple search spaces for accessing an unlicensed channel according to one or more embodiments. In this example, a gNB may configure multiple search spaces for PDCCH/SFIs within slot 710. The diagram has a vertical axis of system bandwidth 702 and a horizontal axis of time 701. As shown previously, in a first NR slot 710 there may be a number of search spaces 711 that the WTRU may look for a PDCCH/SFI. In one embodiment a synchronization signal block (SSB) (i.e., primary/secondary synchronization signals (PSS/SSS) and/or physical broadcast channel (PBCH) 785) may precede a PDCCH/SFI (WTRU-specific PDCCH and/or group-specific PDCCH). The presence of a PSS/SSS/PBCH 785 may let a WTRU resume search for a potential PDCCH/SFI in the upcoming PDCCH/SFI search spaces right before LBT is successful 704. When the gNB is not transmitting, due to LBT, a WTRU in connected mode may search for PSS/SSS or SSB, which acts as a signal for the WTRU to resume PDCCH monitoring operation in order to detect an upcoming PDCCH/SFI for a given slot. In such a state, if the WTRU detects the PSS/SSS/PBCH 785 then the WTRU may begin monitoring for a PDCCH or a SFI at preconfigured rate/level (e.g., mini-slot). In one case, instead of a PSS/SSS, there may be a (preamble) sequence with desirable attributes that helps with low-complexity and low-power detection by the WTRU. Note that this sequence may offer multi-RAT support and allow for other RATs to identify the start of the gNB transmission.

Figure 8:
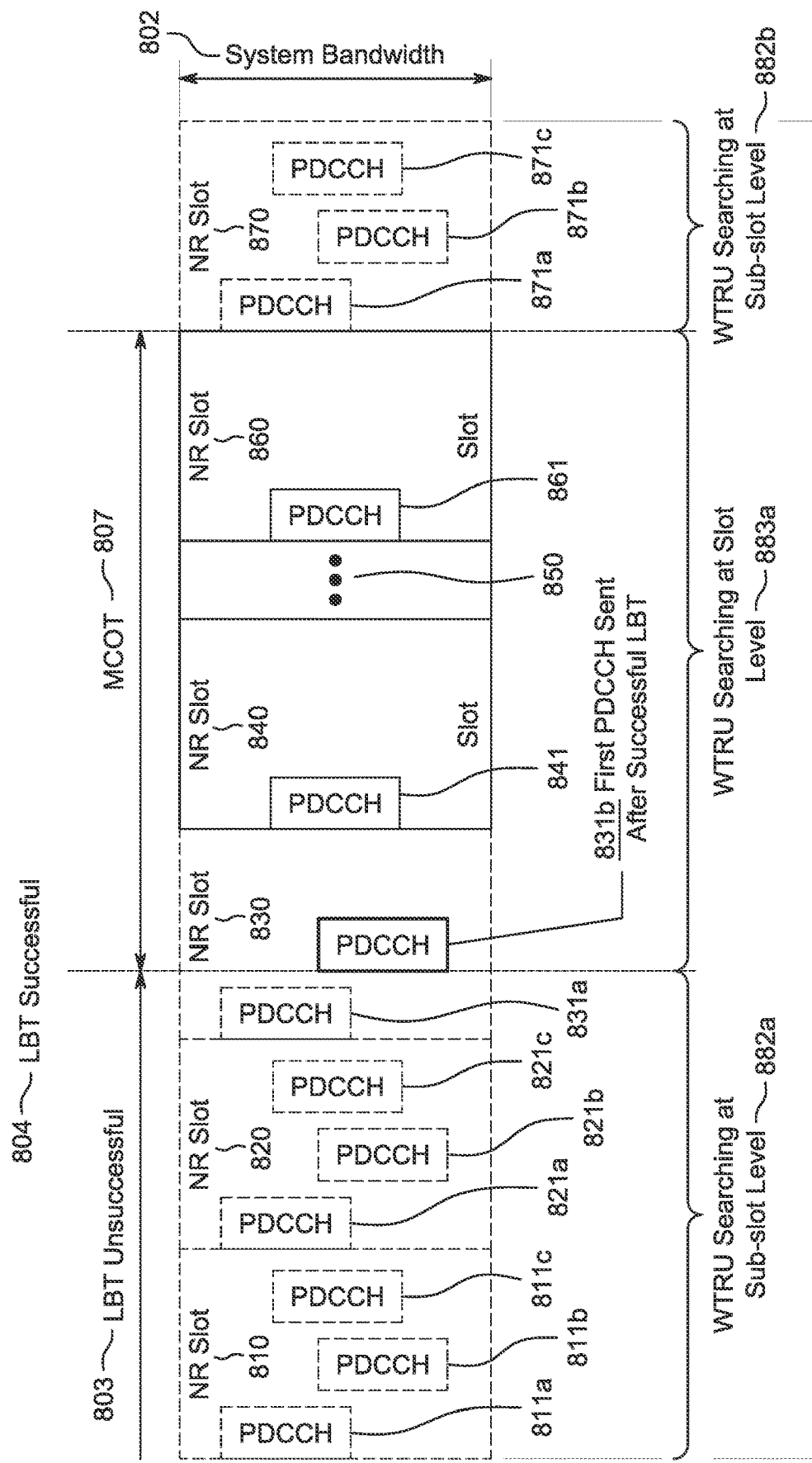
FIG. 8 is a frame diagram illustrating an example of an NR-U operation according to one or more embodiments.

FIG. 8 is a diagram illustrating an example of an NR-U operation according to one or more embodiments. The diagram has a vertical axis of system bandwidth 802 and a horizontal axis of time 801. Just as in FIG. 5, a gNB may achieve a successful LBT 804 in the middle of a NR slot 830, therefore, there may need to be search spaces at a sub-slot/mini-slot level prior to a successful LBT 804. Specifically, a WTRU may be configured to search at a first level/rate 882a (e.g., sub-slot, mini-slot, etc.) prior to a successful LBT 804, and may switch to a second rate/level 883a afterwards. Once the COT/MCOT is over, the WTRU may switch back to searching at the first level/rate at 882b, which may be preconfigured or indicated by the gNB. In this example, there are a number of search spaces for PDCCH (e.g., 811a, 811b, 811c, 821a, 821b, 821c, 831a) in each search space that LBT is unsuccessful, where the PDCCH contains the SFI. In the first PDCCH 831b that is sent after successful LBT, the WTRU may receive the SFI and be configured for the second rate/level 883a. This change in rates/levels of monitoring for a NR WTRU that operates in an unlicensed channel and is in a connected state may be different compared to a NR WTRU not operating in an unlicensed channel. Prior to a successful LBT 804, the NR WTRU operating in an unlicensed channel may not have detected a PDCCH during several slots indicating that the gNB has not completed an LBT procedure successfully because the unlicensed channel is busy and in use in the vicinity of the gNB (e.g., in use by another gNB or WTRU of another inter-RAT or intra-RAT device).

Figure 9A:
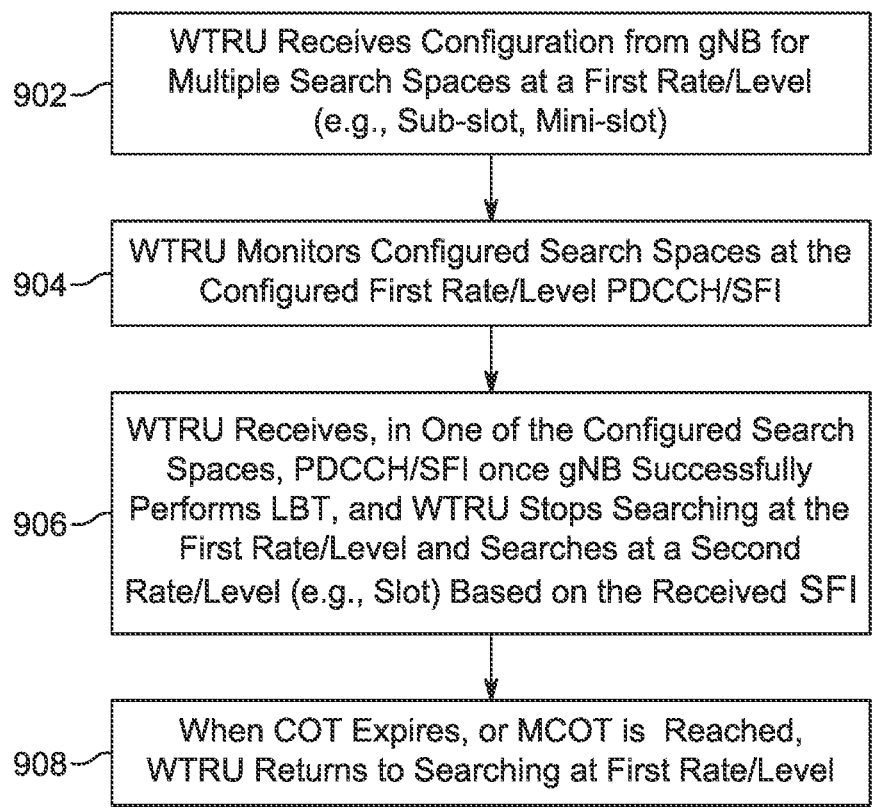
FIG. 9A is a flow chart illustrating an example NR-U process using different rates of monitoring according to one or more embodiments described herein.

FIG. 9A is a flow chart illustrating an example NR-U process using different rates of monitoring according to one or more embodiments described herein. In one embodiment, the process shown may follow certain aspects from the example of FIG. 8. Generally, there may be two wireless nodes, a sender and a receiver. For this example, the sender may be a gNB and the receiver may be a WTRU. At 902, during initial access, the WTRU may receive a configuration from the gNB for a set(s) of search spaces for PDCCH/SFI at a first rate/level (e.g., sub-slot, mini-slot). In some cases, prior to beginning the monitoring, the WTRU may abandon the search for other control messages in their corresponding search spaces. At 904, the WTRU may monitor the configured search spaces (e.g., semi statically) at the first rate/level for PDCCH/SFI. The process of monitoring may involve proceeding to the next configured search space if no PDCCH/SFI is found for a given search space until no search spaces are left for the given slot. The WTRU may be configured to search more than one set of search spaces (e.g., once one set is complete, the WTRU may move on to a second set). Each set of search spaces may be valid for an entire slot, and if no SFI is received, the monitoring may be repeated in the next slot. In some cases, the first PDCCH/SFI may be preceded by a PSS/SSS/PBCH. At 906, the WTRU may receive, in one of the configured search spaces, the PDCCH/SFI which is indicative that the gNB has successfully performed LBT. Based on the received information, the WTRU may stop monitoring at the first rate/level and may monitor at a second rate/level (e.g., slot). At 908, the WTRU may return to monitoring at the first rate/level after the COT expires, or the MCOT is reached. The COT or MCOT may be preconfigured to the WTRU or may be transferred with the PDCCH/SFI.

In one embodiment, the example of FIG. 9A may have reciprocal actions performed from by a gNB. At 902 a gNB may configure a WTRU with multiple search spaces at a first rate/level (e.g., non-slot, sub-slot, mini-slot, slot). At 904 the gNB may successfully perform LBT and transmit a synch signal and/or a PDCCH/SFI to the WTRU. The transmitted information may inform the WTRU to search at a second rate/level (e.g., non-slot, sub-slot, mini-slot, slot) for PDCCH/SFI. At 908, the gNB may stop transmitting or stop being able to transmit when COT expires, or MCOT is reached, at which point, if the gNB has more information that needs transmitting, the gNB may begin the LBT procedure until successful.

In one embodiment, just as shown in FIG. 8, the first rate/level may be a more frequent/faster rate/level than the second rate/level. The first rate/level may be appropriate for an unlicensed NR scenario since the WTRU cannot predict when LBT may be successful, therefore a transmission may arrive in the middle of a slot. The second rate/level may be appropriate for non-unlicensed NR operation (i.e., NR operation). In some embodiments, the first rate/level may only commence once a PSS/SSS/PBCH has been received.

In one embodiment, the gNB may configure one or multiple (possibly dynamic) search spaces for SFI(s) spread across a slot where the first search space for SFI is located at the first one or more OFDM symbols of the slot. When an LBT procedure is completed successfully shortly before the beginning of a slot, an SFI may be transmitted on the first or nearest search space for SFI, and no SFI may be transmitted on the rest of the configured search spaces for SFIs of that slot. A WTRU may be configured with one or multiple (possibly dynamic) search spaces for SFI(s) spread across a slot. A WTRU may attempt to detect an SFI within the first search space for SFI, and if none are detected the WTRU may attempt to detect an SFI within the next search space for SFI and so on. This repetition of attempting to detect may apply to a situation where the LBT is successful, but the WTRU misses the first transmitted SFI, which is why the WTRU may repeat the search process some configured number of times. Correspondingly, in such a situation, the gNB may send the SFI again if the WTRU does not receive it in the first transmission. When the WTRU successfully detects an SFI, the WTRU may not be expected to detect any SFI other search spaces for SFI that are configured within that slot. In subsequent slots after the first slot, the WTRU may be configured to and attempt to detect a semi-static SFIs (e.g., one per slot). A WTRU that attempts to detect an SFI within one of the dynamic search spaces for SFIs may abandon searching within other search spaces configured for PDCCH once an SFI is detected within one of the configured search spaces for GF PDCCH with the specific DCI format for SFI (e.g., format 2_0).

Figure 9B:
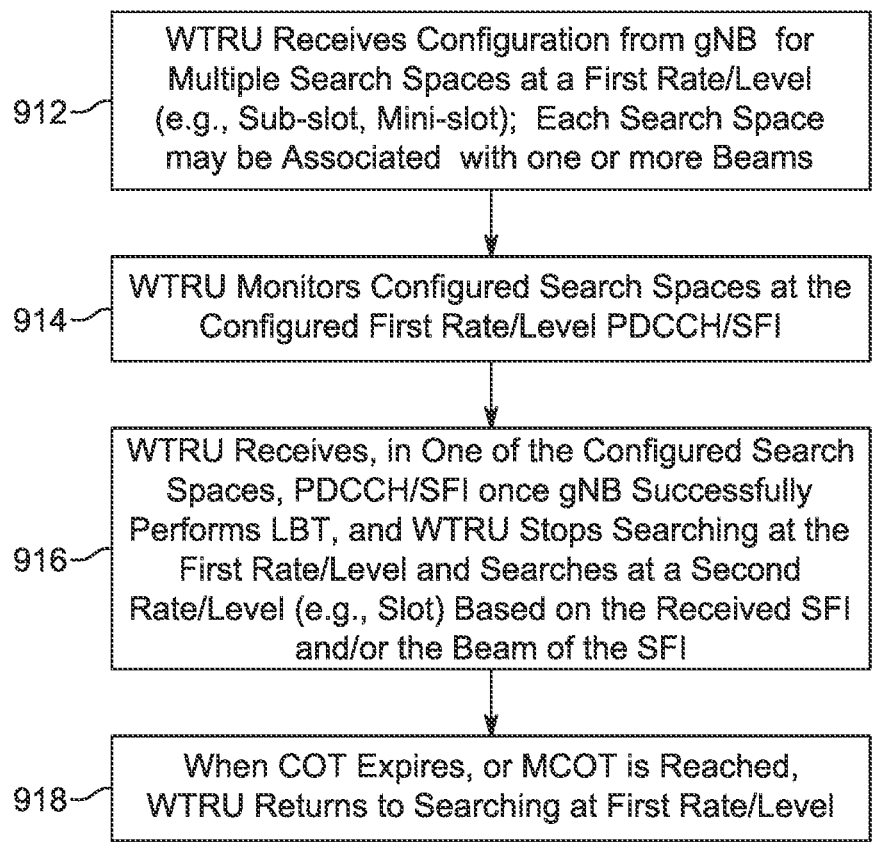
FIG. 9B is a flow chart illustrating an example NR-U process using different rates of monitoring and one or more beams according to one or more embodiments described herein.

FIG. 9B is a flow chart illustrating an example NR-U process using different rates of monitoring and one or more beams according to one or more embodiments described herein. FIG. 9B is similar to FIG. 9A, except that each search space may be associated with one or more beams. In one embodiment, at 902, during initial access, a WTRU may receive a configuration from a gNB for a set(s) of search spaces for PDCCH/SFI at a first rate/level (e.g., sub-slot, mini-slot). The configured search spaces may be semi-statically or dynamically changed by the gNB based on the best beam that the gNB and/or WTRU operate in. The configured search spaces PDCCH/SFI may be a set and the set may be associated with one or more beams. In some cases, prior to beginning the monitoring, the WTRU may abandon the search for other control messages in their corresponding search spaces. At 904, the WTRU may monitor the configured search spaces (e.g., semi statically) at the first rate/level for PDCCH/SFI. The process of monitoring may involve proceeding to the next configured search space if no PDCCH/SFI is found for a given search space until no search spaces are left for the given slot. The WTRU may be configured to search more than one set of search spaces (e.g., once one set is complete, the WTRU may move on to a second set). Each set of search spaces may be valid for an entire slot, and if no SFI is received, the monitoring may be repeated in the next slot. In some cases, the first PDCCH/SFI may be preceded by a PSS/SSS/PBCH. At 906, the WTRU may receive, in one of the configured search spaces, the PDCCH/SFI which is indicative that the gNB has successfully performed LBT. Based on the received SFI and/or the beam of the SFI, the WTRU may stop monitoring at the first rate/level and may monitor at a second rate/level (e.g., slot). At 908, the WTRU may return to monitoring at the first rate/level after the COT expires, or the MCOT is reached. The COT or MCOT may be preconfigured to the WTRU or may be transferred with the PDCCH/SFI.

The procedures as shown in the example of FIG. 9B may have reciprocal steps that take place at the base station side.

In one embodiment, LBT categories may be adjusted based on the NR frame structure. LBT Category 4 may be implemented in LAA/eLAA, and may be used as a scheme for many use cases. In LBT Category 4, the listen duration may be a summation of a fixed interval (e.g., 16 µs) and a random duration that is a multiple of a slot duration (e.g., 9 µs).

However, as shown in FIG. 3, when the listen interval finishes it may not be at the beginning of a slot, and for that reason there is a need for procedures to make efficient use of the channel. Also, when a listen interval finishes, it may not be at the beginning of an OFDM symbol, which may become more pronounced where there are various numerologies, such as in NR where there may be some long OFDM symbol durations (e.g., 33.33 μs and 66.67 μs).

Figure 10A:
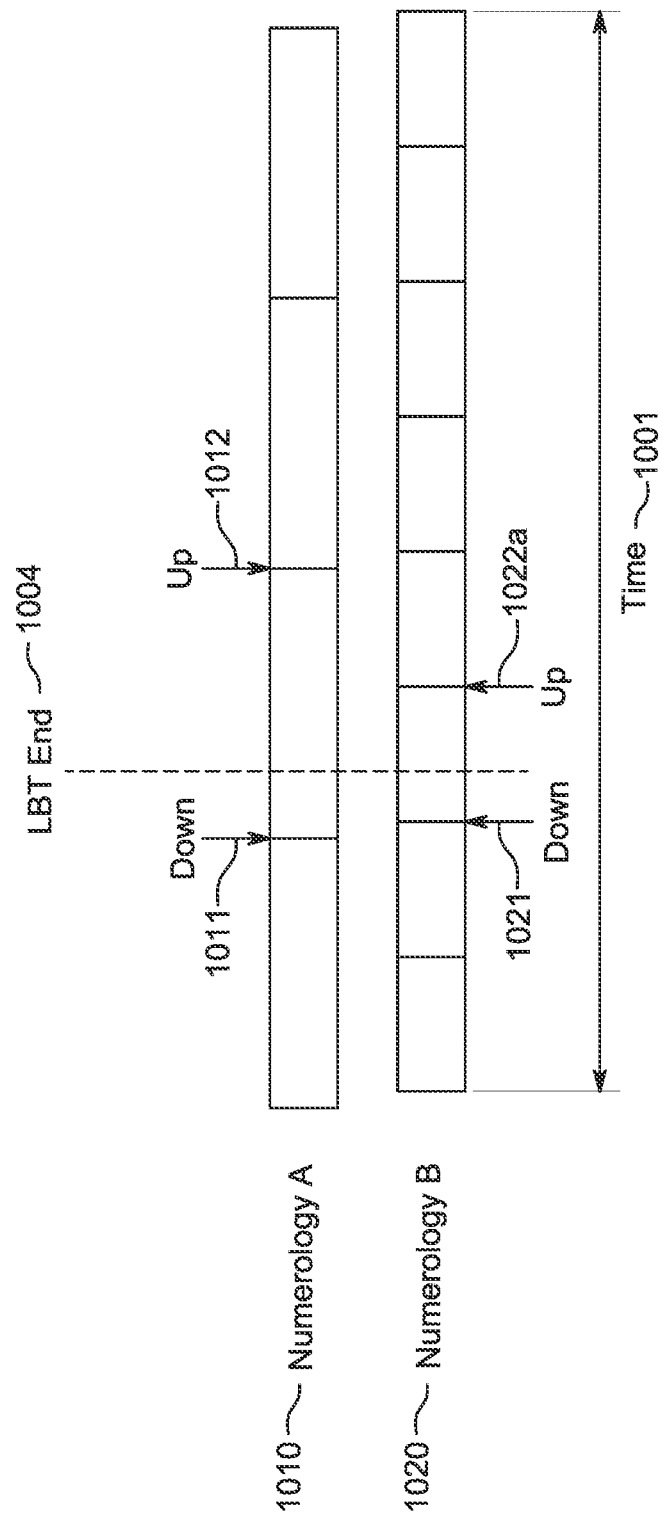
FIG. 10A is a frame diagram illustrating an example of rounding for different numerologies according to one or more embodiments.

FIG. 10A is a diagram illustrating an example of rounding for different numerologies. In one approach, the alignment of LBT's listen intervals may be adjusted to symbol boundaries. Specifically, LBT categories may be altered (e.g., LBT Category 2, 3, or 4), such that when the listen interval is calculated by an NR-U gNB, or an NR-U WTRU, it may be rounded up or down to the nearest OFDM symbol boundary. As shown, there may be two numerologies 1010 and 1020 (i.e., A and B) where each numerology is operated by one or more sets of NR-U wireless nodes, and time 1001 may be shown on the horizontal axis. At point 1004, LBT may be successful (i.e., end). Each numerology may have different parameters (e.g., time, bandwidth, etc.). In either numerology, the round up point or round down point may be the preceding or next symbol. For example, for Numerology A the round down point is 1011 and the round up point is 1012. For Numerology B, the round down point is 1021 and the round up point may be 1022.

The round up/down of the listen interval may depend on the subcarrier spacing that the NR-U gNB operates. Table 3a and Table 3b show examples of round up/down range for each subcarrier spacing numerology. In some situations, only a fraction of the round up/down range shown in Table 3a/3b may be allowed to be used during the operation, particularly when doing the round down operation (e.g. 0.5, 0.25, 0.125 etc. fraction).

TABLE 3a

Example of round up/down range (obtained from OFDM symbol duration) allowed for each numerology for the listen interval of an LBT mechanism to be aligned with the symbol boundary

| μ | Δf = $2^\mu \cdot 15$ [kHz] | OFDM Symbol Duration (μs) | Round up/down range |
|---|---|---|---|
| 0 | 15 | 66.67 | 33.34 |
| 1 | 30 | 33.33 | 16.67 |
| 2 | 60 | 16.67 | 8.33 |
| 3 | 120 | 8.33 | 4.17 |
| 4 | 240 | 4.17 | 2.08 |

TABLE 3b

Example of Round up/down range (obtained from OFDM symbol including CP duration) allowed for each numerology for the listen interval of an LBT mechanism to be aligned with the symbol boundary

| μ | Δf = $2^\mu \cdot 15$ [kHz] | OFDM Symbol Duration (μs) | Round up/down range |
|---|---|---|---|
| 0 | 15 | 71.35 | 35.68 |
| 1 | 30 | 35.68 | 17.84 |
| 2 | 60 | 17.84 | 8.92 |
| 3 | 120 | 8.92 | 4.46 |
| 4 | 240 | 4.46 | 2.23 |

Note that the application of round down operations on a listen interval and the round down range may be restricted in order to maintain fairness among the competing gNBs/RATs operating in an unlicensed channel. However, the round up operation and its range may not be limited since it does not harm other competing nodes, and an NR-U gNB, or an NR-U WTRU, based on its implementation may add to the round up value (e.g., a multiple integer of an OFDM symbol duration or an OFDM symbol with CP duration).

It may follow then that an NR-U gNB, or an NR-U WTRU, may be required to alternate between a round up and a round down operation each time it performs an LBT procedure. Also, an NR-U gNB, or an NR-U WTRU, may be required to alternate between a round up and a round down each time it performs an LBT procedure of a specific category. For example, whenever an NR-U gNB, or an NR-U WTRU, performs an LBT of a given category (e.g., CAT 4), the NR-U gNB, or the NR-U WTRU, may be required to alternate between a round up and a round down compared to the last time the NR-U gNB, or the NR-U WTRU, performed the LBT for that category. Hence, if an NR-U gNB, or an NR-U WTRU, has performed a round down operation in the previous time where an LBT procedure was performed for a specific category, the NR-U gNB, or the NR-U WTRU, may be required to perform a round up operation for the next instance where the LBT procedure is performed for that same category. This may ensure that on average an NR-U gNB, or an NR-U WTRU, accesses the medium in a fair or even manner when performing the round up/down operation and to avoid an NR-U gNB, or an NR-U WTRU, consistently performing a round down operation that would cause an "unfair" advantage to the NR-U gNB, or the NR-U WTRU.

In a type 2 UL channel access procedure the round up/down may also be applied, but given that the listen interval is 25 μs, a fraction of the round up/down range shown in Table 3a/3b may be allowed to be used by a WTRU, where the fraction may be 0.5, 0.25, 0.125 for example. If the UL WTRU uses a Type 2 channel access procedure for a transmission including PUSCH, the WTRU may transmit the transmission including PUSCH immediately after sensing the channel to be idle for at least a sensing interval T_short_ul=5 μs, or a sensing interval of T_short_ul rounded up/down by a fraction of the range shown in Table 3a/3b. T_short_ul may comprise of a duration T μs f=16 immediately followed by one slot duration T_sl=9 μs and T_f includes an idle slot duration T_sl at the start of T_f. The channel may be considered to be idle for T_short_ul if it is sensed to be idle during the slot durations of T_short_ul. In Type 1 UL channel access procedure, the round up/down may also be applied to adjust the listen interval using a fraction of the round up/down range shown in Table 3a/3b, where the fraction may be 0.5, 0.25, or 0.125 for example. Another option may be to round up or down based on a randomized process with some predetermined probability (e.g., 0.5, where half the time it is rounded up and the other half it is rounded down).

For NR-U operation where μ=0 or 1 the round up/down range may be set to a single range of 33.34 μs (or 35.68 μs) which is the range for the narrower sub-carrier spacing of 15 KHz. For NR-U operation where μ=1 or 2, the round up/down range may be set to a single range of 16.67 μs (or 17.84 μs) which is the range for the narrower sub-carrier spacing of 30 KHz. This may allow a fairer or more even round up/down operation when gNBs/WTRUs with both sub-carrier spacing operate within each other's coverage within the same unlicensed channel, or within multiple unlicensed channels but with overlapping channels.

In a scenario where competing nodes (e.g., gNBs from the same or different operators) have different symbol durations, or sub-carrier spacing, the gNB with the smaller symbol duration, or larger sub-carrier spacing, may access the channel with higher priority due to the smaller symbol duration when rounding even though they may access the channel at the same time. This is illustrated in the example shown in FIG. 10A.

Randomizing the direction of the rounding may reduce the statistical unfairness although one of the numerologies may have an advantage depending on the direction of the rounding.

Figure 10B:
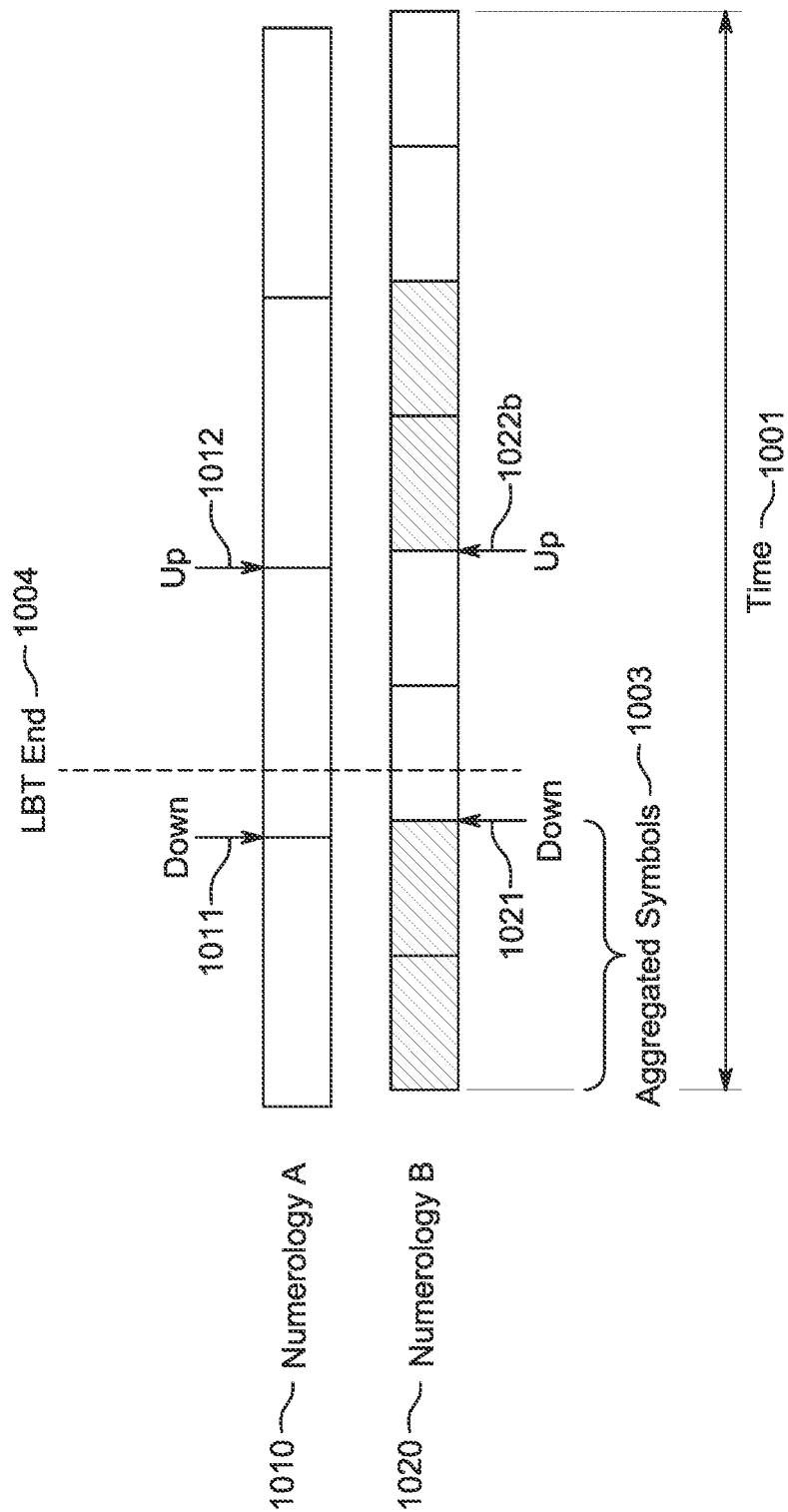
FIG. 10B is a frame diagram illustrating an example of rounding for different numerologies with aggregated symbols according to one or more embodiments.

Alternatively, WTRUs/gNBs may round on aggregate symbols, created by aggregating adjacent symbols together to ensure that they have equal numerologies. FIG. 10B is a diagram showing an example structure for an NR-U operation after an LBT procedure is completed successfully according to one or more embodiments. As shown, the example is similar to FIG. 10A, except that in the smaller Numerology B, the aggregated symbols 1003 are shown in the diagonally crossed blocks. To enable this example procedure, the gNBs may need to identify aggregated symbol rounding numerology. This may be from over-the-air (OTA) negotiation with other gNBs in the band or may be by communicated through an X2 interface. The procedure may have each WTRU acquire the aggregated symbol rounding numerology. This may be fixed based on the largest symbol, or on the largest OFDM symbol used by gNBs in the same vicinity. Still further, this may be acquired from the gNB on initial access by L1, L2, or L3 signaling. Once the WTRU performs an LBT, the WTRU may then identify its position in the slot/subframe. From there, the WTRU rounds up/down its LBT end to the aggregated symbol boundaries (i.e., 1021 or 1022b). The WTRU transmits from that boundary if the medium is available. The WTRU may adjust to rounding up/down from LBT if it experiences lower than its fair share of medium access. The WTRU may decide to round up or down based on its traffic priority. The WTRU may update its rounding up/down of LBT based on parameters announced by its gNB.

Figure 11:
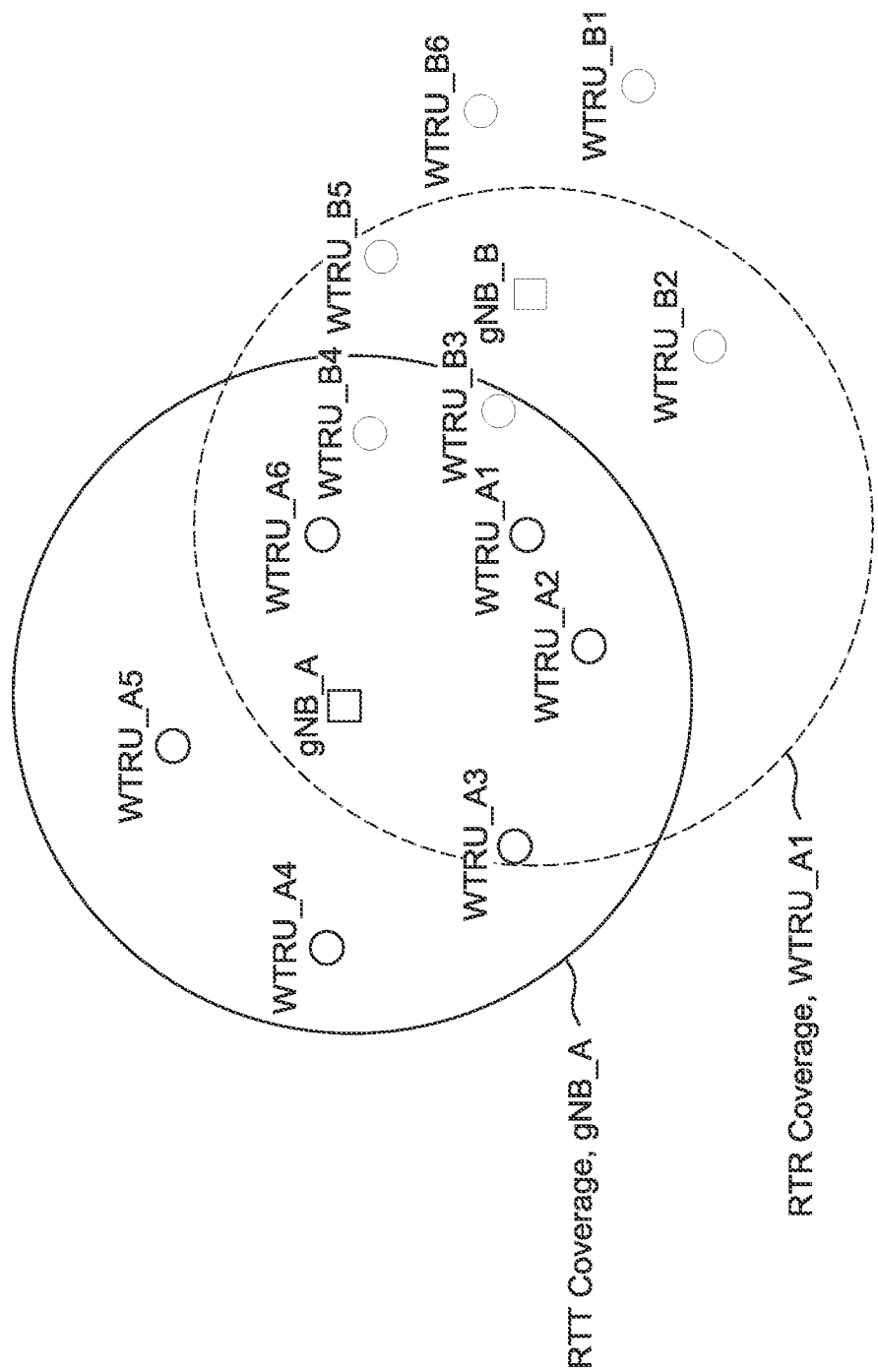
FIG. 11 is a diagram of a wireless system illustrating an example arrangement of wireless nodes operating in an unlicensed spectrum as it relates to a request to transmit and receive handshaking.

FIG. 11 is a diagram illustrating an example arrangement of wireless nodes operating in an unlicensed spectrum as it relates to a request to transmit and receive handshaking according to one or more embodiments described herein.

In one embodiment, there may be a request to transmit and receive handshaking, such as handshaking exchanges between a gNB and WTRUs after a LBT procedure. Once a NR-U gNB accesses a channel after a successful LBT procedure, the gNB may transmit in one or more NR slots during the MCOT. During this period, a gNB may send DL data via the PDSCH to WTRUs or schedule UL data via the PUSCH for WTRUs. However, due to an LBT requirement, there may be no guarantee that a WTRU can make use of a scheduled PUSCH resource, and it may also not be guaranteed that a WTRU can send HARQ-ACK/NACK to a PDSCH that has been received. This is because the WTRU may also have to perform LBT at its side before transmitting any signal. In some cases, transmissions of narrow-band and short duration signals may be exempted. Due to this situation, the gNB may acquire information concerning the condition of the WTRUs before engaging in DL data transmission or scheduling UL data transmission. For example, a handshake exchange may address this situation with a procedure for a gNB(s) and one or more of its WTRUs where the gNB obtains the information for which WTRU channel is clear after performing an LBT procedure successfully.

A Request to Transmit (RTT) is a control message that a gNB may send to one or more WTRUs to inform the WTRUs, and possibly other gNBs around, that the gNB may have successfully completed an LBT procedure and is about to send a NR control or data channel. The RTT may be indicated via a specifically-designed format of DCI in a PDCCH or GC PDCCH. The RTT may indicate to one or more WTRUs and expect an immediate response from those WTRUs, where the response is interpreted as "Channel available" and "Channel unavailable". The RTT may also be referred to as Request to Send, Request to Reserve, or Request for Reservation. The DCI format that carries the RTT message may be CRC scrambled by an RNTI that is known to one or more WTRUs, and may also include the total duration of the NR slots that the gNBs is about to continuously send (i.e., the MCOT or shorter).

A Request to Receive (RTR) is a control message that a WTRU may send to indicate to its gNB that the unlicensed channel is clear and available at the WTRU's side based on performing a medium sensing and LBT procedure. The RTR may be indicated via a specifically-designed PUCCH. In one case, a responding WTRU may send RTR even if the LBT procedure does not complete successfully, which may indicate that the channel around the WTRU is in use by another NR-U/RAT device and may be interpreted by the gNB as the channel is unavailable at the WTRU side. As an example, using a similar PUCCH format as the PUCCH format 0 is used for RTR transmission, when a WTRU completes the LBT successfully then it sends the sequence associated with an ACK, which may indicate that the channel is idle and available at the WTRU side, and when a WTRU does not complete the LBT successfully then it may send the sequence associated with NAC, which may indicate the channel is not idle and unavailable at the WTRU side. The RTR may also be referred to as Clear to Send, Response to Reserve, or Response to Reservation.

As shown in the example of FIG. 11, gNB_A may transmit a RTT, which could be WTRU-specific or a broadcast control message, that indicates the intention for DL or UL in the near future for one or more WTRUs (i.e., WTRU_A1-5). Then the intended WTRU, WTRU_A1, after performing appropriate LBT, may send RTR, indicating to gNB_A that LBT is clear at the WTRU_A1 side (e.g., WTRU_A1 detected nothing from all of the wireless nodes within its coverage). Additionally, other intra- or inter-RAT devices that happen to receive, and may decode, the RTR message within the WTRU_A1 coverage may refrain from using the unlicensed channel based on receiving the RTR from WTRU_A1.

Figure 12A:
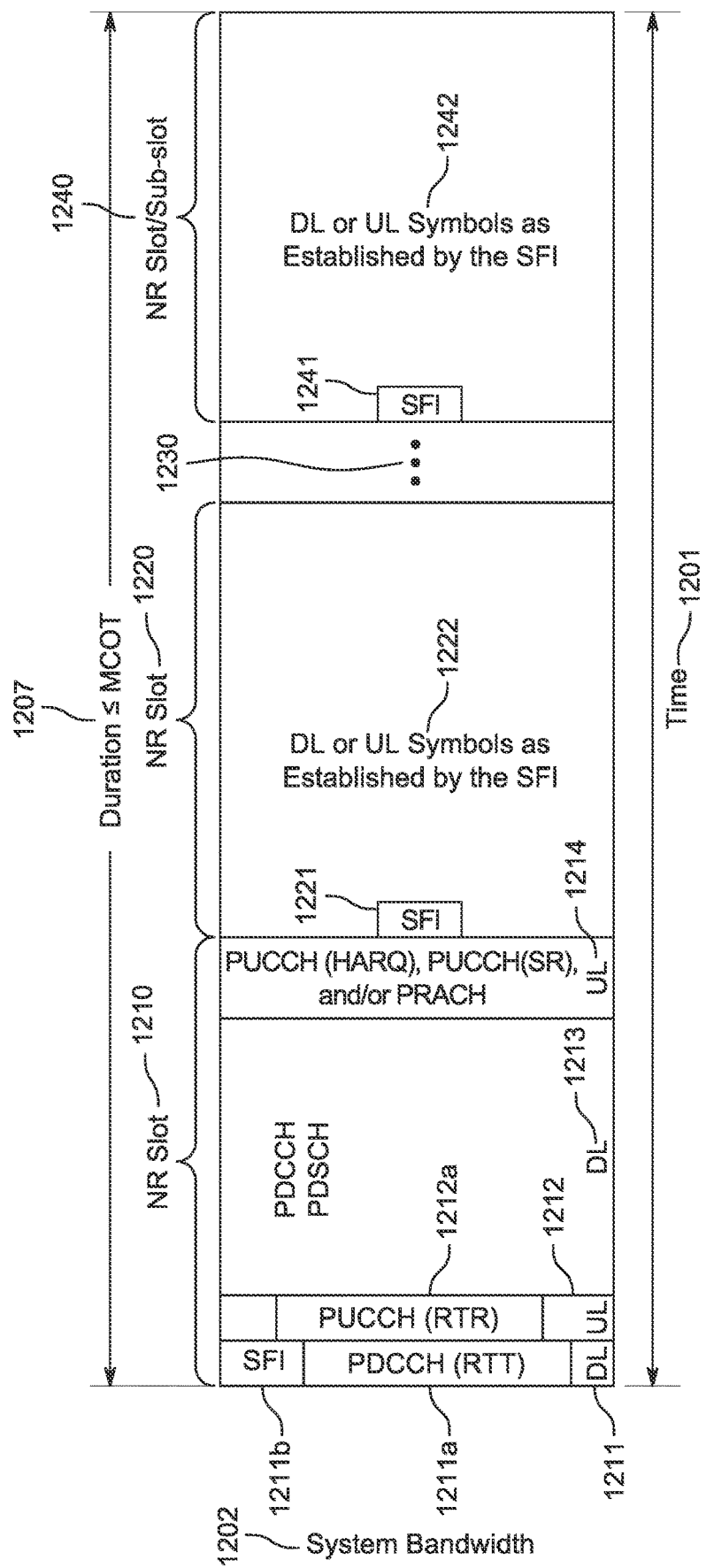
FIG. 12A is a frame diagram illustrating an example of NR-U operation with request to transmit and receive handshaking according to one or more embodiments.

FIG. 12A is a frame diagram illustrating an example of NR-U operation with request to transmit and receive handshaking according to one or more embodiments. For FIG. 12A-D, it may be assumed for the sake of illustration that the LBT procedure is completed successfully at the gNB side prior to the first illustrated slot, as discussed herein, which makes the entire transmission limited to the MCOT 1207. As shown, time 1201 may be shown in the horizontal axis organized in a series of slots, or the like, and system bandwidth (BW) 1202 may be shown in the vertical axis.

The SFI (e.g., 1211b, 1221, 1241) may indicate the configuration of DL/UL symbols of the slots (e.g., 1210, 1220, 1240). For illustration purposes, there may be more or less slots as shown; for example, 1230 may represent un-shown additional slots or sub-slots. The PDCCH 1211a shown in the first DL region 1211 of the first slot 1210 may include an RTT message for the identified WTRU(s) therein, and may specify an upcoming PUCCH (e.g., 1212a or 1214) resource where one or multiple WTRUs can use to send a specific signaling that is interpreted as an RTR message. Note that the presence of the middle DL symbols 1213 of the first slot 1210 may depend on its duration (i.e., if it is a sub-slot, slot, or the like).

There may be several configurations of the frame structure for NR-U that vary slightly from what is shown in FIG. 12A. Generally, depending on the duration of the sub-slot and/or when the LBT procedure is completed, the UL symbols may be placed right before the start of the next slot, in which case the sub-slot may comprise of one of more DL symbols right after the completion of the LBT procedure, followed by none, one, or multiple flexible symbols, and finally followed by the one or more UL symbols. In a similar situation, a sub-slot may comprise of one or more DL symbols right after the completion of the LBT procedure, followed by none, one, or multiple flexible symbols, followed by one or more UL symbols, and finally followed by one or multiple flexible symbols. The presence of the flexible symbols may depend on the type of WTRUs and whether the set of WTRUs that a gNB communicate with are capable of switching from downlink (i.e., when reception circuits are involved) to uplink (i.e., when transmission circuits are involved) quick enough so that no gap (e.g., mostly indicated by flexible symbols) is needed, a short gap (e.g., one flexible symbol) may be needed, or a longer gap (e.g., multiple flexible symbols) may be needed. The gNB may exercise its choice of the number of flexible symbols based on the type of the WTRUs it communicates with and this choice, along with indications for other UL and DL symbols, may be communicated in the SFI.

Figure 12B:
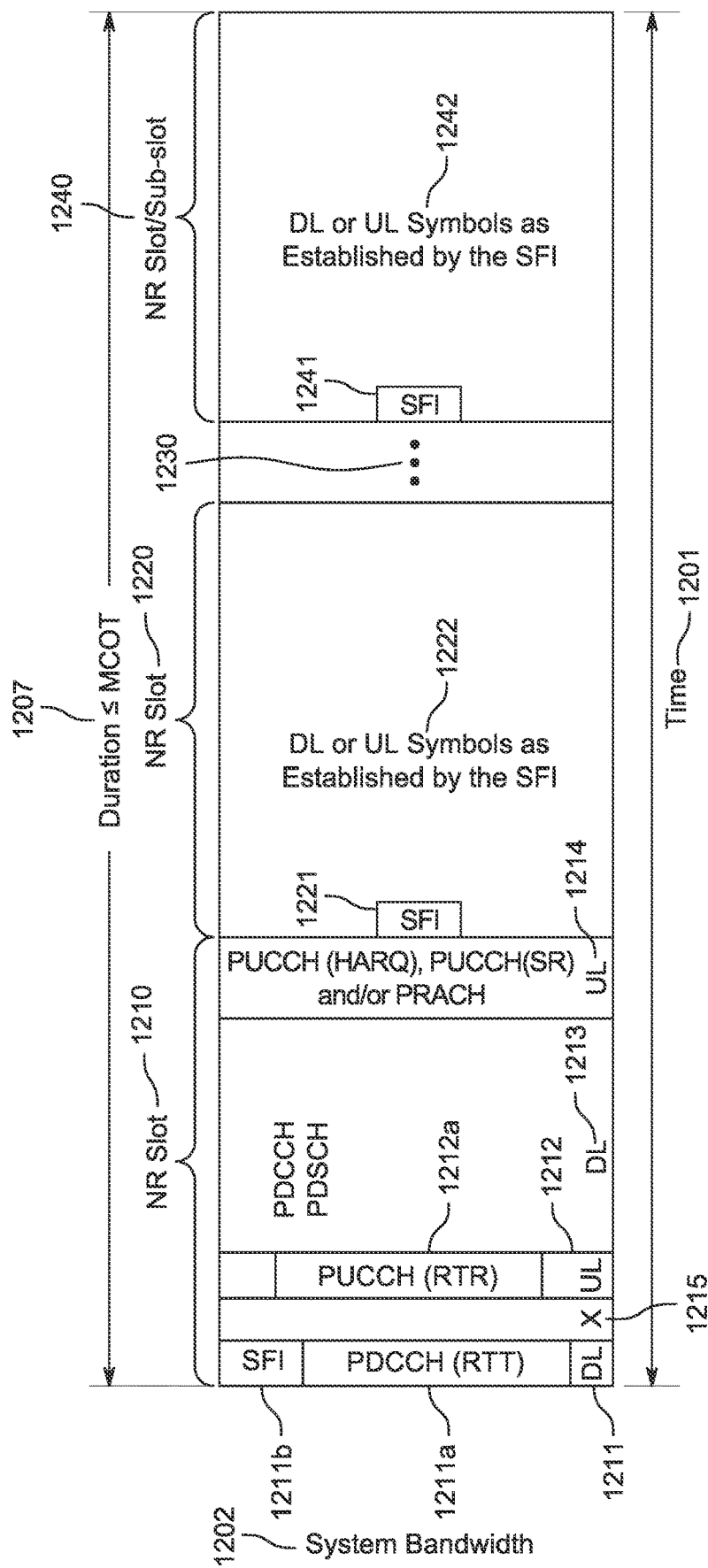
FIG. 12B is a frame diagram illustrating an example of NR-U operation with request to transmit and receive handshaking according to one or more embodiments.
Figure 12C:
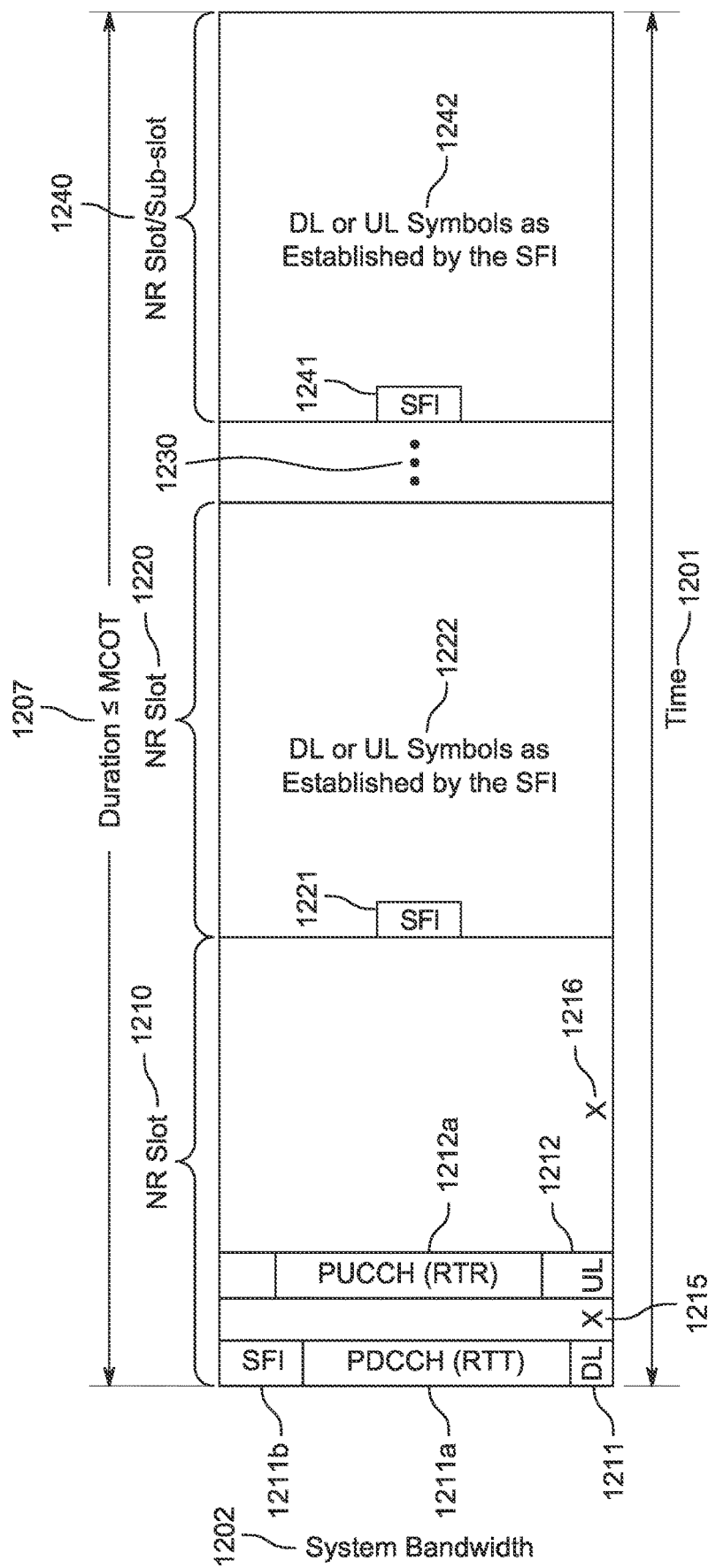
FIG. 12C is a frame diagram illustrating an example of NR-U operation with request to transmit and receive handshaking according to one or more embodiments.

In one example looking at FIGS. 12B and 12C, which are variations of the FIG. 12A, there may be a tight DL and UL exchange in the first slot/sub-slot after a successful completion of an LBT procedure. However, depending on the complexity of the gNB and the WTRUs, there may be flexible OFDM symbols 1215 between the DL 1211 and UL 1212 symbols as shown. Between the first DL symbols and the second UL symbols, where there may be one or more flexible symbols 1215, the gNB may not transmit and assist the WTRU(s) to perform a LBT procedure on their side before transmitting the PUCCH 1212a.

In one example, depending on when the LBT procedure completes successfully, the length of the sub-slot may be short and the NR-U gNB may find it more appropriate to have additional flexible symbols after the UL symbols as shown in the example of FIG. 12C. Specifically, the second set of flexible symbols 1216 in the first slot 1210 may be short enough to avoid other competing gNBs/RATs to complete an LBT procedure. If for some reason, the duration of the flexible period 1216 is long enough to be perceived by other gNB/WTRUs as an idle channel, to prevent acquisition of the channel by other gNBs/WTRUs or other RATs, the gNB may transmit energy in the channel during the flexible symbol period, or schedule PDCCH/PDSCH for one or more WTRUs or for a dummy WTRU in order to keep the time reserved for their communication.

In one embodiment, after a successful completion of an LBT procedure, an NR-U gNB may send a GC PDCCH within the first few OFDM symbols.

The PDCCH may carry a specific format of DCI indicative of RTT within which a set of information helpful for other nearby competing gNBs may be carried such as the duration of the transmission in number of OFDM symbols or a duration in units of us or in units of a specific μ (e.g., for μ=4). The DCI format 2_0 used to carry SFI may be extended to carry the above set of information.

The PDCCH may carry other information helpful for the nearby competing gNBs that belong to the same operator are carried, such the average load or duty cycle of the gNB or the like, possibly within a different format of DCI, such as with CRC scrambled by an RNTI that is known among such group of gNBs (e.g., gNBgroup-RNTI).

The PDCCH may carry a specific DCI used to carry information for one or more WTRUs or a group of WTRUs. This DCI may carry an indication for PUCCH resources, for the same slot where the specific format of the PUCCH is, for a binary response from WTRUs (e.g., PUCCH format 0 that is for HARQ-ACK or NACK response). This DCI may be CRC scrambled by an RNTI that is specific to a WTRU or is specific to a group of WTRUs. When the DCI is CRC scrambled by an RNTI that is specific to a WTRU, then there may be multiple of these DCIs within the PDCCH. Such DCI(s) may also carry an RTR indication that indicates the identified WTRUs are expected to respond within the specified resource (e.g., the specified PUCCH resource). For example, an identified WTRU may perform an LBT procedure and send one of the assigned sequences to indicate that the channel on the WTRU side is idle (e.g., sends the assigned sequence for HARQ-ACK) or sends the other assigned sequence to indicate that the channel on the WTRU side is not idle (e.g., sends the assigned sequence for HARQ-NACK). Such a response from a WTRU may be referred to as an RTR response/indication. The need to perform an LBT procedure or not, the LBT category, and the required counter for LBT may also be indicated by the gNB within this DCI format, hence such information may be specific to a group of WTRUs whose RNTI is used to CRC scramble the DCI, or may be specific to a WTRU whose specific RNTI is used to CRC scramble the DCI. The specific RNTI for a WTRU for such RTT/RTR exchange maybe referred to as RTT-RNTI.

If the gNB does not receive any RTR indication from one or more of the identified WTRUs, the gNB may not send any PDSCH to those WTRUs that have failed to respond with RTR. If the gNB does not receive any RTR indication at all, the gNB may send RTT to another set of WTRUs. This may be done by terminating the COT and accessing the channel by initializing the LBT procedure anew.

In one situation, a WTRU may attempt to detect an SFI within one of the configured search spaces for SFI (i.e., that is configured for the first slot). Note that the search space for SFI may be the same as the search space for GC PDCCH. After detection of a first SFI, the WTRU may attempt to decode the GC PDCCH that carries the DCIs for RTT and RTR. If the WTRU detects the DCI carrying an RTT indication (e.g., where the DCI is CRC scrambled by an RNTI that is specific to the WTRU, the RTT-RNTI, or scrambled by one of the group RNTIs), the WTRU may prepare to transmit within an indicated PUCCH resource (e.g., RTR response). The WTRU may also retrieve other information within the DCI such as: an indication regarding whether the WTRU shall perform an LBT procedure or not; the LBT category; and, the required counter for the LBT procedure. If the WTRU detects an RTT indication, the WTRU may transmit within the indicated PUCCH (i.e., RTR indication) if the LBT condition at the WTRU side is satisfied using a first assigned sequence, such as the HARQ-ACK sequence assigned to the WTRU PUCCH, or the sequence that is assigned to the WTRU for a Scheduling Request (SR). If the LBT condition at the WTRU side is not satisfied the WTRU may not respond at all, or, if specified by the gNB, the WTRU may send a second assigned sequence within the assigned PUCCH such as the HARQ-NACK sequence assigned to the WTRU PUCCH. In some use cases the LBT condition at the WTRU side may not be needed to verify if it is indicated by the gNB.

Figure 12D:
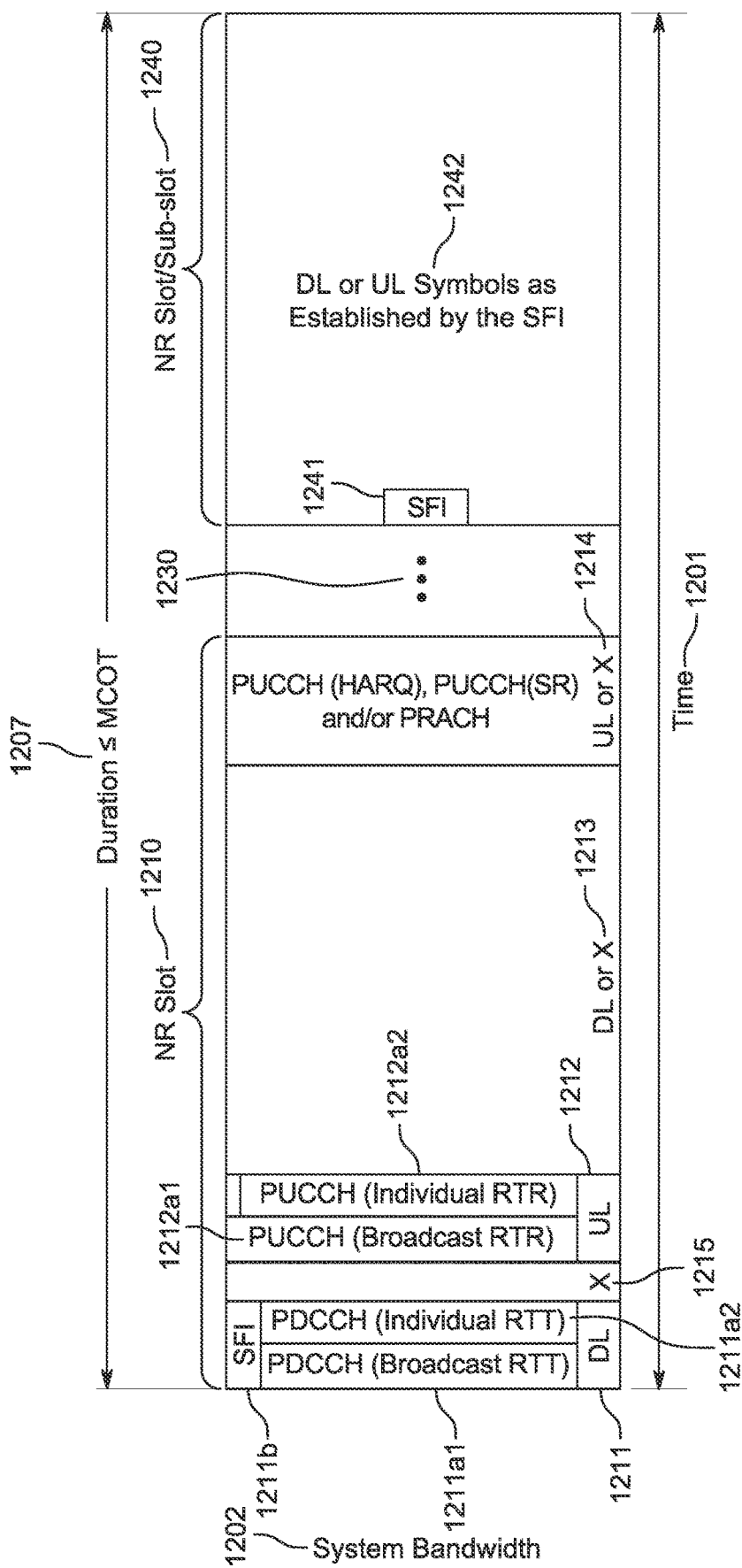
FIG. 12D is a frame diagram illustrating an example of NR-U operation with request to transmit and receive handshaking according to one or more embodiments.

FIG. 12D, which is a variation of FIG. 12A, shows an example situation where an NR-U gNB engages in RTT/RTR handshaking with its WTRUs, however, the RTT and RTR indications may have a special structure. Specifically, the RTT indication may be carried in two parts (i.e., 1211a1 and 1211a2).

From the perspective of the gNB, the first part of an RTT 1211a1, labeled as broadcast RTT, may act as a broadcast message and may be an announcement that carries some information about medium access that can be detected by all WTRUs as well as competing NR-U gNBs (e.g., in order to enhance the channel reservation procedure among competing NR-U nodes). This information may be carried in a specific format of DCI indicative of broadcast RTT (a.k.a. primary RTT) and the information may include the duration of the transmission in a number of OFDM symbols, in a number of units of μs, or a number of units of OFDM symbols of a specific number (e.g., μ=4). The DCI format 2_0 used to carry SFI may be extended to carry the above set of information. Also, within an RTT broadcast, or within a different format of DCI with CRC scrambled by an RNTI that is known among such a group of gNBs (e.g., gNBgroup-RNTI), other information helpful for the nearby competing gNBs that belong to the same operator may be carried, such as the average load or duty cycle of the gNB, or the like. This information may help the cooperating NR-U gNBs to balance their channel access in a manner where the load of the gNBs may be balanced for the long-term.

The second part of RTT 1211a2, labeled as individual RTT (a.k.a. secondary RTT), may address individual WTRUs where all WTRUs are expected to detect and decode this part. If a WTRU is identified in this part, it may be expected that it responds with RTR as described herein. The details of the individual RTT may be similar to the description as disclosed herein where a specific DCI is used, to carry information for one or more WTRUs or a group of WTRUs, that carries an indication for PUCCH resources for the same slot where a format of PUCCH is used, such as PUCCH format 0 for HARQ=ACK/NACK or a PUCCH format for Scheduling Request (SR).

Referring to FIG. 12D, from the perspective of a WTRU, the RTR may be in two parts for a given RTT. The first part of the RTR response 1212a1 (a.k.a. broadcast RTR, primary response) may be a broadcast response and comprise a control message that is the same across all the WTRUs responding to a given RTT, and may be transmitted in a PUCCH or in a PUSCH resource as scheduled by the gNB. This control message may be encoded similarly across all the WTRUs and may be combined over the air before arriving at a receiver (e.g., at the receiver of a competing gNB or at the receiver of a competing WTRU belonging to a different NR-U gNB). This part of the RTR may indicate to nearby competing NR-U gNBs that an RTT/RTR exchange has been performed successfully (i.e., the intent of the broadcast RTR may be to let other competing gNBs/WTRUs, that happen to be in the vicinity of the WTRU, know about the beginning of the usage of the unlicensed channel by an NR-U device). This part of the RTR may also carry a time interval, that is calculated based on the time interval from the RTT, and may help a competing NR-U gNB find out how long the channel is going to be busy. It may also include other information from RTT. In some embodiments, the first part 1212a1 may only be sent by the WTRUs that have completed the LBT procedure successfully at their side, such as the WTRUs that have sensed the channel to be idle (e.g., for a given LBT category) at their side, otherwise the WTRU may not transmit the RTR broadcast response.

The broadcast RTR may be encoded with a set of pre-configured attributes such that other competing gNBs and WTRUs can detect and decode it. For example, all WTRUs may use a pre-configured cell-ID and RNTI to encode the broadcast RTR (i.e., the CRC scrambled by an RNTI that is known among all gNBs/WTRUs or known among a preferred group of gNBs that belong to an operator or set of operators)

The broadcast RTR response may be expected to be detected by competing gNBs/WTRUs where they may not have the same timing as the transmitting gNB and the WTRUs. The broadcast RTR part may be designed to have a code-based structure similar to NR PUCCH format 0 but speared across a wider bandwidth to make detection easier. For instance, a computer-generated sequence (CGS) or Zadoff-Chu sequence, or a computer-generated CAZAC sequence, may be designed for this purpose. One or more of such sequences or one or more cyclic shifts of a given sequence may be assigned for RTR broadcast response where each sequence is mapped to indicate a value for the duration of the channel occupancy time. The channel occupancy time may be established and given by the NR-U gNB in the previous broadcast RTT and the responding WTRUs may use this value to choose a corresponding sequence or a corresponding cyclic shift of a sequence.

As shown in FIG. 12D, the second part of the RTR 1212a2 may be an individual response (a.k.a. individual RTR, secondary response) and a unique response by each WTRU may be transmitted as discussed herein, such as by using a PUCCH format 0 resource and sending one of the two allocated sequences to indicate, using a given LBT category, whether the channel is idle at the WTRU side or whether the channel is busy. Alternatively using a PUCCH resource, similar to the one used for the scheduling request (SR), and transmitting the sequence to indicate, using a given LBT category, that the channel is idle at the WTRU side.

Depending on the design of the broadcast/individual (1212a1/1212a2) response of the RTR, they both may appear in the same OFDM symbol(s) but may be interlaced in the frequency domain. In another design, the broadcast response 1212a1 may appear at a first OFDM symbol and the individual response 1212a2 may appear in a second OFDM symbol, where the second OFDM symbol may come right after the first OFDM symbol. In another design, the individual response 1212a2 may appear in a first OFDM symbol and the broadcast response 1212a1 may appear in a second OFDM symbol (not shown), where the second OFDM symbol may come right after the first OFDM symbol. In order to let all other competing NR-U gNBs/WTRUs detect and decode the broadcast response of an RTR, the encoding location of a broadcast response may be known. In one design, a few fixed search spaces may be assigned for broadcast RTR and enable a gNB to identify one of the broadcast RTR search spaces to be used by all the responding WTRUs for a given RTT indication. A competing NR-U gNB or WTRU may search among the candidate search spaces for the broadcast RTR in order to detect a potential broadcast RTR (e.g., coming from nearby competing WTRUs).

In an embodiment, the broadcast RTR may include some or all components of a synchronization signal block (SSB) (i.e., primary/secondary synchronization signals (PSS/SSS) and/or physical broadcast channel (PBCH)). The WTRU may transmit some or all components of an SSB in the resource that is scheduled by its gNB for the broadcast RTR. In addition to the above discussed intent for broadcast RTR, the inclusion of PSS/SSS may help an NR device to possibly wake up from a dormant or sleep state, since the detection of PSS/SSS can be performed with lower-complexity (e.g., time domain detection) compared to detection of a channel (e.g., PDCCH/PDSCH). In another embodiment, all WTRUs, that expect to transmit or receive such a broadcast RTR, may be pre-configured with a preamble sequence with desirable properties such that the detection of the sequence may be performed with low complexity. An application of transmission/reception of such a broadcast RTR may be sidelink communication between two NR (licensed/unlicensed) devices where the two devices may be a WTRU (e.g., in V2V or V2X communication). V2X is a form of technology that allows vehicles to communicate with moving parts of the traffic system around them. V2V, or vehicle to vehicle, allows vehicles to communicate with other vehicles.

Figure 13:
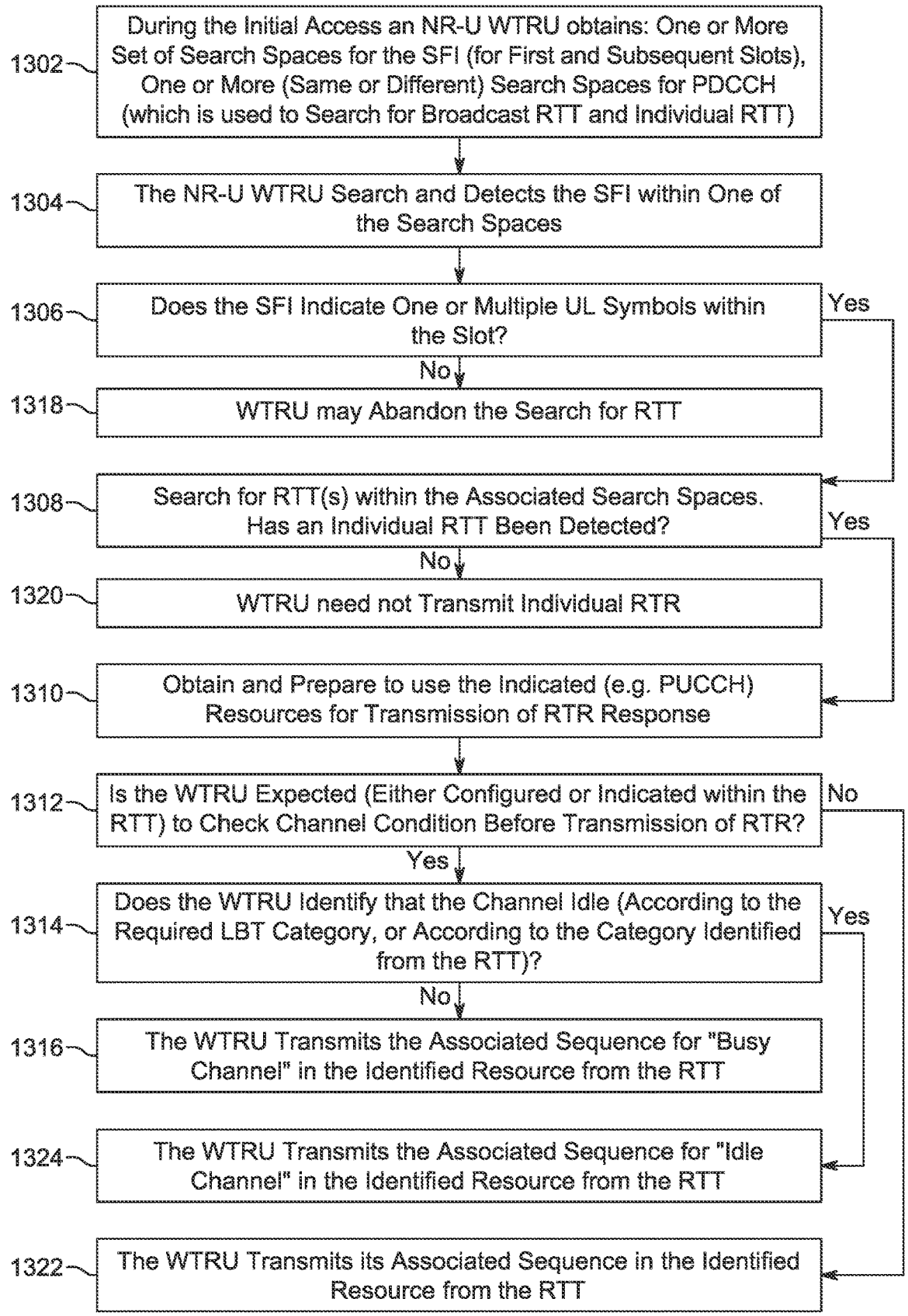
FIG. 13 is a flowchart illustrating an example process for a WTRU to locate RTT within a channel occupancy time of an NR-U gNB and respond with an individual RTR response.

FIG. 13 is a flowchart illustrating an example process for a WTRU to locate RTT within a channel occupancy time of an NR-U gNB and respond with an individual RTR response. At 1302, during an initial access the WTRU (e.g., NR-U wireless node) may obtain one or more of the following: set of search spaces for SFI; and/or search spaces for PDCCH, where the PDCCH may be used to search for Broadcast RTT or Individual RTT). At 1304, the WTRU may search and detect the SFI within one of the configured search spaces, as discussed herein. At 1306, if the SFI does not indicate one or more UL symbols within the slot, then at 1318 the WTRU may abandon the search for RTT; but if the SFI does indicate one or more UL symbols within the slot, then at 1308 the WTRU may search for RTT(s) within the associated search spaces. At 1308, if the WTRU does not detect an RTT, then at 1320 the WTRU does not need to, and will not, transmit individual RTR; but if the WTRU does detect RTT, then at 1310 the WTRU may obtain and prepare to use the indicated resources (e.g., PUCCH) for transmission of the individual RTR response. At 1312, if the WTRU has not been indicated, or configured within the RTT, to check the channel condition before the transmission of the RTR, then at 1322 the WTRU may proceed to transmit the associated sequence in the identified resource from the RTT; if the WTRU has been indicated to check the channel condition, then at 1314 the WTRU may proceed to check the channel according to the required LBT category or according to the category identified from the RTT. If the channel is not clear (i.e., busy), then at 1316 the WTRU may transmit the associated sequence for "busy channel" in the identified resource from the RTT. If the channel is clear (i.e., idle/not busy), then at 1324 the WTRU may transmit the associated sequence for "Idle Channel" in the identified resource from the RTT.

Figure 14:
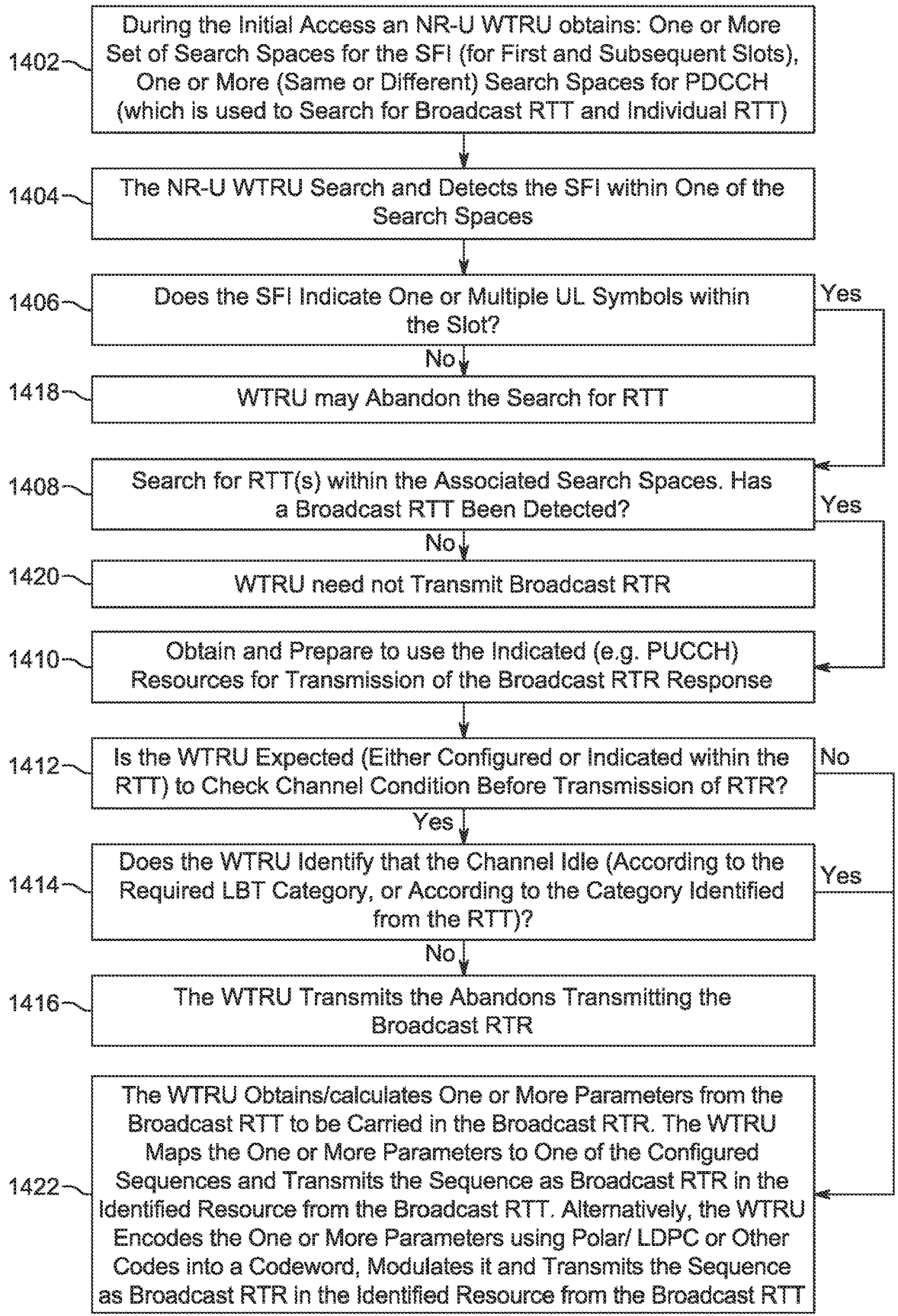
FIG. 14 is a flowchart illustrating an example process for a WTRU to locate RTT within a channel occupancy time of an NR-U gNB and respond with a broadcast RTR response.

FIG. 14 is a flowchart illustrating an example process for a WTRU to locate RTT within a channel occupancy time of an NR-U gNB and respond with a broadcast RTR response (i.e., similar to FIG. 13 but with broadcast RTR instead of individual RTR). At 1402, during an initial access the WTRU (e.g., NR-U wireless node) may obtain one or more of the following: set of search spaces for SFI; and/or search spaces for PDCCH, where the PDCCH may be used to search for Broadcast RTT or Individual RTT. At 1404, the WTRU may search and detect the SFI within one of the configured search spaces, as discussed herein. At 1406, if the SFI does not indicate one or more UL symbols within the slot, then at 1418 the WTRU may abandon the search for RTT; but if the SFI does indicate one or more UL symbols within the slot, then at 1408 the WTRU may search for RTT(s) within the associated search spaces. At 1408, if the WTRU does not detect an RTT, then at 1420 the WTRU does not need to, and will not, transmit individual RTR; but if the WTRU does detect RTT, then at 1410 the WTRU may obtain and prepare to use the indicated resources (e.g., PUCCH) for transmission of the broadcast RTR response. At 1412, if the WTRU has been indicated to check the channel condition, then at 1414 the WTRU may proceed to check the channel according to the required LBT category or according to the category identified from the RTT. If the channel is not clear (i.e., busy), then at 1416 the WTRU transmits the associated sequence for "busy channel" in the identified resource from the RTT. If, at 1412, the WTRU has not been indicated, or configured within the RTT, to check the channel condition before the transmission of the RTR, and/or if the channel is clear (i.e., idle/not busy), then at 1422 the WTRU may proceed with the broadcast RTR process: The WTRU may obtain/calculate one or more parameters from the broadcast RTT to be carried in the broadcast RTR; then, the WTRU may map one or more parameters to one of the configured sequences and transmit the sequence as broadcast RTR in the identified resource from the broadcast RTT. Alternatively, the WTRU may encode the one or more parameters, using polar/LDPC or other such codes, into a code word, modulate it, and then transmit the sequence as broadcast RTR in the identified resource from the broadcast RTT.

While the examples of FIGS. 13 and 14 are discussed from the perspective of a receiving node, such as a WTRU, both examples may have reciprocal sending node processes, such as for a gNB.

In one embodiment, RTT and RTR may be transmitted using specific beams. For example, an NR-U gNB may know the best beam for one or more WTRUs, however the gNB may not know the channel for the beam where the WTRU is clear. In such an instance, the gNB may send several individual RTT indications across multiple beams after the LBT is performed successfully for each beam. Each beam may be designated to one or multiple intended WTRUs, where the individual RTT indications may need to be carried in separate DCIs. Moreover, the same SFI may be carried in several search spaces for each beam in order to ensure all WTRUs receive the SFI. A WTRU that obtains the SFI and detects the RTT in a beam may respond with an individual RTR using the same beam after performing a successful LBT for the same beam. The gNB may then schedule multi-beam DL/UL data in the remaining slot(s). A responding WTRU in this case may use an LBT procedure for the specific beam (i.e., instead of performing this omni-directional or quasi-omni-directional).

In another example, the gNB may not know the best beam for each WTRU and may want to do a beam sweep or beam refinement for each WTRU; or the gNB may not know which beam has an idle channel for the WTRU. A gNB may send a RTT to a specific WTRU using multiple beams (e.g., multiple RTT indications each within a DCI that is sent using a specific beam), after LBT is performed successfully for each beam. The WTRU may respond with RTR using the best beam and/or the best beam that senses the medium as idle (i.e., the best beam that the LBT is performed successfully for). The gNB may then schedule for DL/UL data for the WTRU using the best beam for the remaining slot or COT.

Figure 15:
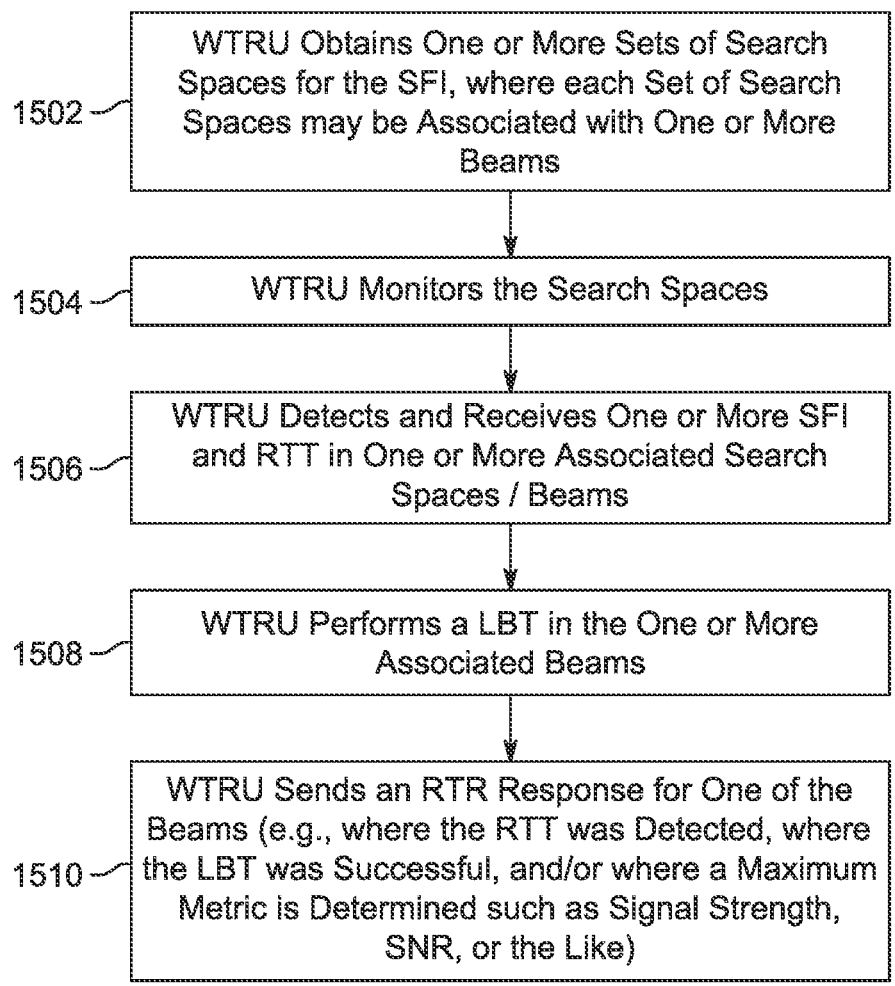
FIG. 15 is an flowchart illustrating an example process for a WTRU to respond to a gNB that has initiated a COT with multiple beams.

FIG. 15 is a flowchart illustrating an example process for a WTRU to respond to a gNB that has initiated a COT with multiple beams. In either of the above examples related to using beams, a wireless node (e.g., WTRU or gNB) may go through a process regarding a request to transmit and receive handshaking, as described herein.

At 1502, during an initial access the WTRU (e.g., NR-U wireless node) may obtain one or more of the following: set of search spaces for SFI; and/or search spaces for PDCCH, where the PDCCH may be used to search for Broadcast RTT or Individual RTT). Just as in the example of FIG. 9B, each set of search spaces may be associated with one or more beams. At 1504, a WTRU may perform PDCCH and SFI detection (i.e., monitoring) for the multiple search spaces it is configured with. At 1506, the WTRU may detect and receive the PDCCH/SFI. If the WTRU detects the PDCCH/SFI within one of the search spaces, then the WTRU may prepare to perform an LBT procedure for the beam it has detected the PDCCH and SFI within, or the beam that is associated with that search space. If the WTRU detects the PDCCH/SFI within multiple search spaces, then the WTRU may prepare to perform an LBT procedure for one or more of the beams it has detected the PDCCH and SFI within, or for each beam that is associated with each one of the search spaces. At 1506, the WTRU may also receive a RTT within a given beam, or within multiple beams.

Based on the SFI, the WTRU may obtain and prepare to use the indicated (e.g., PUCCH) resources for transmission of the RTR response. If no RTT was detected, then the WTRU does not need to transmit the RTR. At 1508 LBT procedure may be performed for at least one of the beams where the one or more RTTs were detected. If the LBT fails, then the WTRU may not transmit the RTR. At 1510, the WTRU may send a RTR response. If there are multiple RTTs within multiple beams and the LBT is successful, then the WTRU may respond with the broadcast RTR and/or individual RTR for one of the beams that has been determined to be the best beam (i.e., the beam that leads to best strength and SNR metric, or where the LBT was performed successfully). If only one RTT is received, and the LBT procedure was successful, then 1522 the WTRU may respond with broadcast RTR and/or individual RTR on the beam that the RTT was detected on.

While the example of FIG. 15 is discussed in terms of a receiver wireless node (e.g., a WTRU), a reciprocal process may exists for the sender (e.g., gNB). For example, an NR-U gNB may perform an LBT procedure for one or multiple beams. The gNB may then send SFI for a set of beams (e.g., after a successful LBT procedure). For this, the PDCCH and the SFI may be sent within multiple search spaces where one or multiple WTRUs are configured to locate the PDCCH and SFI within each search space. Also, the PDCCH and the SFI may be sent within multiple search spaces where a WTRU may be able to locate them, but depending on the WTRU-side LBT condition, the WTRU may be able to subsequently respond within one of the beams.

The gNB may then send, broadcast or individual, RTT for the set of beams whose LBT procedure was completed successfully. The selection of the set of the beams by the gNB may be based on the on one or more criteria. For example, the gNB may select a set of beams for a WTRU in order to refine the best beam for a WTRU among a set of beams that were previously listed for the WTRU. Alternatively, or additionally, the gNB may select a set of beams for a WTRU in order to make sure the WTRU can perform an LBT procedure at its side successfully for at least one of the beams (i.e., the set of beams may have been previously identified among the best beams for the WTRU, but the WTRU-side LBT condition of the beams is unknown to the gNB).

Figure 16:
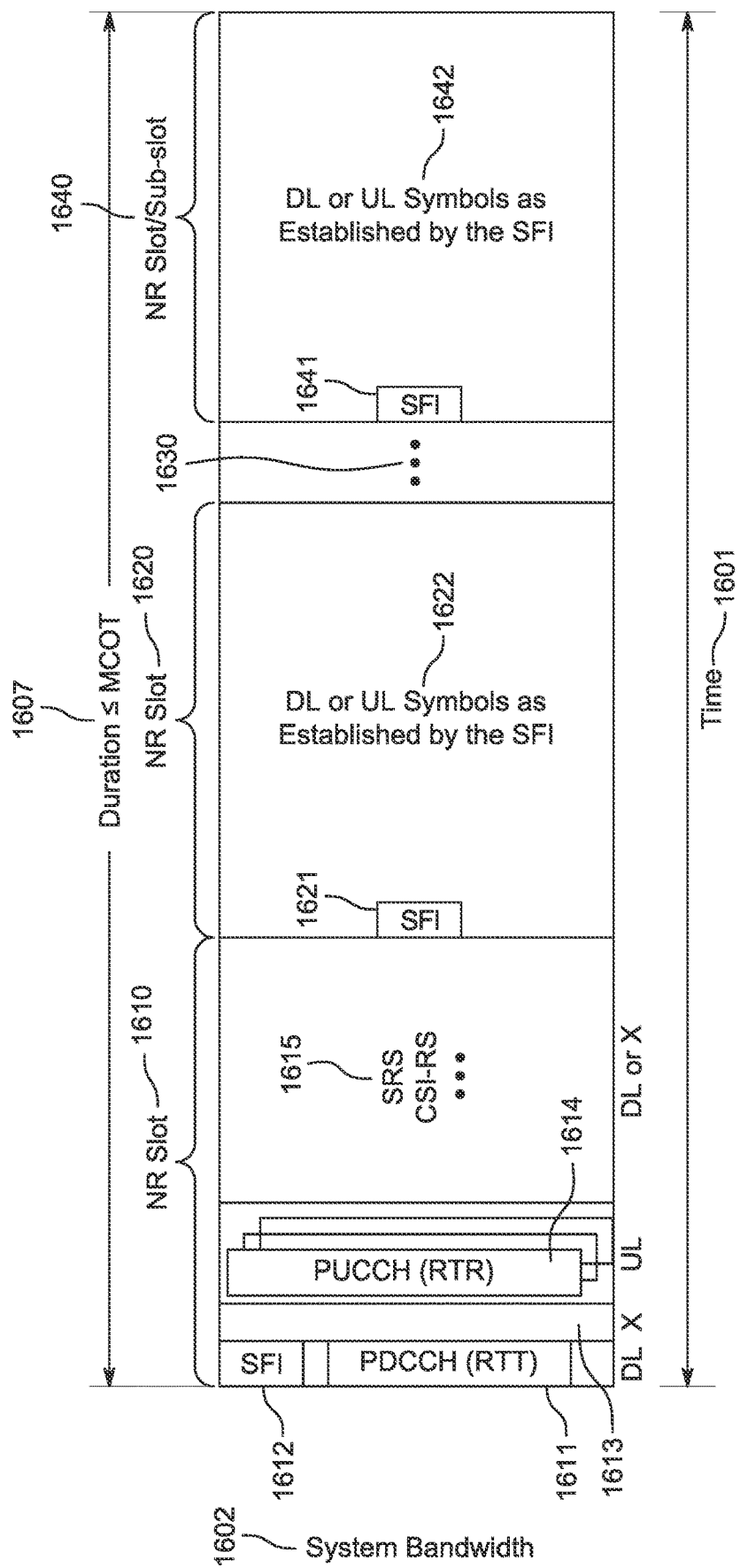
FIG. 16 is a frame diagram illustrating an example of RTT and RTR handshaking in a SA NR-U network.

FIG. 16 is a diagram illustrating an example RTT and RTR handshaking in a standalone (SA) NR-U network. Standalone may be used herein as an instance where at least two wireless nodes operate in an NR-U network, and not a licensed network. Time 1601 may be shown in the horizontal axis organized in a series of slots, or the like (e.g., mini-lots, OFDM symbols, or sub-slots), and system bandwidth (BW) 1602 may be shown in the vertical axis. In one instance, handshaking may occur between a gNB and a WTRU in a SA NR-U. There may be a handshaking procedure for each of the gNB and WTRU sides. As with FIGS. 12A-D, it may be assumed for the sake of illustration that a LBT procedure is completed successfully, where the gNB performed the LBT procedure right before the start of the slot/mini-slot that carries the PDCCH(RTT) or right before one or multiple slots that precede the slot/mini-slot that carries the PDCCH (RTT), which makes the entire transmission shown limited to the MCOT 1607.

The gNB may send PDCCH(RTT) 1611 to one or multiple WTRUs. There may be multiple WTRU-specific PDCCH (RTT), or a single common PDCCH(RTT) intended for multiple WTRUs. The RTT identifier may be carried in the PDCCH's DCI that has new content or a new format relative to earlier versions. The distinction of the PDCCH(RTT) is that it carries an identifier that requests the identified one or more WTRUs to do the following: a) perform LBT on the unlicensed channel; and/or b) use the scheduled PUCCH resource to send a response RTR when the LBT is successful, or sometimes to send a successful/unsuccessful LBT indication. There may be various ways to carry the RTT identifier within a DCI.

Each intended WTRU may first perform an LBT procedure accordingly. The LBT may be evaluated during the X symbols 1613 and/or 1615, and depending on the duration of the X symbols 1613 and/or 1615, which may be indicated by the SFI, the LBT listen interval may be limited. For example, in X symbols 1613 the gNB is silent and the WTRU may measure whether there is any additional energy in the channel; and for X symbols 1615 the gNB may transmit some signals/energy that is known to the WTRU, therefore the WTRU may measure the energy by either avoiding these known signal/energy locations or accounting for the extra energy in its assessment of LBT.

In one situation, the X symbols 1615 may be used by the WTRU to receive some DL (e.g., reference) signals 1615 in some resource elements/blocks (REs/RBs) (e.g., CSI-RS, SRS, DMRS etc.). The transmission of the DL signals 1615 may have an additional benefit that keeps the unlicensed channel busy during the symbols, such that an intra- or inter-RAT device would practically sense the unlicensed channel to be busy. However, an intended WTRU that performs an LBT procedure at its own side during the X symbols 1615 may need to exercise additional care in order to calculate the detected energy during the X symbols 1615 correctly. The WTRU may calculate the detected energy only on the REs/RBs that are not in use by the gNB for transmission of any DL signal, and it may be assumed that an intended WTRU is configured by the gNB and knows the REs/RBs that are used by the gNB for the DL signal transmission 1615. Alternatively, the WTRU may calculate the detected energy on the whole bandwidth (e.g., the BWP or the minimum channel bandwidth in the operating unlicensed channel, such as 20 MHz in 5 GHz unlicensed spectrum) and separately calculate the detected energy on the REs/RBs where the WTRU receives the said DL signals 1615, and then subtract the latter detected energy from the former detected energy in order to arrive to an accurate energy level.

After the LBT procedure, each WTRU may send the (individual) RTR in an individually assigned PUCCH 1614.

The assignment of a specific PUCCH resource 1614 to a WTRU may be carried in multiple ways.

In one instance, a PUCCH resource 1614 may be assigned to a WTRU within the DCI carried in the PDCCH(RTT) 1611 (e.g., by providing the index of the specific PUCCH resource 1614 from the pool of resources). There may be a time and/or OFDM symbol reference within the PDCCH (RTT) 1611 to reference the slot and symbol where the PUCCH resource 1614 is scheduled by the NR-U gNB.

In another instance, a WTRU may be configured with a specific PUCCH resource 1614 to respond to PDCCH(RTT), hence no specific PUCCH resource index may need to be carried within the PDCCH(RTT), as long as the PUCCH is identified by an RTT. As discussed herein, there may be a time and/or OFDM symbol reference within the PDCCH (RTT), however, even this reference may be left by an earlier configuration. Note that for the mere presence of a PDCCH (RTT) that elicits RTR responses from one or more WTRUs, an intended WTRU may look for the PUCCH resource within. Multiple WTRUs may send a broadcast RTR in an assigned PUCCH. Some examples of individual and broadcast RTR are discussed herein.

It one case, from an LBT detection perspective, it may be preferable if the PUCCH(RTR) is sent using a PUCCH format that is spread across the bandwidth. Also, due to possible OCB regulatory requirement(s), an interlaced PUCCH design may be used for NR-U.

In one scenario, it may be beneficial to use a PUCCH design that assigns various cyclic shifts of a base sequence to various WTRUs. This may allow for enhanced reliability of the LBT procedure at other unintended devices that happen to monitor and perform their own LBT on the unlicensed channel. This also may lead to various PUCCH (RTR) assignments, each assigned to one WTRU, across the same time duration and the same RBs. In NR, PUCCH Format 0 may use various cyclic shifts to multiplex multiple PUCCH into one RB. A modified design of a PUCCH Format 0 may be a preferable approach to this scenario, where multiple RBs across the bandwidth are used in an interlaced fashion. A time repetition of such a design may also be used in order to offer the various benefits, such as: a) enhance the detection reliability of the PUCCH at the gNB, b) enhance the detection reliability of the PUCCH at the unintended gNBs/WTRUs, and/or c) enhance the reliability of LBT operation at the unintended gNBs/WTRUs or inter-RAT devices.

In another scenario, it may be beneficial to use a PUCCH design that assigns various frequency-multiplexed interlaced PUCCH. This design may also enhance the reliability of the LBT procedure at other unintended devices (e.g., that happen to perform their own LBT). This may lead to various PUCCH(RTR) assignments, each assigned to one WTRU, across the same time duration but with different RBs (e.g., separating PUCCH by frequency). During the symbol(s) where multiple PUCCH channels are used for transmission by multiple WTRUs, most of the bandwidth of the unlicensed channel may appear to the unintended WTRUs to be taken and having some energy.

In another scenario, a PUCCH design that assigns various time-multiplexed interlaced PUCCH may be used if the gNB finds that the responding WTRUs are in the same vicinity, which may make the coverage of various RTR about the same.

As discussed herein, concerning sending PUCCH(RTR), a WTRU may respond only when LBT is successful. In another scenario, a WTRU may respond with content indicating a successful LBT (e.g., ACK), and may respond with content indicating an unsuccessful LBT (e.g., NACK).

There may be a dynamic indication of a PUCCH resource in the DCI where PUCCH resource is in code and time domain, and it may be an extension of Format 0 and cover the entire band (e.g., due to OCB).

The WTRU may derive its UL PUCCH resource for RTR transmission using an explicit indication in the DCI and/or implicit indication linked to one or multiple attributes of the transmission on the unlicensed band.

One indication may be channel access priority class, where a WTRU may be configured with a number of sets of PUCCH resources by higher layer, each for a different channel access priority class associated with the gNB transmission. Accordingly, the WTRU may identify its PUCCH (RTR) resource in the corresponding PUCCH resource set for a given channel access priority class. In another example the PUCCH(RTR) resource may be linked to a specific UL channel access priority class (e.g., first channel access priority class)

Another indication may be contention window size, where the PUCCH resource may be linked to the size of the contention window size which itself is a function of the collision.

Another indication may be sensing/LBT interval, where a pool of PUCCH resources may be a function of the sensing/LBT interval. For example the number of PUCCH resources and their corresponding resource indicator may be scaled by the sensing/LBT interval.

Another indication may be maximum channel occupancy time (MCOT) duration, where a pool of PUCCH resources may be a function of the MCOT duration. For example the number of PUCCH resources and their corresponding resource indicator can be scaled by the MCOT duration. Larger MCOT duration may be associated with a larger PUCCH resource pool.

Another indication may be payload size of the RTR message, where the WTRU may determine a PUCCH(RTR) resource within a different PUCCH resource set if the RTR message is 1-2 bits or more than 2 bits Another indication may be WTRU capability, where depending on the specific WTRU capability, the number of OFDM symbols considered as gap for DL to UL switching also known as RF retuning may be different for different users.

Another indication may be idle OFDM symbol(s)/slot duration.

While FIG. 16 shows the example exchange of RTT and RTR happening in the same slot/mini-slot, the transmission slot of the RTR may depend on the scheduling of the RTR, which may be carried in RTT. In one instance, depending on a WTRU capability as well as the duration of the min-slot that carries the RTT, the PUCCH(RTR) scheduling may be for the upcoming slot (i.e., the WTRU may be scheduled to send its PUCCH(RTR) at the next slot). In another instance, the PUCCH(RTR) scheduling may be for the last few symbols of the same slot that carries the RTT.

In one embodiment, handshaking between the gNB and WTRU may be by a non-standalone (NSA) NR-U, where there may be multiple approaches. Non-standalone may mean that a wireless node may utilize both licensed and unlicensed spectrum in the process of communicating with other wireless nodes. Generally, in the following figures, FIGS. 17-20, just as in FIGS. 12A-D, time may be shown in the horizontal axis as indicated by slots, and bandwidth may be shown in the vertical axis, although the bandwidth shown may not be contiguous. Also, certain slots are shown for illustration purposes and may have a different position relative to other slots, and three dots may indicate that one or more slots may be represented.

Figure 17:
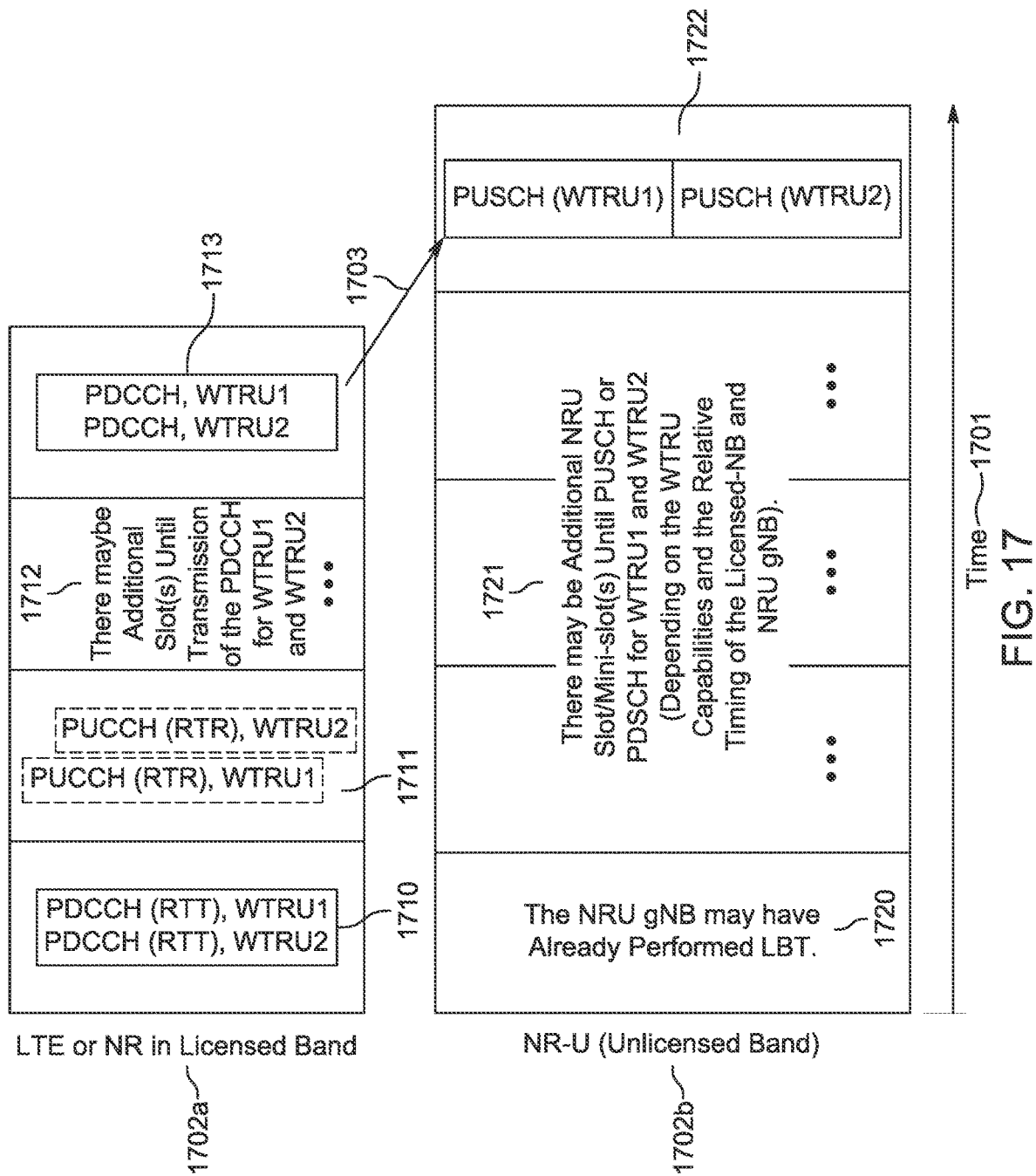
FIG. 17 is a frame diagram illustrating an example of RTT and RTR handshaking in a NSA NR-U network.

FIG. 17 shows one approach illustrating a handshaking with using both licensed and unlicensed spectrum. Here, both RTT 1710 and RTR 1711 may be transmitted in the licensed channel 1702*a*. The licensed NR gNB (NB) may send RTT 1710 to one or multiple WTRUs in the licensed channel 1702*a*. Each intended WTRU may first evaluate the LBT accordingly. The LBT may be evaluated, on the unlicensed channel 1702*b*, during an interval after the PDCCH (RTT) has been received in the licensed channel (e.g., 1720). A WTRU may perform a fixed-duration LBT (e.g., CAT3 LBT) or variable-length LBT (e.g., CAT 4 LBT) and if the unlicensed channel 1702*b* is found idle, the WTRU may transmit the PUCCH(RTR) 1711 on the scheduled resource within the licensed-NB frame in the licensed channel 1702*a*. A WTRU may perform LBT, on the unlicensed channel 1702*b*, for the entire duration starting from the reception of the PDCCH(RTT) until the scheduling of the PUCCH (RTR), where both RTT and RTR are sent on the licensed channel 1702*a*, or for a portion of this duration.

Each WTRU may send an RTR in an individually assigned PUCCH 1711 in the licensed channel 1702*a*. Since the PUCCH is transmitted on the licensed channel 1702*a*, there may be no need for a new PUCCH format design and (i.e., the same NR PUCCH Format 0 may be used). Also, instead of an RTR, any indication within a PUCCH may be used for the same purpose. Since the RTR, or any other PUCCH used instead, may be transmitted on the licensed channel 1702*a*, there may be limited or no LBT benefits from other unintended devices that may happen to monitor the unlicensed channel.

The gNB may schedule DL or UL data transmission for those WTRUs that have responded with RTR 1711. The transmission of the PDCCH 1713 may occur in the licensed channel 1702*a* (i.e., the PDCCH 1713 for those WTRUs may be sent in the licensed channel 1702*a*), but the PDCCH may refer to resources (e.g., PUSCH or PDSCH) in the NR-U gNB slots. Hence, an intended WTRU may receive a PDCCH in the licensed channel 1702*a* from the licensed NB (e.g., NR gNB) where the PDCCH may refer to resources in the unlicensed channel 1702*b* within the slots of the NR-U gNB. Additional signaling and relative time references, between the licensed NB and the NR-U gNB, may be carried in the PDCCH in order to uniquely point to the resources in a unique slot of the NR-U gNB.

There may be additional NR-U slot/mini-slot(s) 1721 until the PUSCH or PDSCH for WTRUs (e.g., WTRU1 and WTRU2), which may depend on the WTRU capabilities and the relative timing of the licensed-NB and NR-U gNB. In the case of additional slot(s), the relative timing of the PUSCH/PDSCH 1722 in the NR-U 1702*b* may be indicated in the PDCCH 1713 of the licensed-NB 1702*a*. Also, during such additional slot(s), the gNB NR-U may be transmitting DL signals/channels to other WTRUs or may be transmitting broadcast channels, references signals (CSI-RS, SRS, etc.) or any form of reservation signals.

In another situation, the NR-U gNB may be the NB that transmits the PDCCH, to those WTRUs that have responded with RTR, in the unlicensed channel (i.e., the PDCCH for those WTRUs are sent in the unlicensed channel). There may be an added benefits of this situation, such as: the licensed-NB and the NR-U gNB may not need to exercise additional care to ensure the relative timing of the two NBs in order to enable the WTRUs to transmit during the scheduled PUSCH in the unlicensed band; and/or, the mere act of the transmission of the PDCCH in the unlicensed band may keep the unlicensed channel under use by the gNB, thereby causing other inter- or intra-RAT devices from not using the unlicensed channel.

Figure 18:
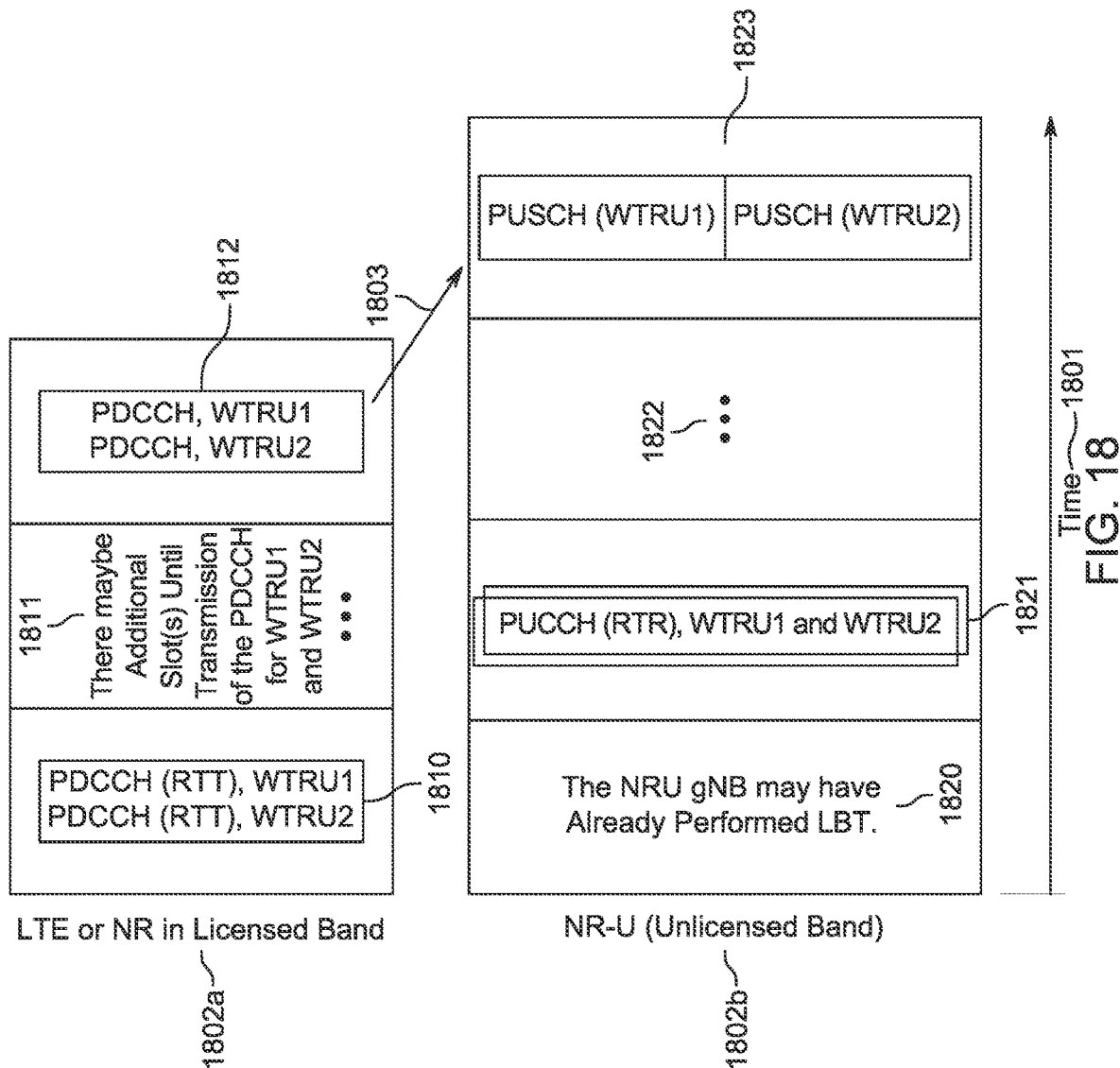
FIG. 18 is a frame diagram illustrating an example of RTT and RTR handshaking in a NSA NR-U network.
Figure 19:
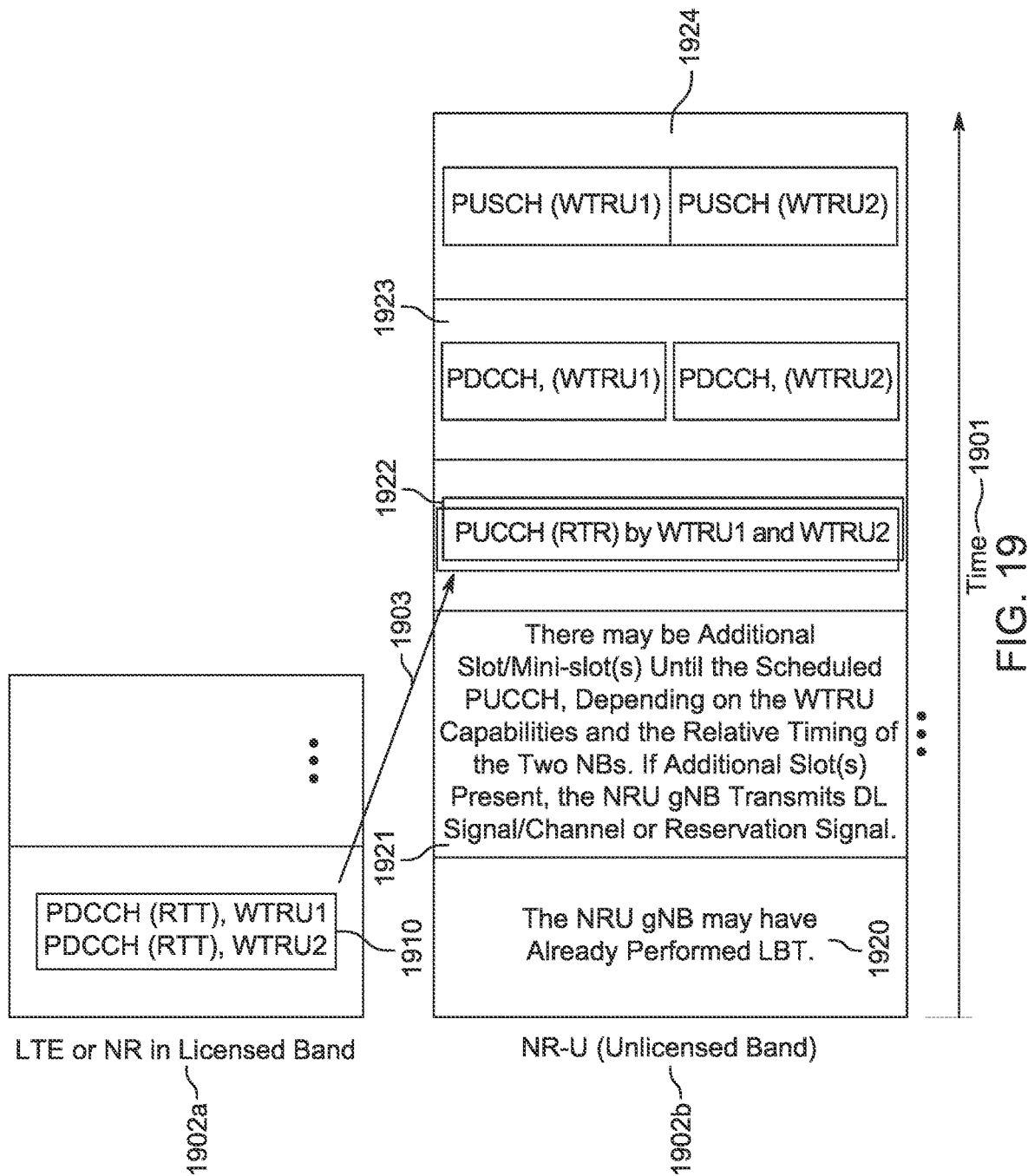
FIG. 19 is a frame diagram illustrating an example of RTT and RTR handshaking in a NSA NR-U network.

FIG. 18 and FIG. 19 illustrate other approaches to handshaking using both licensed and unlicensed spectrum communication. Just as in the example of FIG. 17, the RTT may be transmitted by the licensed NB (e.g., NR gNB) in the licensed channel at 1810 or 1910, however, unlike the example of FIG. 17, the RTR(s) may be transmitted by one or multiple WTRU(s) in the unlicensed channel 1821 and/or 1922. The licensed NB (e.g., NR gNB) may send RTT to one or multiple WTRUs in the licensed channel. The PDCCH (RTT) sent by the licensed-NB may indicate/assign the PUCCH resources for the one or multiple WTRUs within the NR gNB slots in the unlicensed channel.

Each intended WTRU may first evaluate the LBT accordingly. The LBT may be evaluated during X or DL symbols depending on the duration of the symbols within one of multiple NR-U slots, which may be indicated by the SFI. Considering the duration of the symbols, the LBT listen interval may be limited.

The gNB may have indicated one or more X OFDM symbols right before the scheduled PUCCH where no DL occurs and the intended WTRUs may perform LBT.

In one situation, the X or DL symbols might be used by the gNB to send one or more DL (e.g., reference) signals in one or more resource elements/blocks (REs/RBs) (e.g., CSI-RS, SRS, etc.). The transmission of the DL signals may have an additional benefit of keeping the unlicensed channel busy during said symbols, such that an intra- or inter-RAT device would practically sense the unlicensed channel to be busy. However, an intended WTRU that performs an LBT procedure at its own side during the X symbols may need to exercise additional care in order to calculate the detected energy during the X symbols correctly. The WTRU may calculate the detected energy only on the REs/RBs that are not in use by the gNB for transmission of any DL signal, and it may be assumed that an intended WTRU is configured by the gNB and knows the REs/RBs used by the gNB for the DL signal transmission. Alternatively, the WTRU may calculate the detected energy on the whole bandwidth (e.g., the BWP or the minimum channel bandwidth in the operating unlicensed channel, such as 20 MHz in 5 GHz unlicensed spectrum) and separately calculate the detected energy on the REs/RBs where the gNB transmits the said DL signals, and then subtract the latter detected energy from the former detected energy in order to arrive at an accurate energy level.

Referring again to FIGS. 18 and 19, each WTRU may send RTR (e.g., individual) in an individually assigned PUCCH 1821 and 1922 in the unlicensed channel 1802*b* and 1902*b*. As described herein with regard to handshaking for SA NR-U, various formats of PUCCH, whether frequency- or cyclic-shift-multiplex, may be used. In one instance, a PUCCH format that assigns various cyclic shifts of a base sequence to multiple WTRUs may be used. The benefit of sending the RTR in the unlicensed band may be to ensure the unlicensed channel is kept reserved by the WTRUs so that other devices that happen to be monitoring the unlicensed channel and performing their own LBT detect the channel to be busy.

The scheduling of the DL or UL for those WTRUs that have responded with RTR may be performed in a number of ways, such as: the licensed-NB may send PDCCH in the licensed channel for the WTRUs (e.g., that have already responded with RTR) as shown in FIG. 18; and/or the NR-U gNB may send PDCCH in the unlicensed channel for the WTRUs (e.g., that have already responded with RTR) as shown in FIG. 19, which may ease the complexity by reducing the information exchange between the licensed-NB and the NR-U gNB.

FIG. 20 illustrates an example approach similar to FIG. 19, except the RTT 2010, 2020 may be transmitted in both, or either of the licensed 2002a or unlicensed 2002b channels. Specifically, the RTT 2010 may be transmitted by the licensed NB (e.g., NR gNB) in the licensed channel 2002a. Also, the RTT 2020 (or any other DL signal such as CSI-RS, SRS, etc., or DL channel such as PDCCH, PDSCH, PBCH, etc., or reservation signal) may be transmitted by the NR-U gNB in the unlicensed channel 2002b (e.g., after appropriate LBT procedure). The RTR(s) 2022 may be transmitted by one or multiple WTRU(s) in the unlicensed channel 2002b.

The example shown in FIG. 20 may be based on modifications made to FIG. 18 and FIG. 19. The licensed-NB (e.g., NR gNB) and the NR-U gNB may send their own PDCCH(RTT) 2010, 2020 at or about the same time. Note that the NR-U gNB may send PDCCH(RTT) 2020, or any DL channel/signal such as SRS, CSI-RS, reservation signal, etc., after the appropriate LBT procedure, and due to possible randomness of LBT duration the transmission of any DL signal/channel by the NR-U gNB may not be exactly aligned with the transmission of the PDCCH (RTT) 2010 by the licensed-NB. Such a transmission may ensure that the channel 2002b is reserved by the NR-U gNB and other competing devices that happen to be monitoring the unlicensed channel 2002b and performing their own LBT, which would detect the unlicensed channel 2002b to be busy and refrain from transmission.

The WTRU may monitor the configured control channel resource sets (CORESETs) on both licensed 2002a and unlicensed 2002b carriers and act upon the PDCCH that it has received in the licensed channel, the unlicensed channel, or a combination of both for enhanced reliability.

Figure 21A:
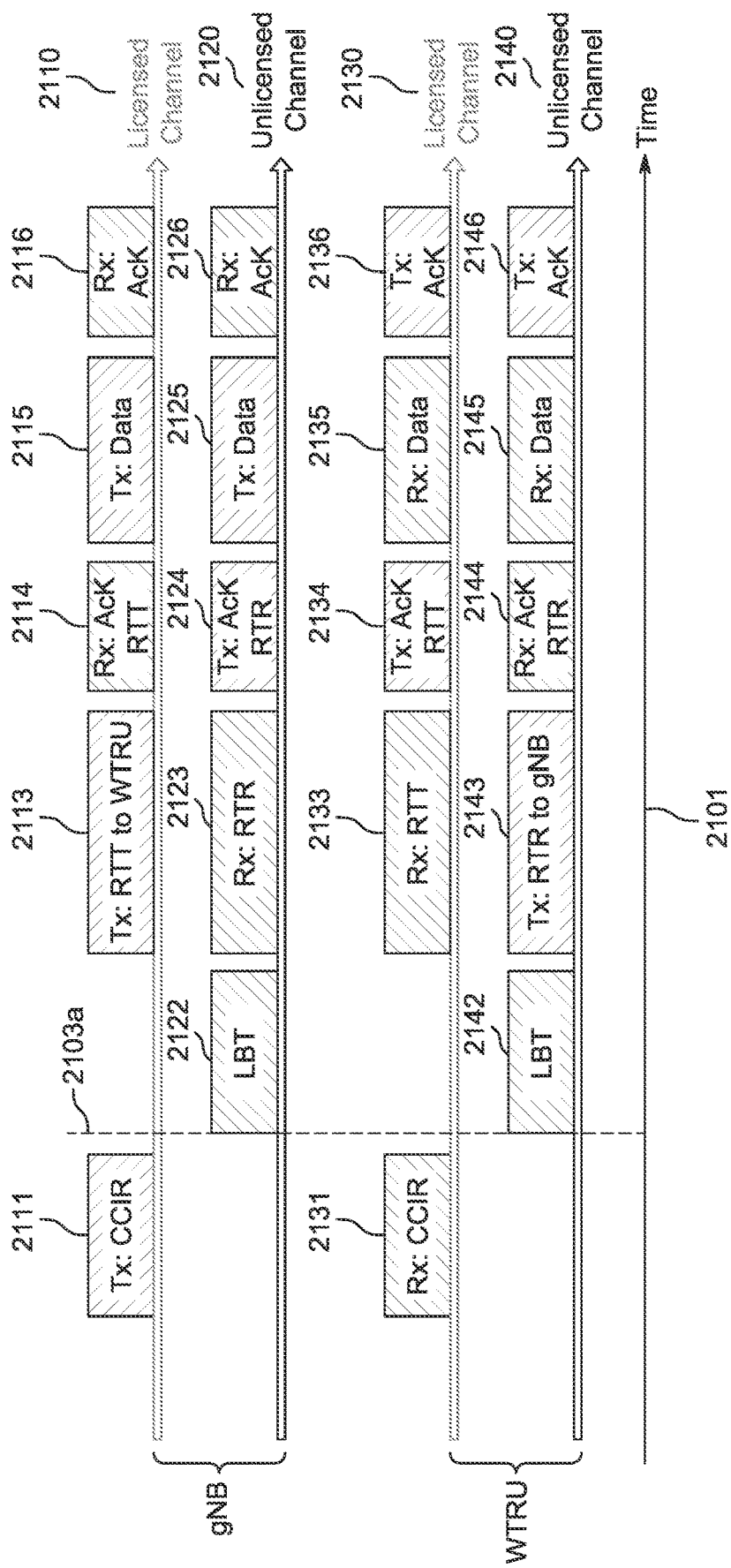
FIG. 21A is a frame diagram illustrating an example of a request sent by the gNB to WTRU to do LBT at a specific time and simultaneously acknowledge CCA results between gNB and WTRU.
Figure 21B:
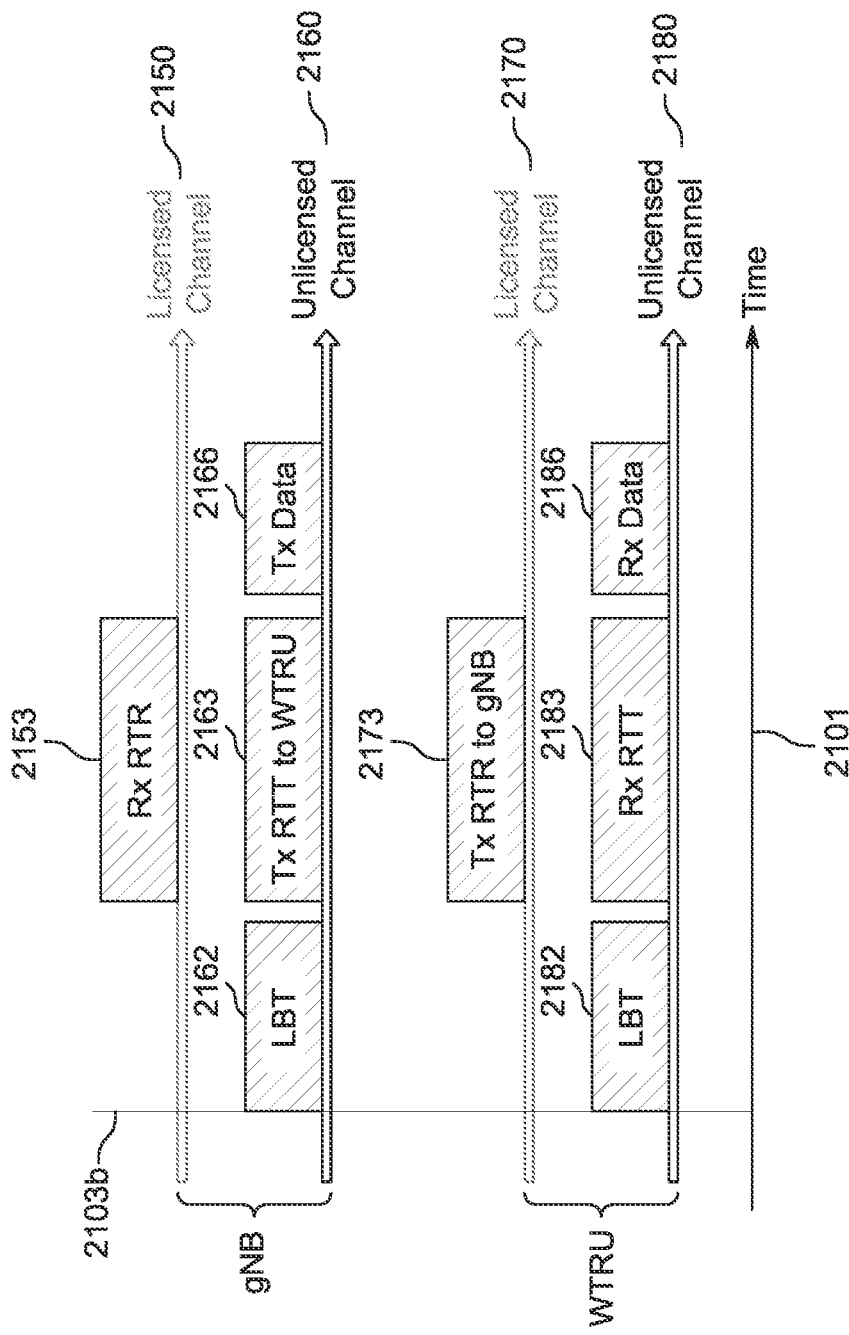
FIG. 21B is a diagram illustrating an example of request sent by the gNB to WTRU to do LBT at a specific time and simultaneously acknowledge CCA results between gNB and WTRU.

FIG. 21A and FIG. 21B illustrate an example exchange between a gNB and a WTRU concerning performing the LBT at the same time. In one situation related to FIG. 18 and FIG. 19, a gNB may request one or more WTRU to perform LBT at a specific time, and the gNB may attempt to do the LBT at the same time as well. The request for performing the LBT at a specific time may be referred to as a Clear Channel Indication Request (CCIR). Here, time 2101 is shown in the horizontal axis and each of the gNB and WTRU are operating on licensed and unlicensed channels. The LBT may occur at 2103a-b, and note that the transmission on CCIR 2111 may happen at some time before LBT 2013a and may be sent by the licensed-NB (i.e., NR gNB) on the licensed channel 2110. The benefit of performing a simultaneous LBT 2103a-b at the NR-U gNB and the WTRU on the unlicensed channel (2120 and 2140) may be that there is less chance of an intra- or inter-RAT device transmitting during the time gap between the RTT and RTR. The CCIR may include: the category of LBT to be used, where to maintain the synchronization between the gNB and WTRUs the LBT category used on both sides may need to be the same and completed at the same time; error handling method (i.e., in case of failure of the following steps); and/or, unlicensed channel information (e.g., channel index, bandwidth, etc.) which a WTRU may need to perform LBT.

After LBT 2103a is completed on both sides, assuming both are successful (i.e., both sensed the channel is idle), the gNB may send RTT 2153 on an unlicensed channel and the WTRU may send RTR 2173 on a licensed channel 2170 at the same time, or vice versa. The use of licensed or unlicensed channels to transmit RTR and RTT may be indicated in the CCIR.

Assuming RTT 2123 and RTR 2133 are successfully received on both sides, they (e.g., gNB and WTRU) may then transmit acknowledgements to each other 2124/2134. In one case, the acknowledgement may be omitted.

Depending on the reception of the acknowledgements 2114/2144 (e.g., ACK, NACK, or other information), the gNB may choose to transmit the data on both licensed and unlicensed channels 2115/2125, or only on one of them, or not transmit them at all. The selection of the channel may also depend on the content of the CCIR.

After the data is received 2135/2145, the WTRU may choose to use both licensed and unlicensed channels to acknowledge the reception of the data 2136/2145, or use only one of those channels. The gNB may receive the ACK on either or both channels 2116/2126.

This procedure may also be applied to UL data transmission.

Also, with this scheme, both gNB and WTRU may need to support concurrent transmit/receive over different carriers. For example, a device may be able to transmit over a first carrier and meanwhile it may be able to receive over a second carrier. This capability may be indicated and exchanged between the gNB and the WTRU.

Figure 22:
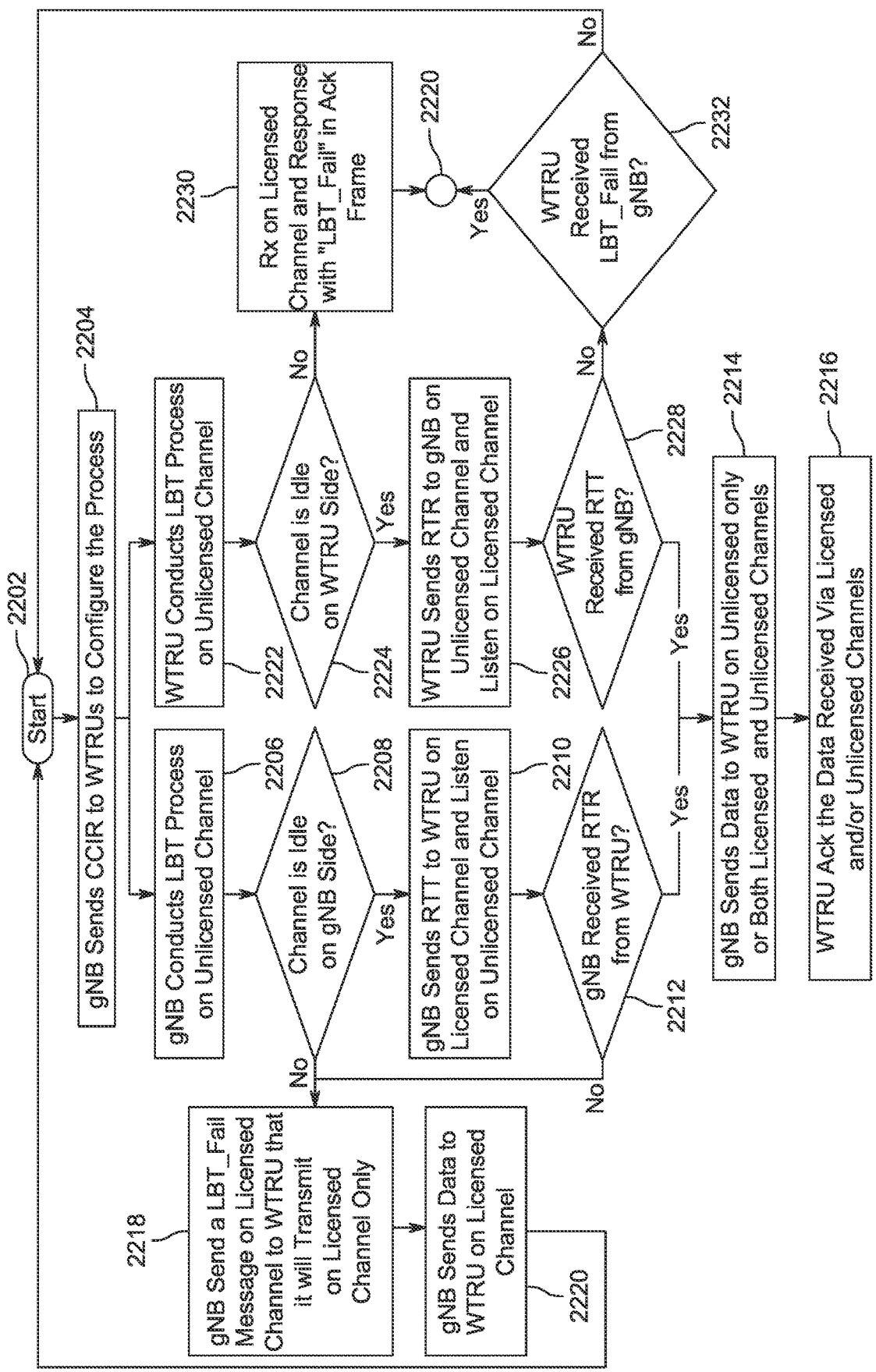
FIG. 22 is a flowchart illustrating an example of handshaking between a gNB and WTRU with simultaneous Tx of RTR and RTT over licensed and unlicensed channels.

FIG. 22 is an example flowchart of handshaking between gNB and WTRU with simultaneous Tx of RTR and RTT over both licensed and unlicensed channels, along with method(s) of handling the situation of LBT failure or RTR/RTT reception failure. This flow chart may reflect some or all of the steps as FIG. 21A and/or 21B. At the start of the process(es) 2202, a gNB may send a CCIR to a WTRU to configure the handshaking process 2204. The gNB and WTRU may conduct a LBT process on an unlicensed channel at the same or approximately the same time 2206/2222. If the unlicensed channel is idle on the gNB side, then the gNB may send an RTT to the WTRU on the licensed channel and listen on the unlicensed channel 2210. Meanwhile, if the WTRU senses the unlicensed channel is idle, the WTRU may send an RTR to the gNB on the unlicensed channel and listen on the licensed channel. If the WTRU receives the RTT from the gNB 2228, and the gNB receives the RTR from the WTRU 2212, then the gNB may send data to the WTRU on the unlicensed channel only or both the licensed and unlicensed channels 2214. Further, the WTRU may send an ACK that it has received the data via the licensed channel and/or the unlicensed channel 2216. If the gNB does not receive the RTR on the unlicensed channel, the gNB may proceed with the LBT_Fail process 2218 as disclosed. If the WTRU does not receive the RTT on the licensed channel, and/or if the WTRU has received an LBT_Fail message from the gNB 2232, then the WTRU may receive data via the licensed channel 2220, but if it does not receive the LBT_Fail message it may restart the process at 2202.

If the channel is not idle on the gNB side, the gNB may send a LBT_Fail message to the WTRU on the licensed channel only 2218, after which the gNB may send data to the WTRU on the licensed channel 2220. If the unlicensed channel is not idle on the WTRU side, the WTRU may receive on the licensed channel and respond with a LBT_Fail in an ACK frame 2230.

In some scenarios, the gNB may not correctly decode the RTR sent by a WTRU. In such a case the WTRU, not knowing that the RTR was not decoded correctly by the gNB, may wait for a while to get a PDCCH/PDSCH/PUSCH for potential DL or UL transmission. This may result in a significant delay. To address this, a WTRU may autonomously send a control message, denoted as clear channel indication (CCI), to the gNB indicating that the LBT on the unlicensed channel is clear at its side. Depending on the deployment scenario (e.g., SA NR-U vs. NSA NR-U such as Carrier Aggregation or Dual Connectivity), the CCI may be sent on the licensed or unlicensed channel. If CCI is sent on the unlicensed channel, the WTRU may redo an LBT procedure right before sending the CCI, or may redo the same LBT that was originally done correctly before sending the RTR in response to a RTT.

Concerning the resource used for sending a CCI, the WTRU may be configured with some PUCCH resources that the WTRU may use to send the CCI. These PUCCH resources may be scheduled similar to the PUCCH resources used for other situations, such as a Scheduling Request (SR), however, they may be scheduled more often. In one example, a gNB may schedule a PUCCH resource for both SR and CCI, but with different identifiers, such as various cyclic shifts of the same base sequence, such as different RBs of various cyclic shifts of the same base sequence, or the like.

In one example, the WTRU after responding with an RTR to a RTT, may wait for a pre-configured duration and if no PDCCH (e.g., for scheduling a DL or UL) is received, then the WTRU may attempt to send a CCI in the first upcoming opportunity (e.g., with a pre-configured PUCCH resource assigned for CCI transmission).

In another example, the WTRU may send the CCI message on a pre-configured resource regardless of whether there was an earlier RTT message. This may be appropriate where a WTRU autonomously notifies its gNB about the availability of a channel, or a successful LBT, at its side (e.g., during a COT established by the gNB). In one case, the CCI message may have a field that identifies what LBT procedure has successfully been performed.

In another example, when a WTRU attempts to send a scheduling request to its gNB, the WTRU may first perform an LBT procedure (e.g., according to the associated class of the TB it is attempting to send) and then send the SR in the scheduled PUCCH resource. In such an example, the gNB may interpret this SR message as a collective SR and CCI message.

In one embodiment, there may be an extension of an SFI table for NR-U operation. In order to indicate the SFI needed for the embodiments and situations as discussed herein, such as for NR frame structure for unlicensed channel access and/or RTR handshaking, additional SFI indications may be needed. These additional SFI indications may be an index chosen from the range 62 to 255 indicating a slot or sub-slot where there may be one or multiple flexible symbols (X) followed by one or multiple DL symbols (DL) and possibly followed by one or multiple DL or flexible symbols (DL or X), all subject to a maximum of 14 symbols.

The additional SFI indications may also be an index chosen from the range 62 to 255 indicating a slot or sub-slot where there may be one or multiple DL symbols (DL), followed by one or multiple flexible symbols (X), followed by one or multiple UL symbols (UL) and finally followed by one or multiple DL or flexible symbols (DL or X), all subject to a maximum of 14 symbols.

The additional SFI indications may also be an index chosen from the range 62 to 255 indicating a slot or sub-slot where there may be one or multiple flexible symbols (X), followed by one or multiple DL symbols (DL), followed by one or multiple flexible symbols (X), followed by one or multiple UL symbols (UL) and finally followed by one or multiple DL or flexible symbols (DL or X), all subject to a maximum of 14 symbols.

A few examples of the SFIs useful for NR-U operation may be found in Tables SFI-a, SFI-b, SFI-c, SFI-d, and SFI-e.

TABLE SFI-a

Example of an extension of Slot Format Index for NR-U Operation

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| An index chosen from the range 62 to 255 | D | X | U | X | D | D | D | D | D | D | D | D | D | D |
| | D | X | X | U | D | D | D | D | D | D | D | D | D | D |
| | D | X | X | X | U | D | D | D | D | D | D | D | D | D |
| | D | X | X | X | X | U | D | D | D | D | D | D | D | D |
| | D | D | X | U | X | D | D | D | D | D | D | D | D | D |
| | D | D | X | X | U | D | D | D | D | D | D | D | D | D |
| | D | D | X | X | X | U | D | D | D | D | D | D | D | D |
| | D | D | X | X | X | X | U | D | D | D | D | D | D | D |
| | D | X | U | U | X | D | D | D | D | D | D | D | D | D |
| | D | X | X | U | U | X | D | D | D | D | D | D | D | D |
| | D | X | X | X | U | U | X | D | D | D | D | D | D | D |
| | D | X | X | X | X | U | U | X | D | D | D | D | D | D |
| | D | D | X | U | U | X | D | D | D | D | D | D | D | D |
| | D | D | X | X | U | U | X | D | D | D | D | D | D | D |
| | D | D | X | X | X | U | U | X | D | D | D | D | D | D |
| | D | D | X | X | X | X | U | U | X | D | D | D | D | D |
| | D | X | U | U | X | D | D | D | D | D | D | D | D | D |
| | D | X | X | U | U | X | D | D | D | D | D | D | D | D |
| | D | X | X | X | U | U | X | D | D | D | D | D | D | D |
| | D | X | X | X | X | U | U | X | D | D | D | D | D | D |
| | D | D | X | U | U | X | D | D | D | D | D | D | D | D |
| | D | D | X | X | U | U | X | D | D | D | D | D | D | D |
| | D | D | X | X | X | U | U | X | D | D | D | D | D | D |
| | D | D | X | X | X | X | U | U | X | D | D | D | D | D |
| | D | D | D | X | U | X | D | D | D | D | D | D | D | D |
| | D | D | D | X | X | U | D | D | D | D | D | D | D | D |
| | D | D | D | X | X | X | U | D | D | D | D | D | D | D |
| | D | D | D | X | X | X | X | U | D | D | D | D | D | D |
| | D | D | X | U | U | X | D | D | D | D | D | D | D | D |
| | D | D | X | X | U | U | X | D | D | D | D | D | D | D |
| | D | D | X | X | X | U | U | X | D | D | D | D | D | D |
| | D | D | D | X | U | U | X | D | D | D | D | D | D | D |
| | D | D | D | X | X | U | U | X | D | D | D | D | D | D |
| | D | D | D | X | X | X | U | U | X | D | D | D | D | D |
| | D | D | X | U | U | U | X | D | D | D | D | D | D | D |
| | D | D | X | X | U | U | U | X | D | D | D | D | D | D |
| | D | D | X | X | X | U | U | U | X | D | D | D | D | D |
| | D | D | D | X | U | U | X | D | D | D | D | D | D | D |
| | D | D | D | X | X | U | U | X | D | D | D | D | D | D |
| | D | D | D | X | X | X | U | U | X | D | D | D | D | D |
| | D | D | D | X | U | U | U | X | D | D | D | D | D | D |
| | D | D | D | X | X | U | U | U | X | D | D | D | D | D |
| | D | D | D | X | X | X | U | U | U | X | D | D | D | D |

TABLE SFI-b

Example of an extension of Slot Format Index for NR-U Operation

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| An index chosen from | X | D | X | U | X | D | D | D | D | D | D | D | D | D |
| | X | D | X | X | U | D | D | D | D | D | D | D | D | D |
| | X | D | X | X | X | U | D | D | D | D | D | D | D | D |
| | X | D | X | X | X | X | U | D | D | D | D | D | D | D |

TABLE SFI-b-continued

Example of an extension of Slot Format Index for NR-U Operation

| Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| the range 62 to 255 | X | D | D | X | U | X | D | D | D | D | D | D | D | D |
| | X | D | D | X | X | U | D | D | D | D | D | D | D | D |
| | X | D | D | X | X | X | U | D | D | D | D | D | D | D |
| | X | D | D | X | X | X | X | U | D | D | D | D | D | D |
| | X | D | X | U | U | X | D | D | D | D | D | D | D | D |
| | X | D | X | U | U | U | X | D | D | D | D | D | D | D |
| | X | D | X | X | U | U | X | D | D | D | D | D | D | D |
| | X | D | X | X | X | U | U | X | D | D | D | D | D | D |
| | X | D | D | X | U | U | X | D | D | D | D | D | D | D |
| | X | D | D | X | X | U | U | X | D | D | D | D | D | D |
| | X | D | D | X | X | X | U | U | X | D | D | D | D | D |
| | X | D | D | X | X | X | U | U | X | D | D | D | D | D |
| | X | D | X | U | U | U | X | D | D | D | D | D | D | D |
| | X | D | X | X | U | U | X | D | D | D | D | D | D | D |
| | X | D | X | X | X | U | U | X | D | D | D | D | D | D |
| | X | D | X | X | X | U | U | U | X | D | D | D | D | D |
| | X | D | D | X | U | U | U | X | D | D | D | D | D | D |
| | X | D | D | X | X | U | U | X | D | D | D | D | D | D |
| | X | D | D | X | X | X | U | U | X | D | D | D | D | D |
| | X | D | D | X | X | X | U | U | U | X | D | D | D | D |
| | X | D | D | X | U | X | D | D | D | D | D | D | D | D |
| | X | D | D | X | X | U | D | D | D | D | D | D | D | D |
| | X | D | D | X | X | X | U | D | D | D | D | D | D | D |
| | X | D | D | D | X | U | X | D | D | D | D | D | D | D |
| | X | D | D | D | X | X | U | D | D | D | D | D | D | D |
| | X | D | D | D | X | X | X | U | D | D | D | D | D | D |
| | X | D | D | D | X | X | X | X | U | D | D | D | D | D |
| | X | D | D | X | U | U | X | D | D | D | D | D | D | D |
| | X | D | D | X | X | U | X | D | D | D | D | D | D | D |
| | X | D | D | X | X | X | U | X | D | D | D | D | D | D |
| | X | D | D | D | X | U | U | X | D | D | D | D | D | D |
| | X | D | D | D | X | X | U | X | D | D | D | D | D | D |
| | X | D | D | D | X | X | X | U | X | D | D | D | D | D |
| | X | D | D | D | X | X | X | X | U | X | D | D | D | D |
| | X | D | D | X | U | U | X | D | D | D | D | D | D | D |
| | X | D | D | X | U | U | X | D | D | D | D | D | D | D |
| | X | D | D | X | X | U | U | X | D | D | D | D | D | D |
| | X | D | D | X | X | X | U | U | X | D | D | D | D | D |
| | X | D | D | D | X | U | U | X | D | D | D | D | D | D |
| | X | D | D | D | X | X | U | U | X | D | D | D | D | D |
| | X | D | D | D | X | X | X | U | U | X | D | D | D | D |
| | X | D | D | D | X | X | X | U | U | U | X | D | D | D |

TABLE SFI-c

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| An index chosen from the range 62 to 255 | X | X | D | X | U | X | D | D | D | D | D | D | D | D |
| | X | X | D | X | X | U | D | D | D | D | D | D | D | D |
| | X | X | D | X | X | X | U | D | D | D | D | D | D | D |
| | X | X | D | D | X | U | X | D | D | D | D | D | D | D |
| | X | X | D | D | X | X | U | D | D | D | D | D | D | D |
| | X | X | D | D | X | X | X | U | D | D | D | D | D | D |
| | X | X | D | X | U | U | X | D | D | D | D | D | D | D |
| | X | X | D | X | X | U | U | X | D | D | D | D | D | D |
| | X | X | D | X | X | X | U | X | D | D | D | D | D | D |
| | X | X | D | X | X | X | U | U | X | D | D | D | D | D |
| | X | X | D | X | X | X | X | U | U | X | D | D | D | D |

TABLE SFI-c-continued

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | X | X | D | X | U | U | U | X | D | D | D | D | D | D |
| | X | X | D | X | X | U | U | U | X | D | D | D | D | D |
| | X | X | D | X | X | X | U | U | X | D | D | D | D | D |
| | X | X | D | X | X | X | X | U | U | X | D | D | D | D |
| | X | X | D | D | X | U | U | X | D | D | D | D | D | D |
| | X | X | D | D | X | X | U | U | X | D | D | D | D | D |
| | X | X | D | D | X | X | X | U | U | X | D | D | D | D |
| | X | X | D | D | X | X | X | X | U | X | D | D | D | D |
| | X | X | D | D | X | X | X | U | U | U | X | D | D | D |
| | X | X | D | D | X | U | X | D | D | D | D | D | D | D |
| | X | X | D | D | X | X | U | D | D | D | D | D | D | D |
| | X | X | D | D | X | X | X | U | D | D | D | D | D | D |
| | X | X | D | D | X | U | X | D | D | D | D | D | D | D |
| | X | X | D | D | X | X | U | D | D | D | D | D | D | D |
| | X | X | D | D | X | X | X | U | D | D | D | D | D | D |
| | X | X | D | D | X | X | U | D | D | D | D | D | D | D |
| | X | X | D | D | X | X | X | U | D | D | D | D | D | D |
| | X | X | D | D | X | X | X | X | U | D | D | D | D | D |
| | X | X | D | D | X | U | U | X | D | D | D | D | D | D |
| | X | X | D | D | X | U | U | X | D | D | D | D | D | D |
| | X | X | D | D | X | X | U | U | X | D | D | D | D | D |
| | X | X | D | D | X | X | X | U | X | D | D | D | D | D |
| | X | X | D | D | X | U | U | X | D | D | D | D | D | D |
| | X | X | D | D | X | U | U | U | X | D | D | D | D | D |
| | X | X | D | D | X | X | U | U | X | D | D | D | D | D |
| | X | X | D | D | X | X | X | U | U | X | D | D | D | D |
| | X | X | D | D | X | X | X | U | U | X | D | D | D | D |
| | X | X | D | D | X | X | X | X | U | U | U | X | D | D |

TABLE SFI-d

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| An index chosen from the range 62 to 255 | X | X | X | D | X | U | X | D | D | D | D | D | D | D |
| | X | X | X | D | X | X | U | D | D | D | D | D | D | D |
| | X | X | X | D | X | X | X | U | D | D | D | D | D | D |
| | X | X | X | D | X | X | X | X | U | D | D | D | D | D |
| | X | X | X | D | D | X | U | X | D | D | D | D | D | D |
| | X | X | X | D | D | X | X | U | D | D | D | D | D | D |
| | X | X | X | D | D | X | X | X | U | D | D | D | D | D |
| | X | X | X | D | X | U | U | X | D | D | D | D | D | D |
| | X | X | X | D | X | X | U | X | D | D | D | D | D | D |
| | X | X | X | D | X | X | U | X | D | D | D | D | D | D |
| | X | X | X | D | X | X | X | U | X | D | D | D | D | D |
| | X | X | X | D | X | U | U | U | X | D | D | D | D | D |
| | X | X | X | D | X | X | U | U | X | D | D | D | D | D |
| | X | X | X | D | X | X | X | U | U | X | D | D | D | D |
| | X | X | X | D | X | X | X | X | U | X | D | D | D | D |
| | X | X | X | D | D | X | U | U | X | D | D | D | D | D |
| | X | X | X | D | D | X | X | U | U | X | D | D | D | D |
| | X | X | X | D | D | X | X | X | U | U | X | D | D | D |
| | X | X | X | D | X | U | X | D | D | D | D | D | D | D |
| | X | X | X | D | X | X | U | D | D | D | D | D | D | D |
| | X | X | X | D | X | X | X | U | D | D | D | D | D | D |
| | X | X | X | D | X | X | X | X | U | D | D | D | D | D |
| | X | X | X | D | X | U | U | X | D | D | D | D | D | D |
| | X | X | X | D | X | X | U | U | X | D | D | D | D | D |
| | X | X | X | D | X | X | X | U | U | X | D | D | D | D |
| | X | X | X | D | X | X | X | X | U | U | X | D | D | D |

TABLE SFI-d-continued

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | X | X | X | D | D | D | X | U | X | D | D | D | D | D |
| | X | X | X | D | D | D | X | X | U | D | D | D | D | D |
| | X | X | X | D | D | D | X | X | X | U | D | D | D | D |
| | X | X | X | D | D | D | X | X | X | X | U | D | D | D |
| | X | X | X | D | D | X | U | U | X | D | D | D | D | D |
| | X | X | X | D | D | X | X | U | U | X | D | D | D | D |
| | X | X | X | D | D | X | X | X | U | U | X | D | D | D |
| | X | X | X | D | D | X | X | X | X | U | U | X | D | D |
| | X | X | X | D | D | X | U | U | X | D | D | D | D | D |
| | X | X | X | D | D | X | X | U | U | X | D | D | D | D |
| | X | X | X | D | D | X | X | X | U | U | X | D | D | D |
| | X | X | X | D | D | X | X | X | X | U | U | X | D | D |
| | X | X | X | D | D | X | U | U | U | X | D | D | D | D |
| | X | X | X | D | D | X | X | U | U | U | X | D | D | D |
| | X | X | X | D | D | X | X | X | U | U | U | X | D | D |
| | X | X | X | D | D | X | X | X | X | U | U | U | X | D |
| | X | X | X | D | D | X | U | U | U | X | D | D | D | D |
| | X | X | X | D | D | X | X | U | U | U | X | D | D | D |
| | X | X | X | D | D | X | X | X | U | U | U | X | D | D |
| | X | X | X | D | D | X | X | X | X | U | U | U | X | D |
| | X | X | X | D | D | X | X | X | X | U | U | U | U | X |

TABLE SFI-e

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| An index chosen from the range 62 to 255 | X | X | X | X | D | X | U | X | D | D | D | D | D | D |
| | X | X | X | X | D | X | X | U | D | D | D | D | D | D |
| | X | X | X | X | D | X | X | X | U | D | D | D | D | D |
| | X | X | X | X | D | X | X | X | X | U | D | D | D | D |
| | X | X | X | X | D | D | X | U | X | D | D | D | D | D |
| | X | X | X | X | D | D | X | X | U | D | D | D | D | D |
| | X | X | X | X | D | D | X | X | X | U | D | D | D | D |
| | X | X | X | X | D | D | X | X | X | X | U | D | D | D |
| | X | X | X | X | D | X | U | U | X | D | D | D | D | D |
| | X | X | X | X | D | X | X | U | U | X | D | D | D | D |
| | X | X | X | X | D | X | X | X | U | U | X | D | D | D |
| | X | X | X | X | D | X | X | X | X | U | U | X | D | D |
| | X | X | X | X | D | D | X | U | U | X | D | D | D | D |
| | X | X | X | X | D | D | X | X | U | U | X | D | D | D |
| | X | X | X | X | D | D | X | X | X | U | U | X | D | D |
| | X | X | X | X | D | D | X | X | X | X | U | U | X | D |
| | X | X | X | X | D | X | U | U | X | D | D | D | D | D |
| | X | X | X | X | D | X | X | U | U | X | D | D | D | D |
| | X | X | X | X | D | X | X | X | U | U | X | D | D | D |
| | X | X | X | X | D | X | X | X | X | U | U | X | D | D |
| | X | X | X | X | D | D | X | U | U | X | D | D | D | D |
| | X | X | X | X | D | D | X | X | U | U | X | D | D | D |
| | X | X | X | X | D | D | X | X | X | U | U | X | D | D |
| | X | X | X | X | D | D | X | X | X | X | U | U | X | D |
| | X | X | X | X | D | D | D | X | U | D | D | D | D | D |
| | X | X | X | X | D | D | D | X | X | U | D | D | D | D |
| | X | X | X | X | D | D | D | X | X | X | U | D | D | D |
| | X | X | X | X | D | D | D | X | X | X | X | U | D | D |
| | X | X | X | X | D | D | D | X | U | U | X | D | D | D |
| | X | X | X | X | D | D | D | X | X | U | U | X | D | D |
| | X | X | X | X | D | D | D | X | X | X | U | U | X | D |
| | X | X | X | X | D | D | D | X | X | X | X | U | U | X |
| | X | X | X | X | D | D | D | X | U | U | X | D | D | D |
| | X | X | X | X | D | D | D | X | X | U | U | X | D | D |
| | X | X | X | X | D | D | D | X | X | X | U | U | X | D |
| | X | X | X | X | D | D | D | X | X | X | X | U | U | X |

TABLE SFI-e-continued

Example of an extension of Slot Format Index for NR-U Operation

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | X | X | X | X | D | X | U | U | U | X | D | D | D | D |
| | X | X | X | X | D | D | X | X | U | U | U | X | D | D |
| | X | X | X | X | D | D | X | X | X | U | U | U | X | D |
| | X | X | X | X | D | D | X | X | X | X | U | U | U | X |
| | X | X | X | X | D | D | X | U | U | U | X | D | D | D |
| | X | X | X | X | D | D | D | X | X | U | U | U | X | D |
| | X | X | X | X | D | D | X | X | X | U | U | U | U | X |
| | X | X | X | X | D | D | D | X | X | X | U | U | U | U |

In view of the techniques described herein, one or more of the systems, methods, and/or devices described herein may be performed virtually and/or by emulation. For example, referring to FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a base station, the method comprising:
   sending a first physical downlink control channel (PDCCH) transmission, wherein the first PDCCH transmission includes configuration information, wherein the configuration information includes a first set of search spaces to be monitored at a first rate, a time period associated with a channel occupancy time (COT), and a second set of search spaces to be monitored at a second rate to be used at an expiration of the time period associated with the COT; and
   sending a second PDCCH transmission in the first set of search spaces after sending the configuration information on a condition that the time period associated with the COT has not expired, or sending a third PDCCH transmission in the second set of search spaces on a condition that the time period associated with the COT has expired.

2. The method of claim 1, wherein the first PDCCH transmission further includes a first slot format indicator (SFI) and a second SFI, or wherein the second PDCCH transmission is sent after the first PDCCH transmission is sent.

3. The method of claim 1, wherein the time period is a time remaining in the COT.

4. The method of claim 1, wherein the base station is a gNB.

5. A base station, the base station comprising:
   a processor;
   a transceiver operatively coupled to the processor, the transceiver and processor configured to send a first physical downlink control channel (PDCCH) transmission, wherein the first PDCCH transmission includes configuration information, wherein the configuration information includes a first set of search spaces to be monitored at a first rate, a time period associated with a channel occupancy time (COT), and a second set of search spaces to be monitored at a second rate to be used at an expiration of the time period associated with the COT; and
   the transceiver and processor configured to send a second PDCCH transmission, wherein the second PDCCH is sent in the first set of search spaces on a condition that the time period associated with the COT has not expired, or to send a third PDCCH transmission in the second set of search spaces on a condition that the time period associated with the COT has expired.

6. The base station of claim 5, wherein the first transmission further includes a first slot format indicator (SFI) and a second SFI, or wherein the second PDCCH transmission is sent after the first PDCCH transmission is sent.

7. The base station of claim 5, wherein the time period is a time remaining in the COT.

8. The base station of claim 5, wherein the base station is a gNB.

9. A method implemented by a wireless transmit receive unit (WTRU), the method comprising:
   receiving a first physical downlink control channel (PDCCH) transmission, wherein the first PDCCH transmission includes configuration information, wherein the configuration information includes a first set of search spaces to be monitored at a first rate, a time period associated with a channel occupancy time (COT), and a second set of search spaces to be monitored at a second rate to be used after an expiration of the time period associated with the COT;
   monitoring for a second PDCCH transmission in the first set of search spaces at the first rate on a condition the time period associated with the COT has not expired; and
   monitoring for a second scheduling transmission on the PDCCH in the second set of search spaces at the second rate on a condition that the time period associated with the COT has expired.

10. The method of claim 9, wherein the configuration information further includes a first slot format indicator.

11. The method of claim 10, wherein the monitoring for the second PDCCH transmission is based on the first slot format indicator.

12. The method of claim 9, wherein the configuration information further includes a second slot format indicator.

13. The method of claim 12, wherein a monitoring for a third PDCCH transmission is based on the second slot format indicator.

14. A wireless transmit receive unit (WTRU), comprising:
   a processor;
   a transceiver operatively coupled to the processor,
   the transceiver and processor are configured to receive a first physical downlink control channel (PDCCH) transmission, wherein the first PDCCH transmission includes configuration information, wherein the configuration information includes a first set of search spaces to be monitored at a first rate, a time period associated with a channel occupancy time (COT), and a second set of search spaces to be monitored at a second rate to be used after an expiration of the time period associated with the COT;
   the transceiver and processor configured to monitor for second PDCCH transmission in the first set of search spaces at the first rate on a condition the time period associated with the COT has not expired; and
   the transceiver and processor configured to monitor for a third PDCCH transmission in the second set of search spaces at the second rate on a condition that the time period associated with the COT has expired.

15. The WTRU of claim 14, wherein the configuration information further includes a first slot format indicator.

16. The WTRU of claim 15, wherein the monitoring for the second PDCCH transmission is based on the first slot format indicator.

17. The WTRU of claim 14, wherein the configuration information further includes a second slot format indicator.

18. The WTRU of claim 17, wherein a monitoring for a third PDCCH transmission based on the second slot format indicator.

* * * * *